(12) United States Patent
Croom et al.

(10) Patent No.: US 8,196,858 B1
(45) Date of Patent: Jun. 12, 2012

(54) AIRCRAFT CONFIGURED FOR FLIGHT IN AN ATMOSPHERE HAVING LOW DENSITY

(75) Inventors: Mark A. Croom, Yorktown, VA (US); Stephen C. Smith, Cupertino, CA (US); Paul A. Gelhausen, Yorktown, VA (US); Mark D. Guynn, Yorktown, VA (US); Craig A. Hunter, Williamsburg, VA (US); David A. Paddock, Toano, VA (US); Steven E. Riddick, Hampton, VA (US); John E. Teter, Jr., Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 341 days.

(21) Appl. No.: 12/721,833

(22) Filed: Mar. 11, 2010

(51) Int. Cl.
*B64C 39/12* (2006.01)
(52) U.S. Cl. .......................... 244/45 R; 244/63; 244/1 R
(58) Field of Classification Search .................. 244/63, 244/218, 49, 45, 1 R, 129.1, 117 R, 158 R, 244/173
See application file for complete search history.

(56) References Cited

U.S. PATENT DOCUMENTS

| | | | |
|---|---|---|---|
| 3,197,158 A | 7/1965 | Rogalo | |
| 3,386,687 A | 6/1968 | Rollins | |
| 3,463,420 A | 8/1969 | Butler et al. | |
| 4,090,684 A | 5/1978 | Look et al. | |
| 4,161,301 A * | 7/1979 | Beardsley et al. | 244/137.3 |
| 4,742,976 A * | 5/1988 | Cohen | 244/58 |
| 4,869,442 A * | 9/1989 | Miller | 244/3.28 |
| 5,820,074 A * | 10/1998 | Trommer et al. | 244/58 |
| 6,322,021 B1 * | 11/2001 | Fisher et al. | 244/49 |
| 6,948,686 B2 * | 9/2005 | Holemans | 244/158.1 |
| 7,090,166 B2 * | 8/2006 | Dennis et al. | 244/63 |
| 7,104,495 B2 * | 9/2006 | McGeer | 244/1 R |
| 7,140,575 B2 * | 11/2006 | McGeer et al. | 244/63 |
| 2003/0168556 A1 * | 9/2003 | Lee | 244/218 |
| 2005/0151009 A1 * | 7/2005 | Roeseler et al. | 244/63 |

* cited by examiner

*Primary Examiner* — Michael Carone
*Assistant Examiner* — Medhat Badawi
(74) *Attorney, Agent, or Firm* — Helen M. Galus

(57) ABSTRACT

An aircraft is configured for flight in an atmosphere having a low density. The aircraft includes a fuselage, a pair of wings, and a rear stabilizer. The pair of wings extends from the fuselage in opposition to one another. The rear stabilizer extends from the fuselage in spaced relationship to the pair of wings. The fuselage, the wings, and the rear stabilizer each present an upper surface opposing a lower surface. The upper and lower surfaces have X, Y, and Z coordinates that are configured for flight in an atmosphere having low density.

19 Claims, 30 Drawing Sheets

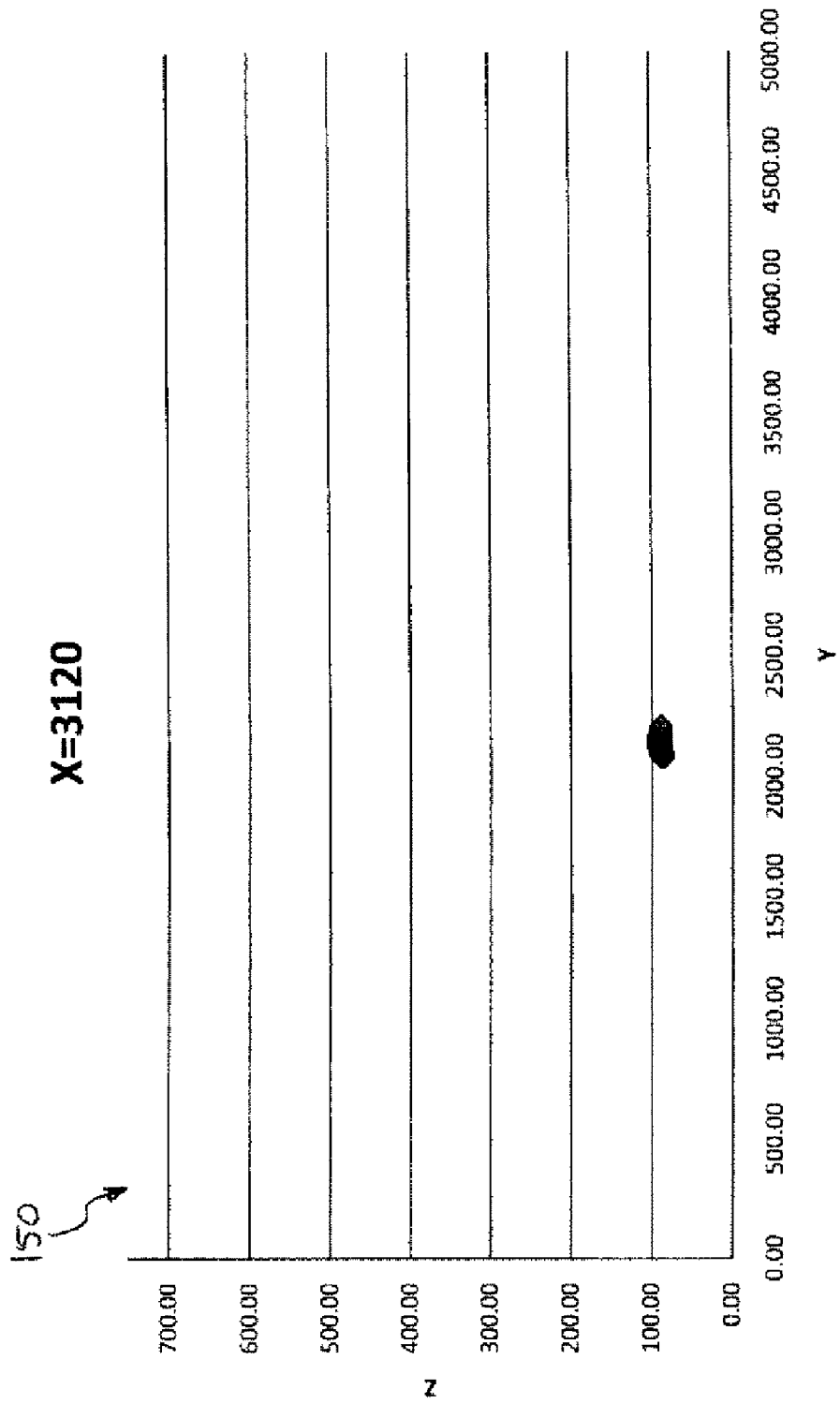

AIRCRAFT CONFIGURED FOR FLIGHT IN AN ATMOSPHERE HAVING LOW DENSITY

ORGIN OF THE INVENTION

This invention was made by employees of the United States Government any may be manufactured and used by or for the Government of the United States of America for governmental purposes without the payment of any royalties thereon or therefor.

TECHNICAL FIELD

The present invention relates to an aircraft configured for flight in an atmosphere having a low density.

BACKGROUND OF THE INVENTION

The Mars atmosphere is thin and composed mostly of carbon dioxide. The gravity is lower than the gravity on Earth. More specifically, atmospheric density near the Martian surface is roughly equivalent to an altitude of 100,000 feet on Earth. The low atmospheric density leads to a high cruise velocity, but a low Reynolds number. Since the speed of sound on Mars is lower than on Earth, transonic aerodynamic effects are encountered at a lower flight speed. Low atmospheric density also presents difficulty in generating sufficient thrust. Therefore, with such a thin atmosphere, generating enough lift to support airplane weight is difficult and wing loading must be small.

In addition to the challenge of generating sufficient lift and thrust to fly an airplane through the Martian atmosphere, there are challenges associated with getting the airplane to Mars. These challenges include stowage of the airplane in a non-flight configuration and the extraction of the airplane from the non-flight configuration to an in-flight configuration capable of flight in a thin atmosphere.

SUMMARY OF THE INVENTION

An aircraft is configured for flight in an atmosphere having a low density. The aircraft includes a fuselage, a pair of wings, and a rear stabilizer. The pair of wings extends from the fuselage in opposition to one another. The rear stabilizer extends from the fuselage in spaced relationship to the pair of wings. The fuselage, the wings, and the rear stabilizer each present an upper surface opposing a lower surface. The upper and lower surfaces have X, Y, and Z coordinates that are configured for flight in an atmosphere having low density.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike:

FIG. 31 is a graphical representation of Y and Z positions of upper and lower surfaces of the aircraft of FIG. 1 taken at an X position substantially equal to 3120.0.

DESCRIPTION OF THE PREFERRED EMBODIMENTS

Figure 1A:
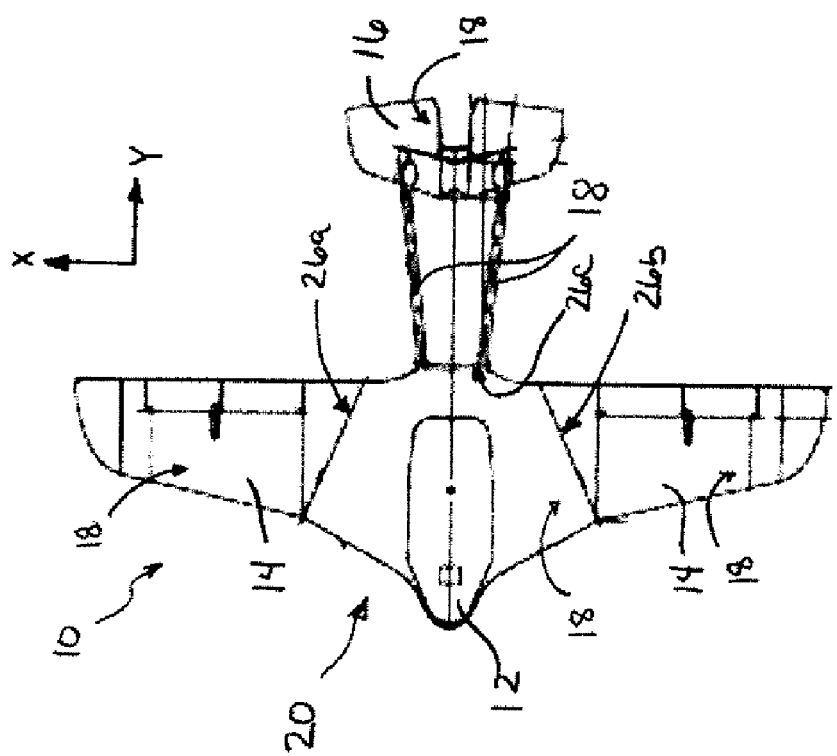
FIG. 1A is a schematic plan view of an aircraft in an unfolded position.

Referring to the drawings, wherein like reference numbers refer to like components, FIG. 1 shows an aircraft 10 configured for flight in an atmosphere having a low density. More specifically, the aircraft 10 includes a fuselage 12, a pair of wings 14, and a rear stabilizer 16. A stabilizer bar 18 operatively interconnects the fuselage 12 and the rear stabilizer 16.

Figure 1B:
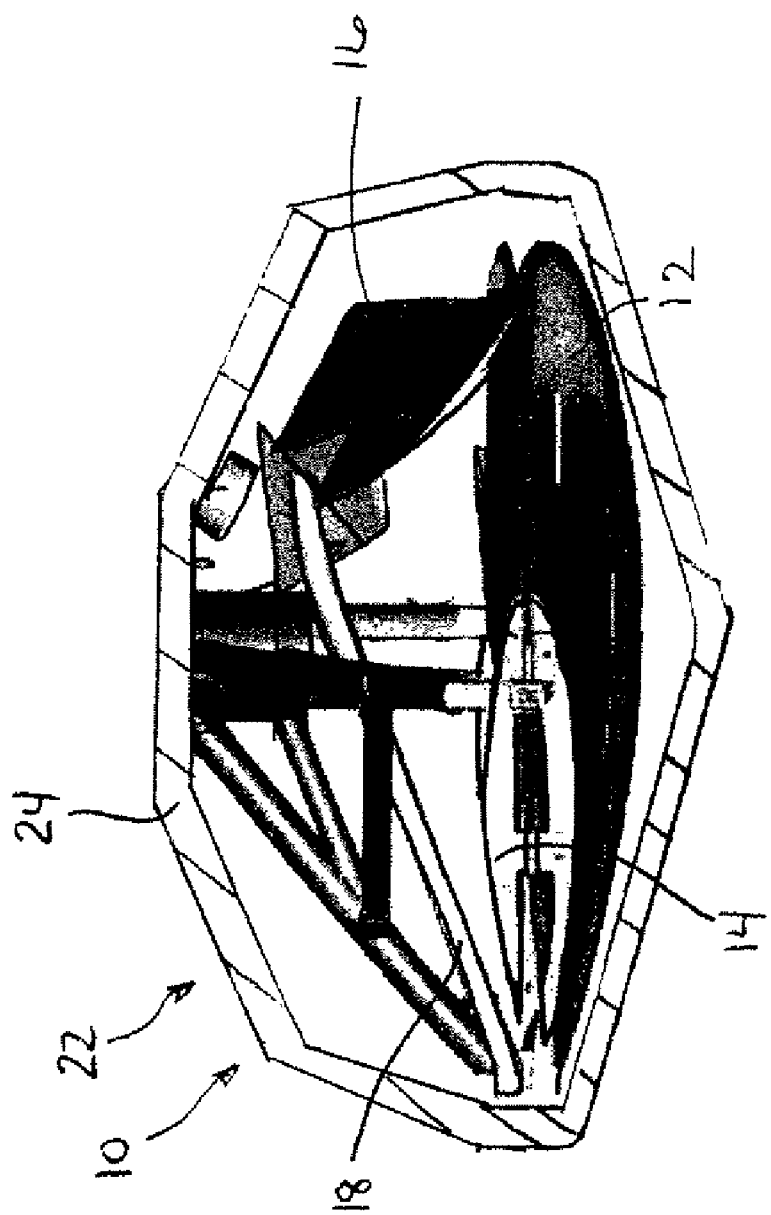
FIG. 1B is a schematic partial cross sectional side view of the aircraft of FIG. 1 in a folded position and disposed within an aeroshell.
Figure 2:
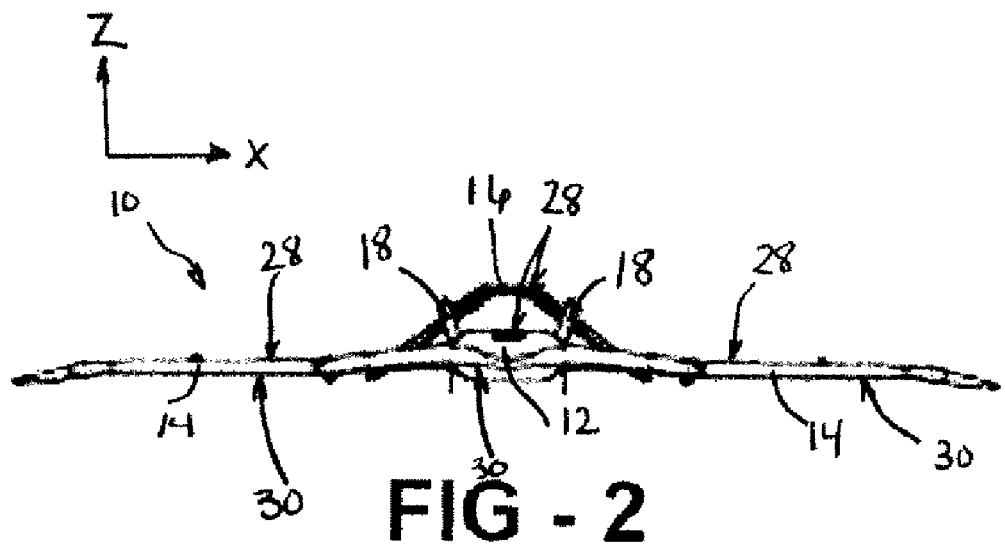
FIG. 2 is a schematic front view of the aircraft of FIG. 1 in the unfolded position.
Figure 3:
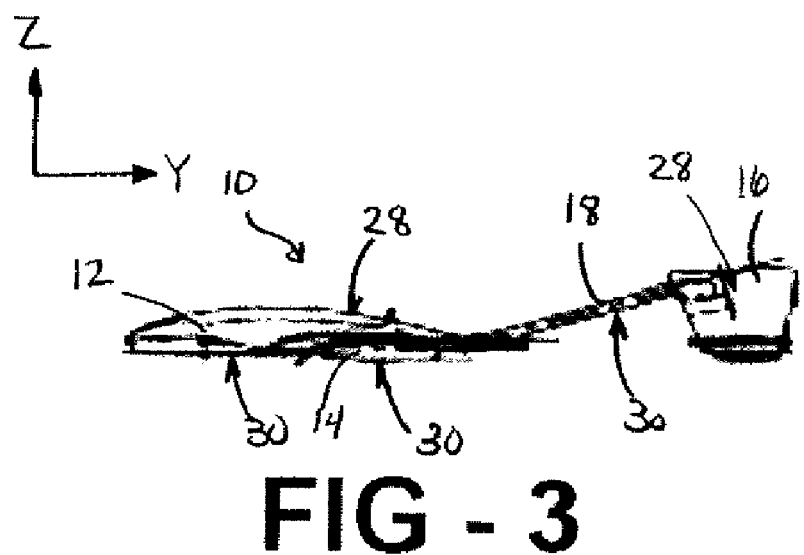
FIG. 3 is a schematic side view of the aircraft of FIG. 1 in the unfolded position.
Figure 4:
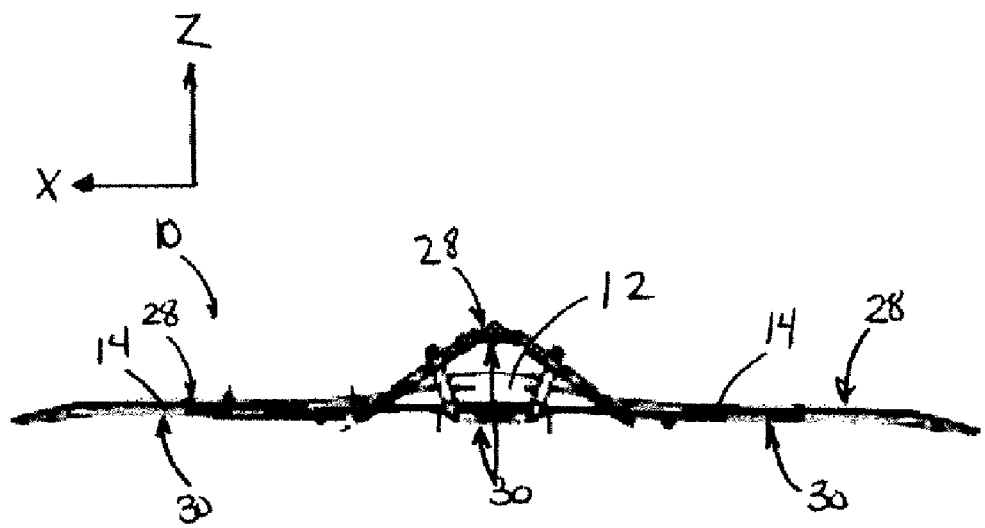
FIG. 4 is a schematic rear view of the aircraft of FIG. 1 in the unfolded position.
Figure 5:
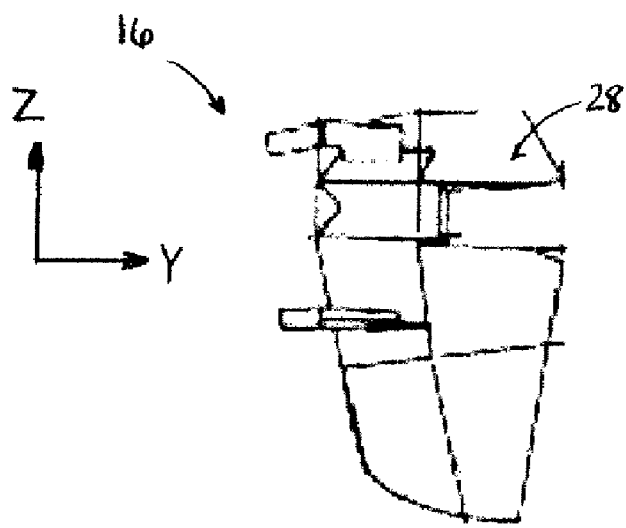
FIG. 5 is a schematic view of a rear stabilizer of the aircraft of FIG. 1.

The aircraft 10 is configured to move between an unfolded position 20, as shown in FIG. 1A, and a folded position 22, as shown in FIG. 1B, and vice versa. When the aircraft 10 is in the folded position 22, the aircraft 10 is configured to fit within volumetric space limitations of an aeroshell 24 (or similar capsule) of a launch vehicle, i.e., a Delta II, and the like (not shown). More specifically, the aircraft 10 is configured to move between the folded position 22 and the unfolded position 20 with only three folds 26a, 26b, 26c. Two of the folds 26a, 26b are on a respective wing 14 and the third fold 26c is on the stabilizer bar 18. Therefore, each of the wings 14 is foldable, relative to the fuselage 12, along the fold 26a, 26b, i.e., a wing hinge. Likewise, the rear stabilizer 16 is foldable, relative to the fuselage 12, along the fold 26c, i.e., a stabilizer hinge. It should be appreciated, however, that the aircraft 10 may be configured with any other desired number of folds, as known to those skilled in the art.

The aircraft 10 is also configured to have a desired mass and mass distribution when in the folded position 22 such that the aircraft 10 is transported stably within the launch vehicle. Likewise, the aircraft 10 is configured such that the mass and mass distribution provides stability in the unfolded position 20, for flight, without any artificial augmentation. A structural arrangement, i.e., internally and externally, is configured such that the aircraft 10 survives loads associated with launch and reentry (Earth and Mars, Earth and Earth, respectively). The aircraft 10 is also configured with a desired propulsion system duration, power, and efficiency to provide required speed and endurance. Additionally, the aircraft 10 is configured to have adequate payload capacity in both volume and mass available, while allowing any required subsystems to exist, e.g., batteries, guidance, control, telemetry, etc.

When the airplane is stowed in the launch vehicle in the folded position 22 within the confined volume, the airplane is configured to be transported via flight, e.g., via a rocket and the like, and released from the confined volume during flight. When the aircraft 10 is released from the confined volume of the launch vehicle during flight, the aircraft 10 is configured such that the wings 14 and the rear stabilizer 16 unfold about the respective folds. Once the aircraft 10 is in the unfolded position 20, the aircraft 10 is configured for controlled flight in low density, such as around Mars. It should be appreciated, however, that the aircraft 10 is not limited to flight around Mars as the aircraft 10 is configured for flight in any planetary atmosphere with a low density.

Figure 6:
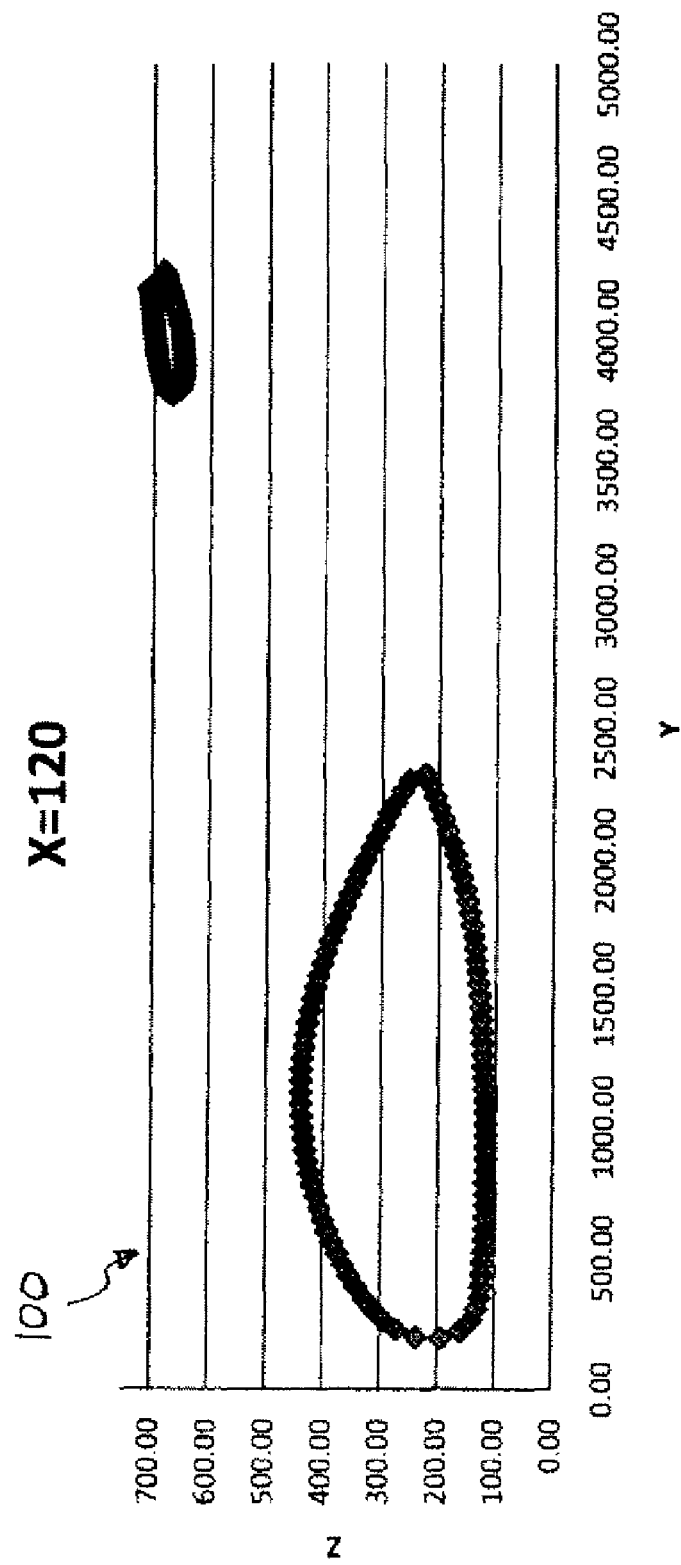
FIG. 6 is a graphical representation of Y and Z positions of upper and lower surfaces of the aircraft of FIG. 1 taken at an X position substantially equal to 120.0.

Referring to FIGS. 1A-5, the fuselage 12, the pair of wings 14, and the rear stabilizer 16 present an upper surface 28 opposing a lower surface 30. The geometry of the upper and lower surfaces 28, 30 provides the requisite aerodynamic properties to the aircraft 10, such as lift and drag, such that flight in low density can be achieved. The upper and lower surfaces 28, 30 are defined at X, Y, and Z locations in a 3-dimensional X, Y, Z configuration. The X positions are defined along an X axis that generally extends between the wings 14. The Y locations are defined along a Y axis that extends along the fuselage 12, in perpendicular relationship to the x-axis. The Z locations are defined along a Z axis that generally extends in perpendicular relationship to the X axis and the Y axis. The upper and lower surfaces 28, 30 are defined at Y and Z positions corresponding substantially to an X position of 120.0, as shown in Table 1 and at 100 in FIG. 6.

TABLE 1

| Y | Z |
|---|---|
| 1005.68 | 117.26 |
| 1037.25 | 437.34 |
| 1049.79 | 117.67 |
| 1081.35 | 438.41 |
| 1093.9 | 118.26 |
| 1125.46 | 438.83 |
| 1138 | 119.03 |
| 1169.57 | 438.6 |
| 1182.11 | 119.96 |
| 1213.67 | 437.72 |
| 1226.2 | 121.01 |
| 1257.75 | 436.19 |
| 1270.3 | 122.11 |
| 1301.81 | 434.01 |
| 1314.4 | 123.2 |
| 1345.83 | 431.19 |
| 1358.5 | 124.3 |
| 1389.81 | 427.74 |
| 1402.59 | 125.48 |
| 1433.73 | 423.67 |
| 1446.68 | 126.77 |
| 1477.59 | 419.01 |
| 1490.77 | 128.22 |
| 1521.39 | 413.76 |
| 1534.85 | 129.87 |
| 1565.12 | 407.93 |
| 1578.92 | 131.74 |
| 1608.77 | 401.56 |
| 1622.98 | 133.88 |
| 1652.34 | 394.68 |
| 1667.02 | 136.33 |
| 1695.83 | 387.34 |
| 1711.05 | 139.13 |
| 1739.27 | 379.66 |
| 1755.04 | 142.31 |
| 1782.65 | 371.68 |
| 1799.01 | 145.91 |
| 1825.98 | 363.42 |
| 1842.93 | 149.98 |
| 1869.25 | 354.84 |
| 1886.8 | 154.56 |
| 1912.45 | 345.9 |
| 191.27 | 193.72 |
| 1930.61 | 159.67 |
| 1955.57 | 336.63 |
| 195.79 | 236.57 |
| 1974.36 | 165.31 |
| 1998.63 | 327.04 |
| 2018.04 | 171.45 |

TABLE 1-continued

| Y | Z |
|---|---|
| 2041.63 | 317.21 |
| 2061.66 | 178.05 |
| 2084.61 | 307.28 |
| 2105.22 | 185.01 |
| 2127.58 | 297.33 |
| 2148.72 | 192.28 |
| 2170.47 | 287.02 |
| 217.43 | 159.25 |
| 2192.19 | 199.79 |
| 2213.16 | 275.91 |
| 2235.63 | 207.48 |
| 223.69 | 270.3 |
| 2255.58 | 263.8 |
| 2279.04 | 215.29 |
| 2297.8 | 251.03 |
| 2321.2 | 224.19 |
| 257.36 | 140.96 |
| 260.67 | 294.21 |
| 300.44 | 131.64 |
| 300.83 | 312.4 |
| 342.35 | 327.29 |
| 344.24 | 126.54 |
| 3744.64 | 668.04 |
| 3758.76 | 679.04 |
| 3765.49 | 654.1 |
| 3778.09 | 682.59 |
| 3784.17 | 650.65 |
| 3797.57 | 685.21 |
| 3803.05 | 648.55 |
| 3817.1 | 687.46 |
| 3822.01 | 647.3 |
| 3836.67 | 689.38 |
| 3840.99 | 646.64 |
| 384.41 | 340.58 |
| 3856.25 | 691.1 |
| 3859.99 | 646.44 |
| 3875.86 | 692.61 |
| 3878.99 | 646.57 |
| 388.22 | 123.63 |
| 3895.47 | 694 |
| 3897.98 | 647.01 |
| 3915.08 | 695.32 |
| 3916.97 | 647.73 |
| 3934.71 | 696.47 |
| 3935.94 | 648.72 |
| 3954.35 | 697.51 |
| 3954.91 | 649.85 |
| 3973.87 | 651.12 |
| 3973.98 | 698.57 |
| 3992.81 | 652.63 |
| 3993.61 | 699.65 |
| 4011.73 | 654.36 |
| 4013.25 | 700.76 |
| 4030.63 | 656.29 |
| 4032.88 | 701.89 |
| 4049.51 | 658.39 |
| 4052.51 | 703.04 |
| 4068.38 | 660.63 |
| 4072.14 | 704.2 |
| 4087.23 | 662.99 |
| 4091.77 | 705.37 |
| 4106.07 | 665.47 |
| 4111.39 | 706.53 |
| 4124.89 | 668.04 |
| 4131.02 | 707.69 |
| 4143.7 | 670.71 |
| 4150.65 | 708.86 |
| 4162.5 | 673.48 |
| 4166.85 | 699.98 |
| 4181.28 | 676.32 |
| 4181.67 | 687.05 |
| 4198.83 | 681.03 |
| 4200.06 | 679.25 |
| 4218.82 | 682.24 |
| 426.85 | 352.58 |
| 432.29 | 121.8 |
| 469.58 | 363.51 |
| 476.39 | 120.56 |

TABLE 1-continued

| Y | Z |
|---|---|
| 512.54 | 373.55 |
| 520.48 | 119.5 |
| 555.68 | 382.76 |
| 564.59 | 118.6 |
| 598.98 | 391.18 |
| 608.69 | 117.9 |
| 642.42 | 398.84 |
| 652.8 | 117.4 |
| 685.98 | 405.76 |
| 696.91 | 117.05 |
| 729.65 | 411.98 |
| 741.02 | 116.83 |
| 773.41 | 417.53 |
| 785.13 | 116.7 |
| 817.25 | 422.43 |
| 829.24 | 116.66 |
| 861.15 | 426.68 |
| 873.35 | 116.71 |
| 905.12 | 430.3 |
| 917.46 | 116.82 |
| 949.13 | 433.28 |
| 961.57 | 117 |
| 993.17 | 435.63 |

Figure 7:
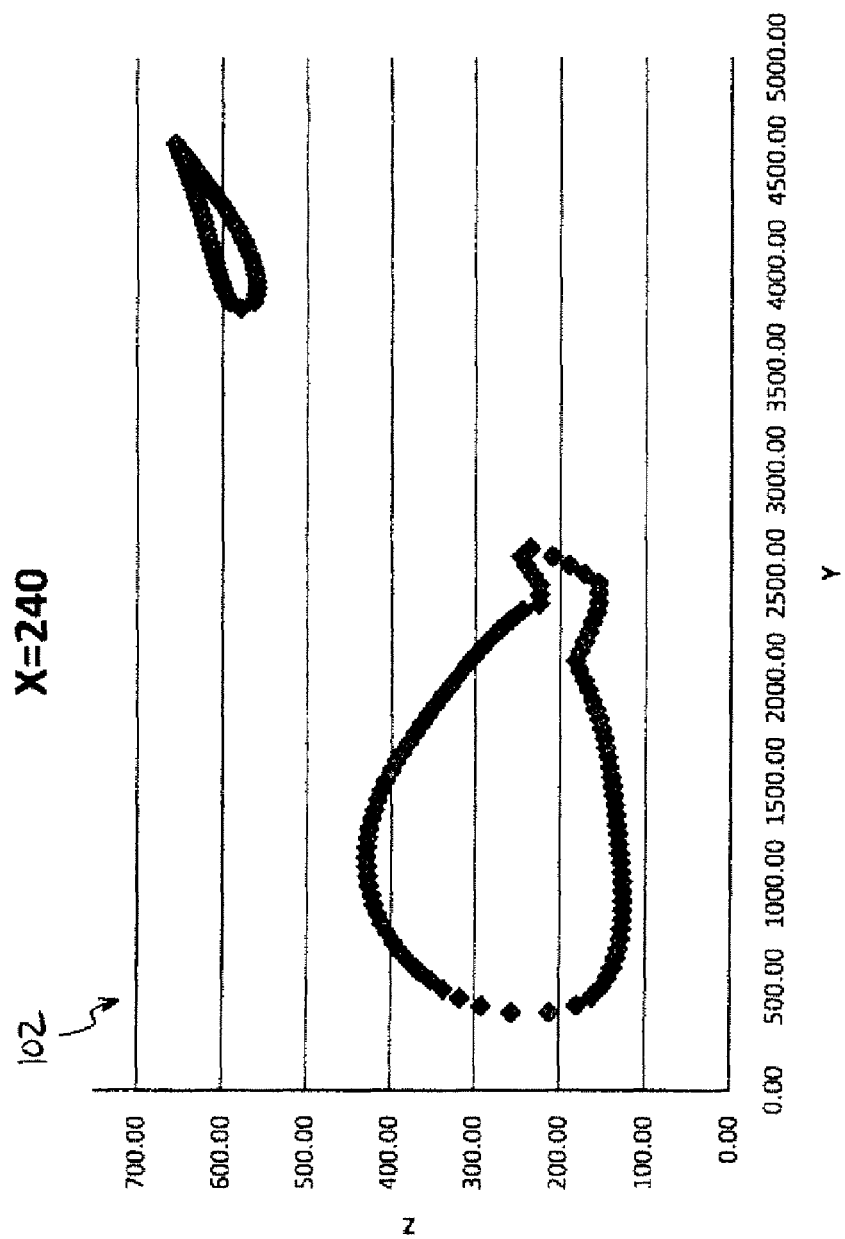
FIG. 7 is a graphical representation of Y and Z positions of upper and lower surfaces of the aircraft of FIG. 1 taken at an X position substantially equal to 240.0.

The upper and lower surfaces 28, 30 are defined at Y and Z positions corresponding substantially to the X position of 240.0, as shown in Table 2 and at 102 in FIG. 7.

TABLE 2

| Y | Z |
|---|---|
| 1008.69 | 127.06 |
| 1035.5 | 427.37 |
| 1055.31 | 127.7 |
| 1082.12 | 428.34 |
| 1101.92 | 128.52 |
| 1128.74 | 428.6 |
| 1148.53 | 129.52 |
| 1175.36 | 428.16 |
| 1195.14 | 130.67 |
| 1221.97 | 427.01 |
| 1241.75 | 131.9 |
| 1268.56 | 425.16 |
| 1288.36 | 133.13 |
| 1315.11 | 422.62 |
| 1334.97 | 134.31 |
| 1361.62 | 419.4 |
| 1381.58 | 135.49 |
| 1408.08 | 415.51 |
| 1428.18 | 136.76 |
| 1454.48 | 410.96 |
| 1474.78 | 138.17 |
| 1500.81 | 405.74 |
| 1521.38 | 139.78 |
| 1547.07 | 399.92 |
| 1567.97 | 141.55 |
| 1593.25 | 393.54 |
| 1614.55 | 143.52 |
| 1639.37 | 386.67 |
| 1661.12 | 145.73 |
| 1685.42 | 379.37 |
| 1707.68 | 148.24 |
| 1731.41 | 371.73 |
| 1754.21 | 151.1 |
| 1777.36 | 363.82 |
| 1800.72 | 154.39 |
| 1823.26 | 355.65 |
| 1847.19 | 158.14 |
| 1869.11 | 347.17 |
| 1893.62 | 162.36 |
| 1914.91 | 338.47 |
| 1940.02 | 166.93 |
| 1960.69 | 329.65 |
| 1986.38 | 171.86 |
| 2006.45 | 320.69 |

TABLE 2-continued

| Y | Z |
|---|---|
| 2032.7 | 177.22 |
| 2052.16 | 311.53 |
| 2078.96 | 181.86 |
| 2097.84 | 302.18 |
| 2125.33 | 176.99 |
| 2143.44 | 292.47 |
| 2171.7 | 172.12 |
| 2188.87 | 281.99 |
| 2218.07 | 167.24 |
| 2229.98 | 271.22 |
| 2264.44 | 162.37 |
| 2274.71 | 258.07 |
| 2310.8 | 157.5 |
| 2319.28 | 244.41 |
| 2348.36 | 224.64 |
| 2357.32 | 155.36 |
| 2394.98 | 224.64 |
| 2403.94 | 155.36 |
| 2441.61 | 224.64 |
| 2450.53 | 155.55 |
| 2487.43 | 232.42 |
| 2494.11 | 172.14 |
| 2533.33 | 240.64 |
| 2537.23 | 189.87 |
| 2579.49 | 209.55 |
| 2579.59 | 246.32 |
| 2617.72 | 235.62 |
| 375.12 | 256.43 |
| 375.38 | 211.58 |
| 3785.74 | 578.95 |
| 3812.53 | 591.49 |
| 3818.72 | 563.38 |
| 3844.17 | 595.82 |
| 3850.44 | 560.38 |
| 3875.93 | 599.02 |
| 3882.31 | 559.49 |
| 3907.76 | 601.6 |
| 3914.19 | 559.73 |
| 3939.6 | 603.87 |
| 3946.06 | 560.73 |
| 3971.45 | 606.08 |
| 3977.89 | 562.42 |
| 4003.3 | 608.33 |
| 4009.7 | 564.57 |
| 4035.15 | 610.63 |
| 4041.47 | 567.25 |
| 404.71 | 291.98 |
| 4066.99 | 612.96 |
| 4073.18 | 570.54 |
| 408.89 | 180.02 |
| 4098.83 | 615.3 |
| 4104.84 | 574.31 |
| 4130.68 | 617.66 |
| 4136.45 | 578.44 |
| 4162.52 | 620.02 |
| 4168.02 | 582.89 |
| 4194.36 | 622.41 |
| 4199.55 | 587.61 |
| 4226.19 | 624.81 |
| 4231.05 | 592.57 |
| 4258.03 | 627.25 |
| 4262.51 | 597.73 |
| 4289.86 | 629.73 |
| 4293.95 | 603.02 |
| 4321.69 | 632.26 |
| 4325.36 | 608.45 |
| 4353.51 | 634.85 |
| 4356.76 | 614.01 |
| 4385.33 | 637.5 |
| 4388.13 | 619.68 |
| 4417.14 | 640.23 |
| 4419.48 | 625.46 |
| 443.64 | 317.5 |
| 4448.95 | 643.04 |
| 4450.83 | 631.3 |
| 4480.74 | 645.95 |
| 4482.16 | 637.19 |
| 4512.52 | 649 |
| 4513.49 | 643.11 |
| 451.81 | 162.04 |
| 4544.29 | 652.24 |
| 4544.81 | 649.04 |
| 4576.04 | 655.48 |
| 485.93 | 337.08 |
| 497.07 | 150.97 |
| 529.74 | 353.01 |
| 543.1 | 143.56 |
| 574.36 | 366.5 |
| 589.41 | 138.24 |
| 619.51 | 378.1 |
| 635.87 | 134.33 |
| 665.05 | 388.12 |
| 682.41 | 131.46 |
| 710.86 | 396.76 |
| 728.98 | 129.39 |
| 756.89 | 404.15 |
| 775.58 | 127.96 |
| 803.09 | 410.42 |
| 822.2 | 127.05 |
| 849.42 | 415.64 |
| 868.82 | 126.58 |
| 895.85 | 419.88 |
| 915.44 | 126.47 |
| 942.36 | 423.21 |
| 962.07 | 126.64 |
| 988.91 | 425.68 |

Figure 8:
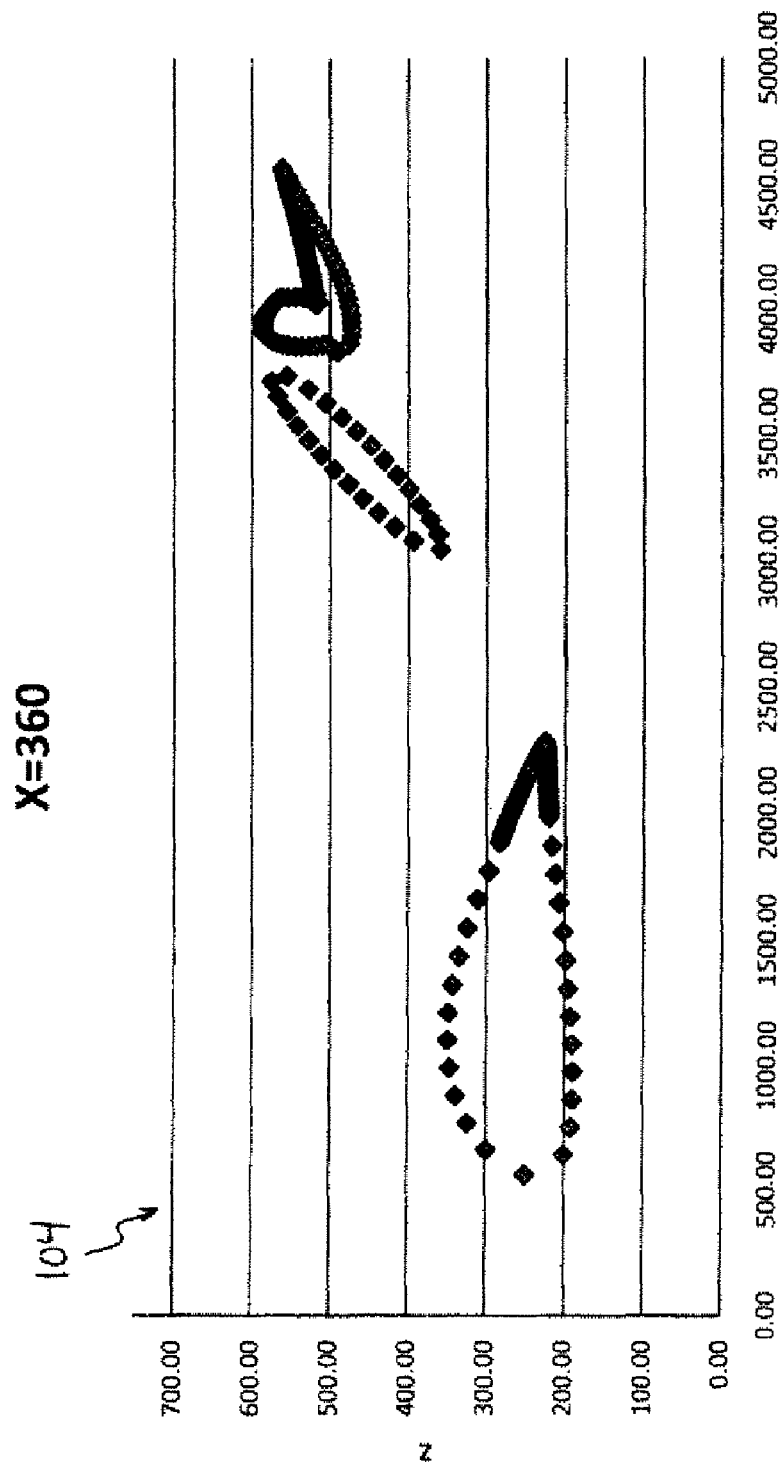
FIG. 8 is a graphical representation of Y and Z positions of upper and lower surfaces of the aircraft of FIG. 1 taken at an X position substantially equal to 360.0.

The upper and lower surfaces 28, 30 are defined at Y and Z positions corresponding substantially to the X position of 360.0, as shown in Table 3 and at 104 in FIG. 8.

TABLE 3

| Y | Z |
|---|---|
| 1086.84 | 190.93 |
| 1102.24 | 349.39 |
| 1198.8 | 193.2 |
| 1214.21 | 348.27 |
| 1310.75 | 195.91 |
| 1326.09 | 343.42 |
| 1422.7 | 198.87 |
| 1437.77 | 335.26 |
| 1534.62 | 202.55 |
| 1549.19 | 324.11 |
| 1646.51 | 207.09 |
| 1660.41 | 311.04 |
| 1758.38 | 212.21 |
| 1771.53 | 297.17 |
| 1870.25 | 217.19 |
| 1882.71 | 283.67 |
| 1898.79 | 281.75 |
| 1914.87 | 279.8 |
| 1930.94 | 277.82 |
| 1947.01 | 275.81 |
| 1963.08 | 273.77 |
| 1979.14 | 271.69 |
| 1982.18 | 220.41 |
| 1994.25 | 220.57 |
| 1995.2 | 269.58 |
| 2006.3 | 220.73 |
| 2011.25 | 267.45 |
| 2018.35 | 220.89 |
| 2027.3 | 265.29 |
| 2030.4 | 221.06 |
| 2042.44 | 221.23 |
| 2043.35 | 263.11 |
| 2054.49 | 221.41 |
| 2059.39 | 260.89 |
| 2066.54 | 221.59 |
| 2075.43 | 258.65 |
| 2078.58 | 221.78 |
| 2090.63 | 221.97 |
| 2091.46 | 256.38 |

TABLE 3-continued

| Y | Z |
|---|---|
| 2102.68 | 222.16 |
| 2107.49 | 254.08 |
| 2114.72 | 222.36 |
| 2123.52 | 251.74 |
| 2126.77 | 222.57 |
| 2138.82 | 222.79 |
| 2139.54 | 249.35 |
| 2150.86 | 223.01 |
| 2155.55 | 246.93 |
| 2162.91 | 223.25 |
| 2171.56 | 244.47 |
| 2174.96 | 223.49 |
| 2187 | 223.73 |
| 2187.56 | 241.96 |
| 2199.05 | 223.96 |
| 2203.55 | 239.41 |
| 2211.1 | 224.17 |
| 2219.53 | 236.81 |
| 2223.14 | 224.35 |
| 2235.19 | 224.53 |
| 2235.51 | 234.15 |
| 2247.24 | 224.76 |
| 2251.48 | 231.44 |
| 2259.28 | 225 |
| 2267.43 | 228.68 |
| 2271.33 | 225.19 |
| 2283.38 | 225.34 |
| 3048.66 | 358.95 |
| 3081.81 | 392.98 |
| 3107.69 | 361.82 |
| 3136.06 | 416.99 |
| 3166.11 | 372.19 |
| 3191.42 | 438.32 |
| 3224.07 | 384.89 |
| 3247.35 | 458.1 |
| 3281.7 | 399.03 |
| 3303.68 | 476.74 |
| 3339.04 | 414.27 |
| 3360.32 | 494.4 |
| 3396.12 | 430.48 |
| 3417.24 | 511.15 |
| 3452.93 | 447.6 |
| 3474.42 | 526.97 |
| 3509.45 | 465.66 |
| 3531.88 | 541.76 |
| 3565.62 | 484.79 |
| 3589.64 | 555.29 |
| 3621.32 | 505.25 |
| 3647.8 | 567.02 |
| 3676.23 | 527.69 |
| 3706.54 | 575.16 |
| 3728.99 | 554.71 |
| 3826.84 | 489.85 |
| 3832.12 | 496.49 |
| 3840.92 | 499.08 |
| 3847.1 | 535.94 |
| 3847.74 | 526.8 |
| 3848.05 | 545.04 |
| 3849.86 | 517.9 |
| 3849.91 | 500.87 |
| 3850.83 | 553.76 |
| 3853.66 | 509.57 |
| 3855.48 | 561.64 |
| 3857.12 | 475.49 |
| 3858.96 | 502.36 |
| 3861.71 | 568.34 |
| 3869.1 | 573.75 |
| 3877.22 | 577.98 |
| 3885.81 | 581.18 |
| 3886.67 | 472.77 |
| 3894.67 | 583.54 |
| 3903.68 | 585.18 |
| 3912.79 | 586.24 |
| 3916.34 | 472.11 |
| 3921.94 | 586.79 |
| 3931.11 | 586.9 |
| 3940.27 | 586.64 |
| 3946.02 | 472.46 |
| 3949.42 | 586.05 |
| 3958.54 | 585.16 |
| 3967.64 | 584 |
| 3975.68 | 473.52 |
| 3976.7 | 582.6 |
| 3985.72 | 580.97 |
| 3994.7 | 579.14 |
| 4003.64 | 577.12 |
| 4005.32 | 475.08 |
| 4012.54 | 574.92 |
| 4017.44 | 517.03 |
| 4021.4 | 572.55 |
| 4023.21 | 516.81 |
| 4025.68 | 521.05 |
| 4030.21 | 570.02 |
| 4032.35 | 517.48 |
| 4033.84 | 525.22 |
| 4034.93 | 477.15 |
| 4038.98 | 567.34 |
| 4041.49 | 518.14 |
| 4041.93 | 529.53 |
| 4045.14 | 562.47 |
| 4046.03 | 553.34 |
| 4046.92 | 544.22 |
| 4047.81 | 535.09 |
| 4050.64 | 518.81 |
| 4059.78 | 519.47 |
| 4064.51 | 479.52 |
| 4068.92 | 520.14 |
| 4078.07 | 520.8 |
| 4087.21 | 521.46 |
| 4094.05 | 482.41 |
| 4096.36 | 522.12 |
| 4105.5 | 522.79 |
| 4114.64 | 523.46 |
| 4123.54 | 485.79 |
| 4123.79 | 524.12 |
| 4132.93 | 524.79 |
| 4142.07 | 525.47 |
| 4151.22 | 526.14 |
| 4152.98 | 489.55 |
| 4160.36 | 526.82 |
| 4169.5 | 527.51 |
| 4178.64 | 528.19 |
| 4182.39 | 493.62 |
| 4187.79 | 528.87 |
| 4196.93 | 529.56 |
| 4206.07 | 530.25 |
| 4211.75 | 497.96 |
| 4215.21 | 530.94 |
| 4224.35 | 531.63 |
| 4233.49 | 532.32 |
| 4241.07 | 502.55 |
| 4242.64 | 533.02 |
| 4251.78 | 533.71 |
| 4260.92 | 534.41 |
| 4270.06 | 535.12 |
| 4270.36 | 507.33 |
| 4279.2 | 535.83 |
| 4288.34 | 536.54 |
| 4297.48 | 537.26 |
| 4299.63 | 512.26 |
| 4306.62 | 537.98 |
| 4315.76 | 538.71 |
| 4324.9 | 539.45 |
| 4328.88 | 517.33 |
| 4334.03 | 540.19 |
| 4343.17 | 540.93 |
| 4352.31 | 541.68 |
| 4358.11 | 522.51 |
| 4361.44 | 542.44 |
| 4370.58 | 543.2 |
| 4379.72 | 543.97 |
| 4387.31 | 527.8 |
| 4388.85 | 544.75 |
| 4397.99 | 545.53 |
| 4407.12 | 546.32 |
| 4416.25 | 547.11 |

TABLE 3-continued

| Y | Z |
|---|---|
| 4416.5 | 533.19 |
| 4425.39 | 547.92 |
| 4434.52 | 548.73 |
| 4443.65 | 549.55 |
| 4445.68 | 538.63 |
| 4452.78 | 550.38 |
| 4461.91 | 551.21 |
| 4471.04 | 552.06 |
| 4474.85 | 544.1 |
| 4480.17 | 552.91 |
| 4489.29 | 553.77 |
| 4498.42 | 554.65 |
| 4504.02 | 549.59 |
| 4507.54 | 555.54 |
| 4516.66 | 556.5 |
| 4525.78 | 557.42 |
| 4533.18 | 555.15 |
| 4534.9 | 558.35 |
| 4544.02 | 559.3 |
| 4553.13 | 560.29 |
| 4562.25 | 561.12 |
| 559.57 | 250.22 |
| 639.33 | 201.09 |
| 658.26 | 300.04 |
| 750.95 | 192.4 |
| 767.61 | 323.9 |
| 862.89 | 189.6 |
| 878.62 | 338.46 |
| 974.87 | 189.52 |
| 990.3 | 346.44 |

Figure 9:
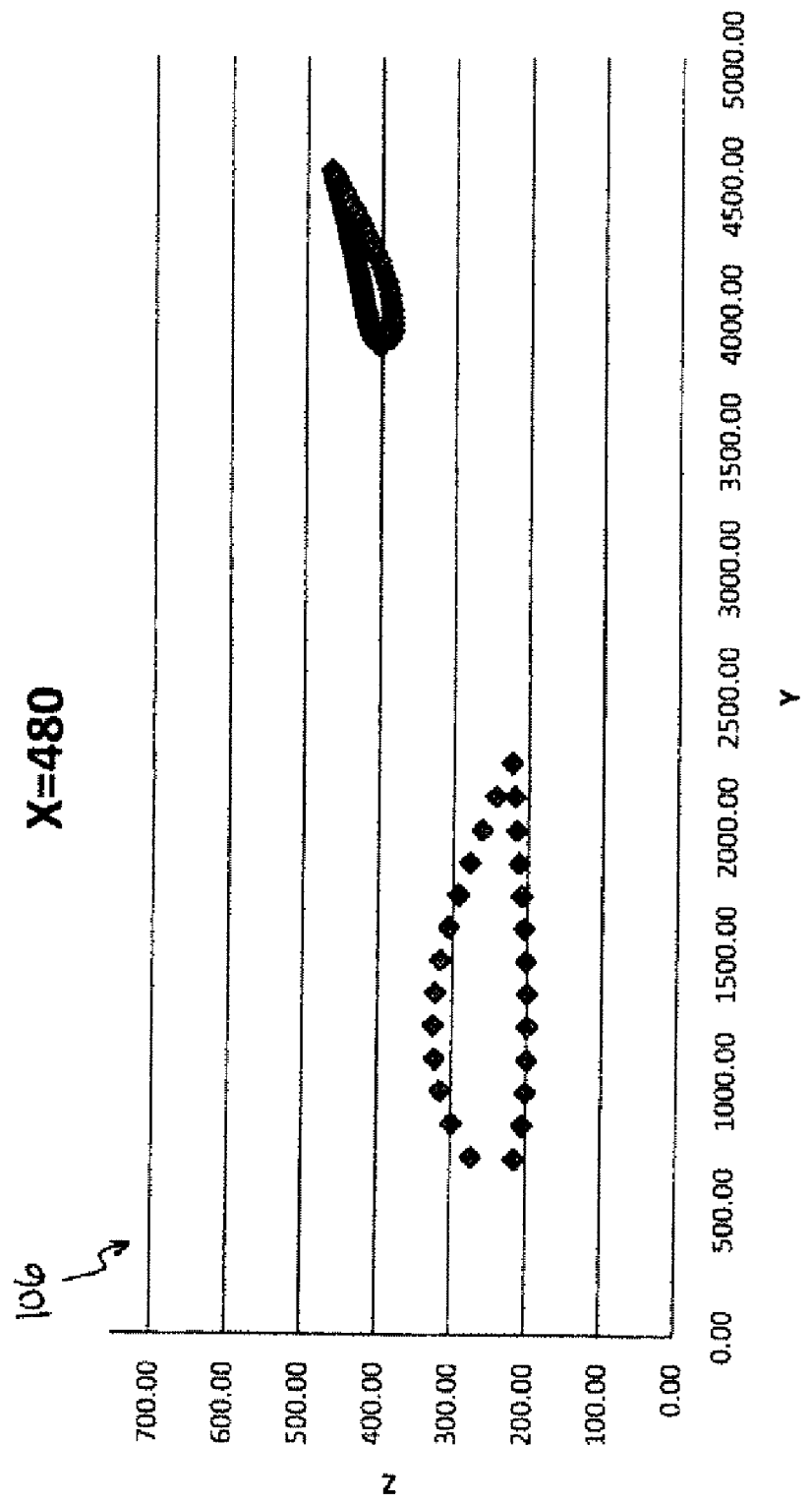
FIG. 9 is a graphical representation of Y and Z positions of upper and lower surfaces of the aircraft of FIG. 1 taken at an X position substantially equal to 480.0.

The upper and lower surfaces 28, 30 are defined at Y and Z positions corresponding substantially to the X position of 480.0, as shown in Table 4 and at 106 in FIG. 9.

TABLE 4

| Y | Z |
|---|---|
| 1077.08 | 199.89 |
| 1082.96 | 322.95 |
| 1206.22 | 199.56 |
| 1212.07 | 325.39 |
| 1335.36 | 200.25 |
| 1341.18 | 322.85 |
| 1464.49 | 201.92 |
| 1470.13 | 315.91 |
| 1593.6 | 204.67 |
| 1598.83 | 305.33 |
| 1722.69 | 208.38 |
| 1727.32 | 292.36 |
| 1851.78 | 211.95 |
| 1855.65 | 277.99 |
| 1980.88 | 214.94 |
| 1983.77 | 261.74 |
| 2109.98 | 218.44 |
| 2111.6 | 243.44 |
| 2239.06 | 222.4 |
| 3867.94 | 400.76 |
| 3871.64 | 405.98 |
| 3878.13 | 408.22 |
| 3884.81 | 409.8 |
| 3891.56 | 411.11 |
| 3895.51 | 387.56 |
| 3898.33 | 412.24 |
| 3905.13 | 413.23 |
| 3911.94 | 414.1 |
| 3918.76 | 414.91 |
| 3922.87 | 385 |
| 3925.59 | 415.68 |
| 3932.42 | 416.38 |
| 3939.25 | 417.04 |
| 3946.09 | 417.66 |
| 3950.34 | 384.38 |
| 3952.94 | 418.25 |
| 3959.78 | 418.83 |

TABLE 4-continued

| Y | Z |
|---|---|
| 3966.63 | 419.39 |
| 3973.47 | 419.94 |
| 3977.82 | 384.81 |
| 3980.32 | 420.49 |
| 3987.17 | 421.03 |
| 3994.01 | 421.57 |
| 4000.86 | 422.1 |
| 4005.28 | 385.91 |
| 4007.71 | 422.62 |
| 4014.56 | 423.15 |
| 4021.41 | 423.67 |
| 4028.25 | 424.19 |
| 4032.72 | 387.49 |
| 4035.1 | 424.71 |
| 4041.95 | 425.22 |
| 4048.8 | 425.72 |
| 4055.65 | 426.22 |
| 4060.13 | 389.44 |
| 4062.5 | 426.72 |
| 4069.35 | 427.21 |
| 4076.2 | 427.7 |
| 4083.05 | 428.19 |
| 4087.52 | 391.73 |
| 4089.91 | 428.68 |
| 4096.76 | 429.17 |
| 4103.61 | 429.66 |
| 4110.46 | 430.15 |
| 4114.89 | 394.28 |
| 4117.31 | 430.64 |
| 4124.16 | 431.14 |
| 4131.01 | 431.63 |
| 4137.86 | 432.13 |
| 4142.21 | 397.27 |
| 4144.71 | 432.63 |
| 4151.56 | 433.14 |
| 4158.41 | 433.64 |
| 4165.26 | 434.15 |
| 4169.48 | 400.66 |
| 4172.11 | 434.66 |
| 4178.96 | 435.17 |
| 4185.81 | 435.69 |
| 4192.65 | 436.2 |
| 4196.72 | 404.35 |
| 4199.5 | 436.71 |
| 4206.35 | 437.23 |
| 4213.2 | 437.74 |
| 4220.05 | 438.26 |
| 4223.91 | 408.31 |
| 4226.9 | 438.78 |
| 4233.75 | 439.29 |
| 4240.6 | 439.81 |
| 4247.44 | 440.33 |
| 4251.07 | 412.53 |
| 4254.29 | 440.85 |
| 4261.14 | 441.38 |
| 4267.99 | 441.9 |
| 4274.84 | 442.43 |
| 4278.2 | 416.94 |
| 4281.69 | 442.96 |
| 4288.53 | 443.49 |
| 4295.38 | 444.03 |
| 4302.23 | 444.57 |
| 4305.3 | 421.5 |
| 4309.07 | 445.11 |
| 4315.92 | 445.66 |
| 4322.77 | 446.2 |
| 4329.61 | 446.76 |
| 4332.38 | 426.19 |
| 4336.46 | 447.31 |
| 4343.3 | 447.87 |
| 4350.15 | 448.43 |
| 4356.99 | 449 |
| 4359.44 | 431 |
| 4363.84 | 449.57 |
| 4370.68 | 450.14 |
| 4377.53 | 450.72 |
| 4384.37 | 451.3 |
| 4386.48 | 435.92 |

TABLE 4-continued

| Y | Z |
| --- | --- |
| 4391.21 | 451.89 |
| 4398.06 | 452.48 |
| 4404.9 | 453.07 |
| 4411.74 | 453.67 |
| 4413.51 | 440.91 |
| 4418.58 | 454.27 |
| 4425.43 | 454.87 |
| 4432.27 | 455.48 |
| 4439.11 | 456.1 |
| 4440.53 | 445.93 |
| 4445.95 | 456.73 |
| 4452.79 | 457.36 |
| 4459.62 | 457.99 |
| 4466.46 | 458.63 |
| 4467.54 | 450.99 |
| 4473.3 | 459.27 |
| 4480.14 | 459.92 |
| 4486.98 | 460.57 |
| 4493.81 | 461.23 |
| 4494.55 | 456.08 |
| 4500.65 | 461.9 |
| 4507.48 | 462.63 |
| 4514.31 | 463.31 |
| 4521.14 | 464.01 |
| 4521.54 | 461.25 |
| 4527.98 | 464.71 |
| 4534.81 | 465.43 |
| 4541.64 | 466.17 |
| 4548.47 | 466.77 |
| 690.16 | 215.29 |
| 699.61 | 273.01 |
| 818.87 | 205.28 |
| 825.87 | 299.61 |
| 947.95 | 201.53 |
| 954.09 | 314.78 |

Figure 10:
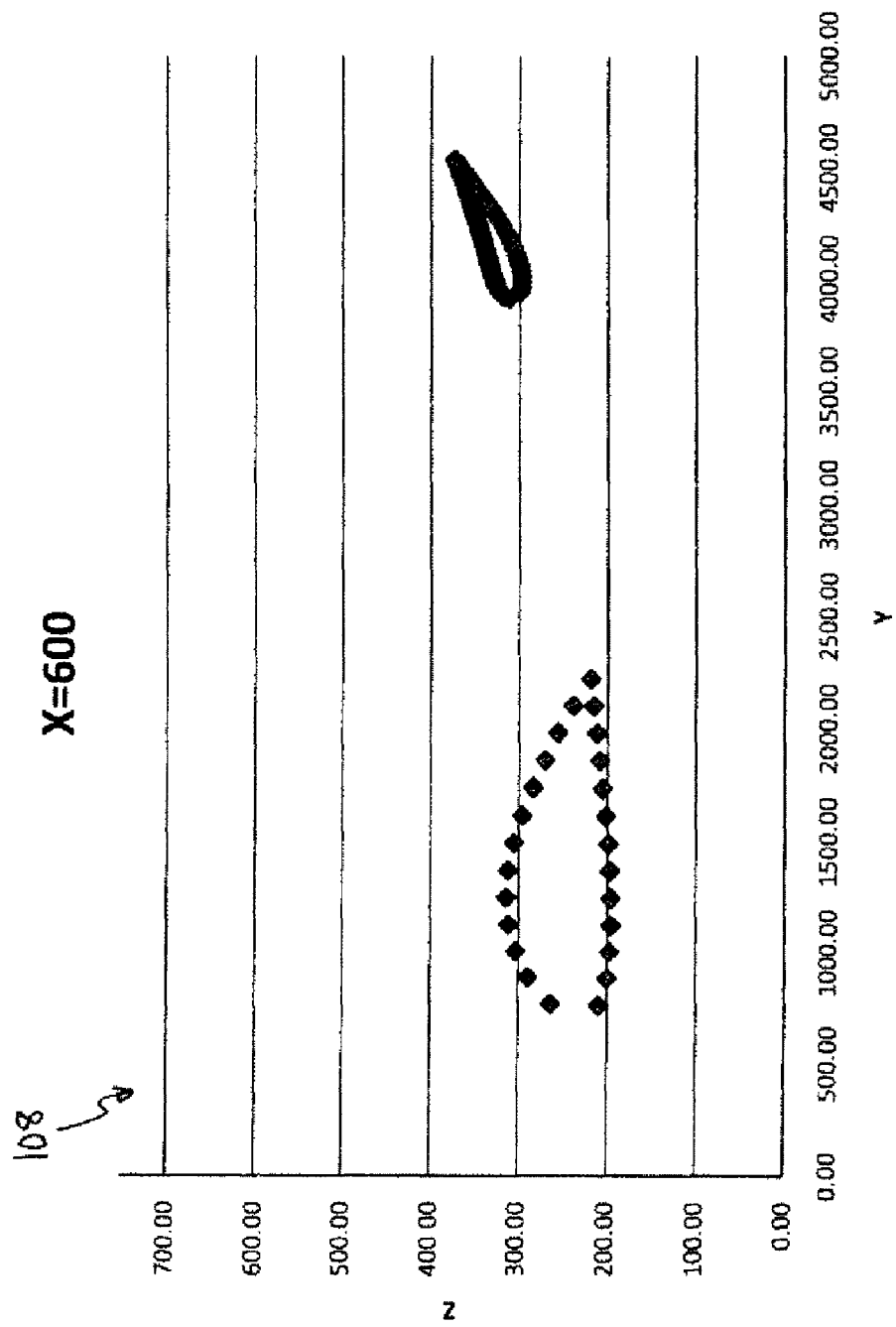
FIG. 10 is a graphical representation of Y and Z positions of upper and lower surfaces of the aircraft of FIG. 1 taken at an X position substantially equal to 600.0.

The upper and lower surfaces 28, 30 are defined at Y and Z positions corresponding substantially to the X position of 600.0, as shown in Table 5 and at 108 in FIG. 10.

TABLE 5

| Y | Z |
| --- | --- |
| 1002.53 | 196.57 |
| 1008.08 | 303 |
| 1124.05 | 195.41 |
| 1129.33 | 310.96 |
| 1245.58 | 195.46 |
| 1250.83 | 313.53 |
| 1367.11 | 196.43 |
| 1372.33 | 311.41 |
| 1488.62 | 198.3 |
| 1493.7 | 305.16 |
| 1610.12 | 201.16 |
| 1614.84 | 295.48 |
| 1731.59 | 204.88 |
| 1735.78 | 283.56 |
| 1853.07 | 208.45 |
| 1856.59 | 270.31 |
| 1974.56 | 211.45 |
| 1977.18 | 255.29 |
| 2096.04 | 214.92 |
| 2097.53 | 238.35 |
| 2217.51 | 218.79 |
| 3909.04 | 311.66 |
| 3912.74 | 316.21 |
| 3918.68 | 318.32 |
| 3924.8 | 319.87 |
| 3930.99 | 321.12 |
| 3933.9 | 299.62 |
| 3937.21 | 322.15 |
| 3943.46 | 323.04 |
| 3949.72 | 323.86 |
| 3955.99 | 324.61 |
| 3959.06 | 297.15 |

TABLE 5-continued

| Y | Z |
| --- | --- |
| 3962.26 | 325.29 |
| 3968.54 | 325.93 |
| 3974.83 | 326.54 |
| 3981.11 | 327.12 |
| 3984.33 | 296.48 |
| 3987.4 | 327.69 |
| 3993.69 | 328.25 |
| 3999.97 | 328.8 |
| 4006.26 | 329.34 |
| 4009.62 | 296.89 |
| 4012.55 | 329.86 |
| 4018.84 | 330.38 |
| 4025.13 | 330.89 |
| 4031.43 | 331.39 |
| 4034.88 | 297.89 |
| 4037.72 | 331.89 |
| 4044.01 | 332.38 |
| 4050.31 | 332.86 |
| 4056.6 | 333.33 |
| 4060.12 | 299.45 |
| 4062.89 | 333.8 |
| 4069.19 | 334.25 |
| 4075.49 | 334.7 |
| 4081.78 | 335.15 |
| 4085.34 | 301.39 |
| 4088.08 | 335.59 |
| 4094.37 | 336.04 |
| 4100.67 | 336.48 |
| 4106.97 | 336.92 |
| 4110.53 | 303.61 |
| 4113.26 | 337.36 |
| 4119.56 | 337.81 |
| 4125.86 | 338.25 |
| 4132.15 | 338.7 |
| 4135.7 | 306.06 |
| 4138.45 | 339.16 |
| 4144.74 | 339.61 |
| 4151.04 | 340.07 |
| 4157.33 | 340.53 |
| 4160.84 | 308.72 |
| 4163.63 | 341 |
| 4169.92 | 341.46 |
| 4176.22 | 341.93 |
| 4182.51 | 342.4 |
| 4185.95 | 311.75 |
| 4188.81 | 342.87 |
| 4195.1 | 343.34 |
| 4201.4 | 343.82 |
| 4207.69 | 344.29 |
| 4211.02 | 315.08 |
| 4213.98 | 344.76 |
| 4220.28 | 345.23 |
| 4226.57 | 345.71 |
| 4232.87 | 346.18 |
| 4236.05 | 318.67 |
| 4239.16 | 346.66 |
| 4245.46 | 347.13 |
| 4251.75 | 347.61 |
| 4258.04 | 348.09 |
| 4261.04 | 322.5 |
| 4264.34 | 348.57 |
| 4270.63 | 349.05 |
| 4276.92 | 349.53 |
| 4283.22 | 350.02 |
| 4286.01 | 326.54 |
| 4289.51 | 350.51 |
| 4295.8 | 351 |
| 4302.1 | 351.49 |
| 4308.39 | 351.99 |
| 4310.95 | 330.73 |
| 4314.68 | 352.49 |
| 4320.97 | 352.99 |
| 4327.26 | 353.49 |
| 4333.56 | 354 |
| 4335.86 | 335.06 |
| 4339.85 | 354.51 |
| 4346.14 | 355.02 |
| 4352.43 | 355.54 |

TABLE 5-continued

| Y | Z |
|---|---|
| 4358.72 | 356.06 |
| 4360.76 | 339.5 |
| 4365.01 | 356.59 |
| 4371.3 | 357.12 |
| 4377.59 | 357.65 |
| 4383.88 | 358.18 |
| 4385.64 | 344.03 |
| 4390.17 | 358.72 |
| 4396.46 | 359.26 |
| 4402.74 | 359.81 |
| 4409.03 | 360.36 |
| 4410.51 | 348.61 |
| 4415.32 | 360.92 |
| 4421.61 | 361.48 |
| 4427.89 | 362.04 |
| 4434.18 | 362.6 |
| 4435.37 | 353.22 |
| 4440.47 | 363.18 |
| 4446.75 | 363.76 |
| 4453.04 | 364.35 |
| 4459.32 | 364.95 |
| 4460.22 | 357.88 |
| 4465.6 | 365.54 |
| 4471.89 | 366.14 |
| 4478.17 | 366.74 |
| 4484.45 | 367.34 |
| 4485.07 | 362.58 |
| 4490.73 | 367.96 |
| 4497.02 | 368.59 |
| 4503.29 | 369.25 |
| 4509.57 | 369.89 |
| 4509.91 | 367.32 |
| 4515.85 | 370.54 |
| 4522.13 | 371.19 |
| 4528.4 | 371.88 |
| 4534.68 | 372.41 |
| 759.89 | 208.82 |
| 768.68 | 263.12 |
| 881.04 | 199.75 |
| 887.44 | 288.44 |

Figure 11:
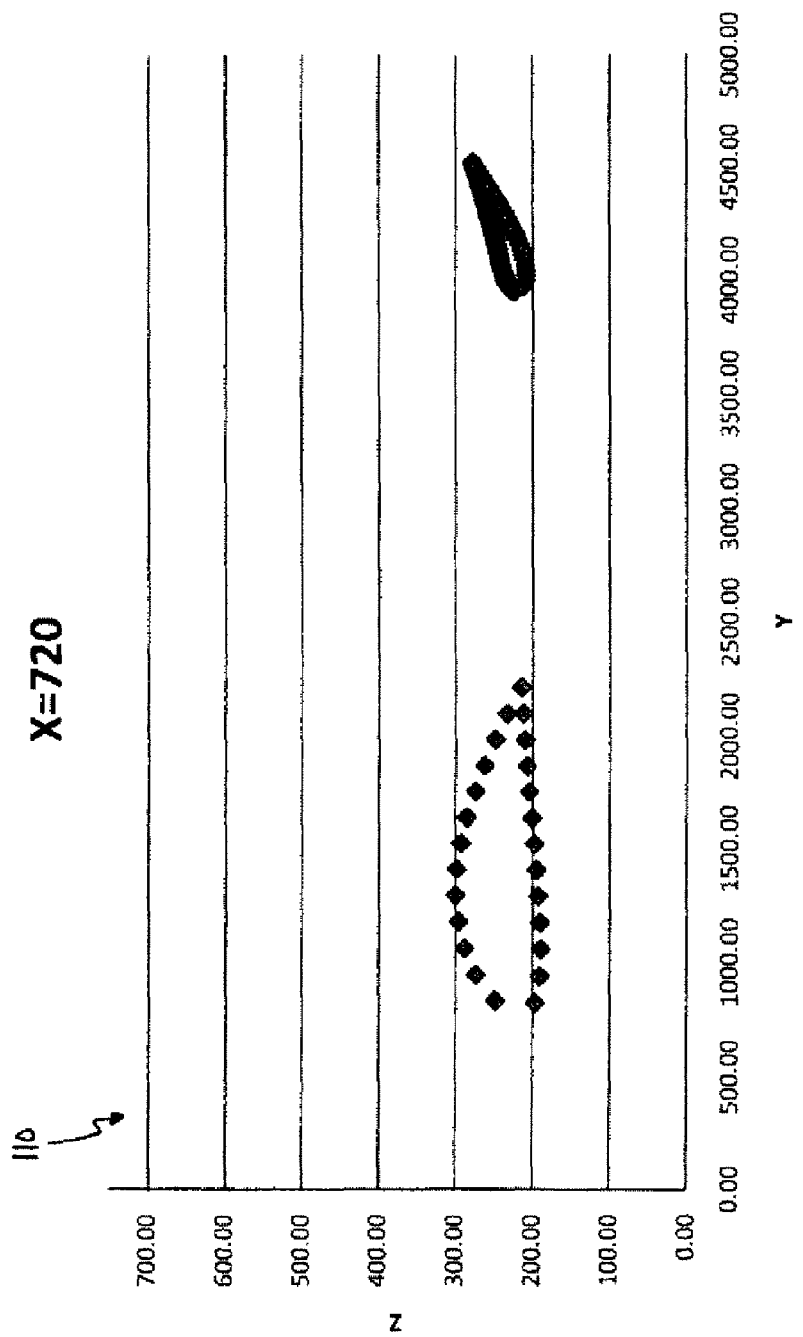
FIG. 11 is a graphical representation of Y and Z positions of upper and lower surfaces of the aircraft of FIG. 1 taken at an X position substantially equal to 720.0.

The upper and lower surfaces 28, 30 are defined at Y and Z positions corresponding substantially to the X position of 720.0, as shown in Table 6 and at 110 in FIG. 11.

TABLE 6

| Y | Z |
|---|---|
| 1057.5 | 189.57 |
| 1062.37 | 288.34 |
| 1173.27 | 190.72 |
| 1177.84 | 296.68 |
| 1289.03 | 192.65 |
| 1293.56 | 299.84 |
| 1404.79 | 194.98 |
| 1409.32 | 298.43 |
| 1520.53 | 197.72 |
| 1524.98 | 293.14 |
| 1636.26 | 200.95 |
| 1640.44 | 284.67 |
| 1751.98 | 204.55 |
| 1755.73 | 274.07 |
| 1867.72 | 207.66 |
| 1870.89 | 262.15 |
| 1983.47 | 209.9 |
| 1985.86 | 248.54 |
| 2099.23 | 212.16 |
| 2100.61 | 233.12 |
| 2214.98 | 214.62 |
| 3950.14 | 222.57 |
| 3953.72 | 226.6 |
| 3959.07 | 228.71 |
| 3964.63 | 230.2 |
| 3970.28 | 231.29 |
| 3972.28 | 211.68 |

TABLE 6-continued

| Y | Z |
|---|---|
| 3975.97 | 232.22 |
| 3981.66 | 233.04 |
| 3987.38 | 233.76 |
| 3993.09 | 234.43 |
| 3995.23 | 209.25 |
| 3998.82 | 235.05 |
| 4004.54 | 235.65 |
| 4010.27 | 236.23 |
| 4016 | 236.8 |
| 4018.31 | 208.5 |
| 4021.73 | 237.35 |
| 4027.46 | 237.88 |
| 4033.2 | 238.38 |
| 4038.93 | 238.88 |
| 4041.41 | 208.72 |
| 4044.67 | 239.37 |
| 4050.41 | 239.84 |
| 4056.14 | 240.31 |
| 4061.88 | 240.75 |
| 4064.48 | 209.63 |
| 4067.63 | 241.19 |
| 4073.37 | 241.61 |
| 4079.11 | 242.02 |
| 4084.85 | 242.43 |
| 4087.54 | 210.97 |
| 4090.59 | 242.83 |
| 4096.34 | 243.22 |
| 4102.08 | 243.62 |
| 4107.82 | 244.01 |
| 4110.56 | 212.81 |
| 4113.57 | 244.41 |
| 4119.31 | 244.8 |
| 4125.05 | 245.2 |
| 4130.8 | 245.61 |
| 4133.55 | 214.98 |
| 4136.54 | 246.01 |
| 4142.28 | 246.42 |
| 4148.03 | 246.83 |
| 4153.77 | 247.24 |
| 4156.52 | 217.39 |
| 4159.51 | 247.66 |
| 4165.25 | 248.08 |
| 4170.99 | 248.51 |
| 4176.73 | 248.93 |
| 4179.47 | 219.98 |
| 4182.47 | 249.36 |
| 4188.22 | 249.79 |
| 4193.96 | 250.22 |
| 4199.7 | 250.65 |
| 4202.4 | 222.74 |
| 4205.44 | 251.08 |
| 4211.18 | 251.51 |
| 4216.92 | 251.94 |
| 4222.66 | 252.37 |
| 4225.3 | 225.75 |
| 4228.4 | 252.8 |
| 4234.14 | 253.23 |
| 4239.88 | 253.67 |
| 4245.62 | 254.1 |
| 4248.16 | 229.01 |
| 4251.36 | 254.53 |
| 4257.1 | 254.97 |
| 4262.84 | 255.4 |
| 4268.59 | 255.84 |
| 4270.99 | 232.47 |
| 4274.33 | 256.28 |
| 4280.07 | 256.72 |
| 4285.81 | 257.16 |
| 4291.55 | 257.61 |
| 4293.8 | 236.14 |
| 4297.29 | 258.05 |
| 4303.02 | 258.5 |
| 4308.76 | 258.95 |
| 4314.5 | 259.4 |
| 4316.57 | 239.96 |
| 4320.24 | 259.86 |
| 4325.98 | 260.31 |
| 4331.72 | 260.77 |

TABLE 6-continued

| Y | Z |
| --- | --- |
| 4337.46 | 261.24 |
| 4339.32 | 243.92 |
| 4343.2 | 261.7 |
| 4348.93 | 262.17 |
| 4354.67 | 262.64 |
| 4360.41 | 263.12 |
| 4362.06 | 247.98 |
| 4366.15 | 263.6 |
| 4371.88 | 264.08 |
| 4377.62 | 264.56 |
| 4383.36 | 265.05 |
| 4384.78 | 252.11 |
| 4389.09 | 265.54 |
| 4394.83 | 266.04 |
| 4400.56 | 266.54 |
| 4406.3 | 267.04 |
| 4407.5 | 256.29 |
| 4412.03 | 267.55 |
| 4417.77 | 268.06 |
| 4423.5 | 268.57 |
| 4429.23 | 269.09 |
| 4430.2 | 260.5 |
| 4434.97 | 269.61 |
| 4440.7 | 270.14 |
| 4446.43 | 270.67 |
| 4452.16 | 271.22 |
| 4452.9 | 264.77 |
| 4457.89 | 271.77 |
| 4463.62 | 272.33 |
| 4469.35 | 272.89 |
| 4475.08 | 273.45 |
| 4475.59 | 269.09 |
| 4480.81 | 274.01 |
| 4486.54 | 274.58 |
| 4492.27 | 275.16 |
| 4497.99 | 275.77 |
| 4498.28 | 273.39 |
| 4503.72 | 276.36 |
| 4509.45 | 276.96 |
| 4515.17 | 277.58 |
| 4520.9 | 278.06 |
| 826.19 | 197.36 |
| 834.61 | 248.63 |
| 941.73 | 190.57 |
| 947.55 | 273.66 |

Figure 12:
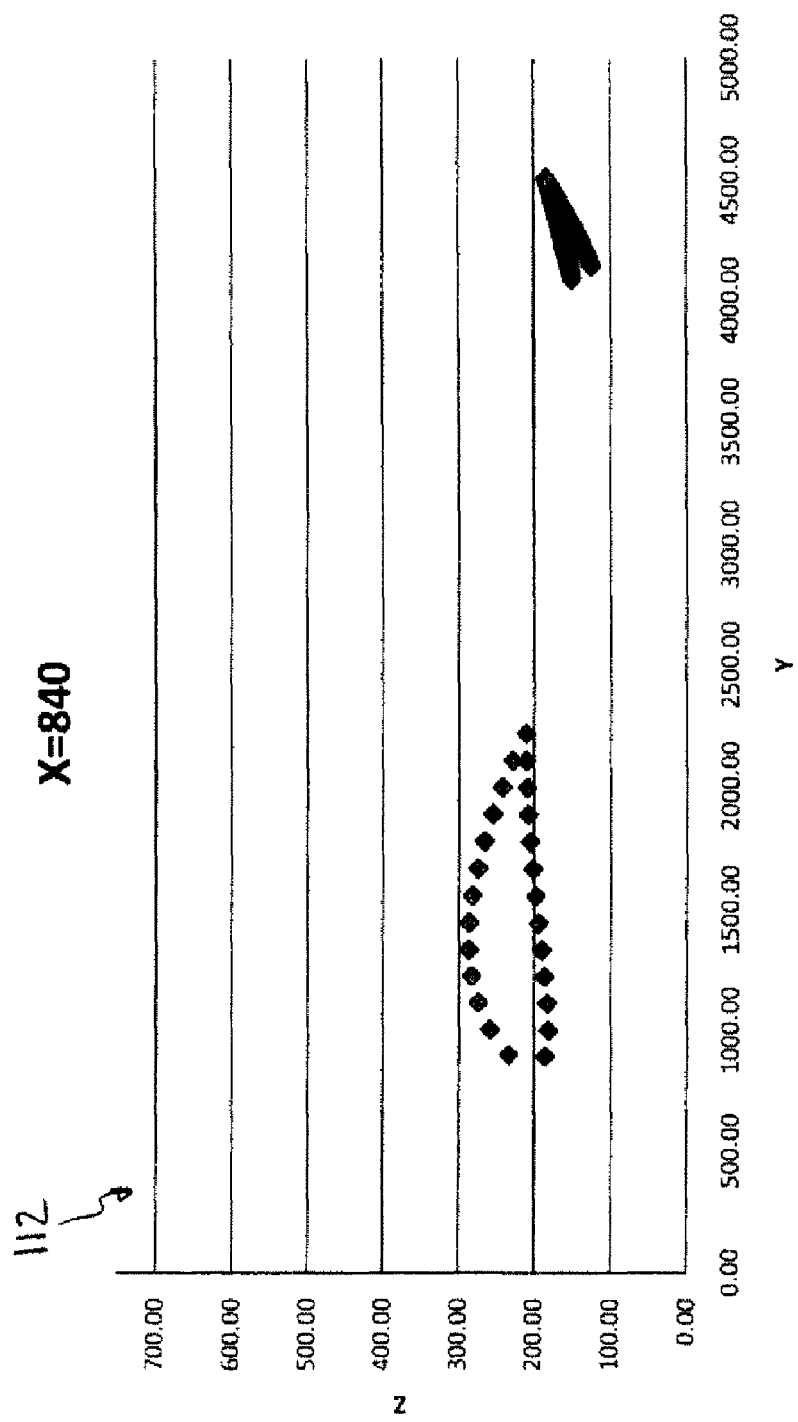
FIG. 12 is a graphical representation of Y and Z positions of upper and lower surfaces of the aircraft of FIG. 1 taken at an X position substantially equal to 840.0.

The upper and lower surfaces 28, 30 are defined at Y and Z positions corresponding substantially to the X position of 840.0, as shown in Table 7 and at 112 in FIG. 12.

TABLE 7

| Y | Z |
| --- | --- |
| 1002.27 | 180.87 |
| 1007.37 | 258.37 |
| 1112.55 | 182.29 |
| 1116.63 | 273.28 |
| 1222.79 | 186.01 |
| 1226.56 | 282.08 |
| 1333.01 | 190.03 |
| 1336.78 | 285.9 |
| 1443.24 | 193.86 |
| 1447.07 | 285.24 |
| 1553.47 | 197.56 |
| 1557.28 | 280.96 |
| 1663.71 | 201.2 |
| 1667.34 | 273.74 |
| 1773.95 | 204.66 |
| 1777.24 | 264.5 |
| 1884.22 | 207.25 |
| 1887.03 | 253.94 |
| 1994.5 | 208.61 |
| 1996.65 | 241.75 |
| 2104.8 | 209.51 |
| 2106.07 | 227.88 |

TABLE 7-continued

| Y | Z |
| --- | --- |
| 2215.09 | 210.38 |
| 4086.08 | 149.58 |
| 4090.29 | 149.87 |
| 4094.5 | 150.16 |
| 4098.71 | 150.45 |
| 4102.93 | 150.74 |
| 4107.14 | 151.02 |
| 4111.35 | 151.3 |
| 4115.57 | 151.59 |
| 4119.78 | 151.87 |
| 4123.99 | 152.15 |
| 4128.21 | 152.44 |
| 4132.42 | 152.73 |
| 4136.63 | 153.02 |
| 4140.84 | 153.31 |
| 4141.74 | 124.32 |
| 4145.06 | 153.61 |
| 4149.27 | 153.9 |
| 4153.48 | 154.2 |
| 4157.1 | 125.8 |
| 4157.69 | 154.5 |
| 4161.91 | 154.81 |
| 4166.12 | 155.12 |
| 4170.33 | 155.42 |
| 4172.44 | 127.46 |
| 4174.54 | 155.73 |
| 4178.75 | 156.05 |
| 4182.96 | 156.36 |
| 4187.17 | 156.67 |
| 4187.76 | 129.27 |
| 4191.38 | 156.99 |
| 4195.59 | 157.3 |
| 4199.81 | 157.62 |
| 4203.07 | 131.18 |
| 4204.02 | 157.93 |
| 4208.23 | 158.25 |
| 4212.44 | 158.57 |
| 4216.65 | 158.88 |
| 4218.37 | 133.2 |
| 4220.86 | 159.2 |
| 4225.07 | 159.51 |
| 4229.28 | 159.83 |
| 4233.49 | 160.14 |
| 4233.66 | 135.3 |
| 4237.7 | 160.46 |
| 4241.91 | 160.78 |
| 4246.13 | 161.09 |
| 4248.93 | 137.5 |
| 4250.34 | 161.41 |
| 4254.55 | 161.73 |
| 4258.76 | 162.05 |
| 4262.97 | 162.36 |
| 4264.19 | 139.78 |
| 4267.18 | 162.68 |
| 4271.39 | 163 |
| 4275.6 | 163.33 |
| 4279.44 | 142.15 |
| 4279.81 | 163.65 |
| 4284.02 | 163.97 |
| 4288.23 | 164.29 |
| 4292.44 | 164.62 |
| 4294.67 | 144.59 |
| 4296.65 | 164.94 |
| 4300.86 | 165.27 |
| 4305.07 | 165.6 |
| 4309.28 | 165.92 |
| 4309.9 | 147.11 |
| 4313.49 | 166.25 |
| 4317.7 | 166.59 |
| 4321.91 | 166.92 |
| 4325.11 | 149.69 |
| 4326.12 | 167.25 |
| 4330.33 | 167.59 |
| 4334.54 | 167.92 |
| 4338.75 | 168.26 |
| 4340.31 | 152.34 |
| 4342.96 | 168.6 |
| 4347.17 | 168.94 |

TABLE 7-continued

| Y | Z |
|---|---|
| 4351.38 | 169.29 |
| 4355.5 | 155.03 |
| 4355.58 | 169.63 |
| 4359.79 | 169.98 |
| 4364 | 170.33 |
| 4368.21 | 170.68 |
| 4370.69 | 157.76 |
| 4372.42 | 171.03 |
| 4376.62 | 171.39 |
| 4380.83 | 171.74 |
| 4385.04 | 172.1 |
| 4385.87 | 160.52 |
| 4389.25 | 172.46 |
| 4393.45 | 172.83 |
| 4397.66 | 173.19 |
| 4401.05 | 163.31 |
| 4401.87 | 173.56 |
| 4406.07 | 173.93 |
| 4410.28 | 174.3 |
| 4414.49 | 174.67 |
| 4416.22 | 166.13 |
| 4418.69 | 175.05 |
| 4422.9 | 175.43 |
| 4427.1 | 175.81 |
| 4431.31 | 176.19 |
| 4431.38 | 168.99 |
| 4435.51 | 176.58 |
| 4439.72 | 176.97 |
| 4443.92 | 177.36 |
| 4446.54 | 171.87 |
| 4448.13 | 177.76 |
| 4452.33 | 178.16 |
| 4456.53 | 178.58 |
| 4460.73 | 179 |
| 4461.7 | 174.74 |
| 4464.94 | 179.43 |
| 4469.14 | 179.85 |
| 4473.34 | 180.27 |
| 4476.87 | 177.58 |
| 4477.54 | 180.69 |
| 4481.74 | 181.12 |
| 4485.94 | 181.55 |
| 4490.14 | 182 |
| 4492.02 | 180.51 |
| 4494.34 | 182.45 |
| 4498.54 | 182.9 |
| 4502.74 | 183.35 |
| 4507.11 | 183.71 |
| 892.09 | 185.17 |
| 900.01 | 233.46 |

Figure 13:
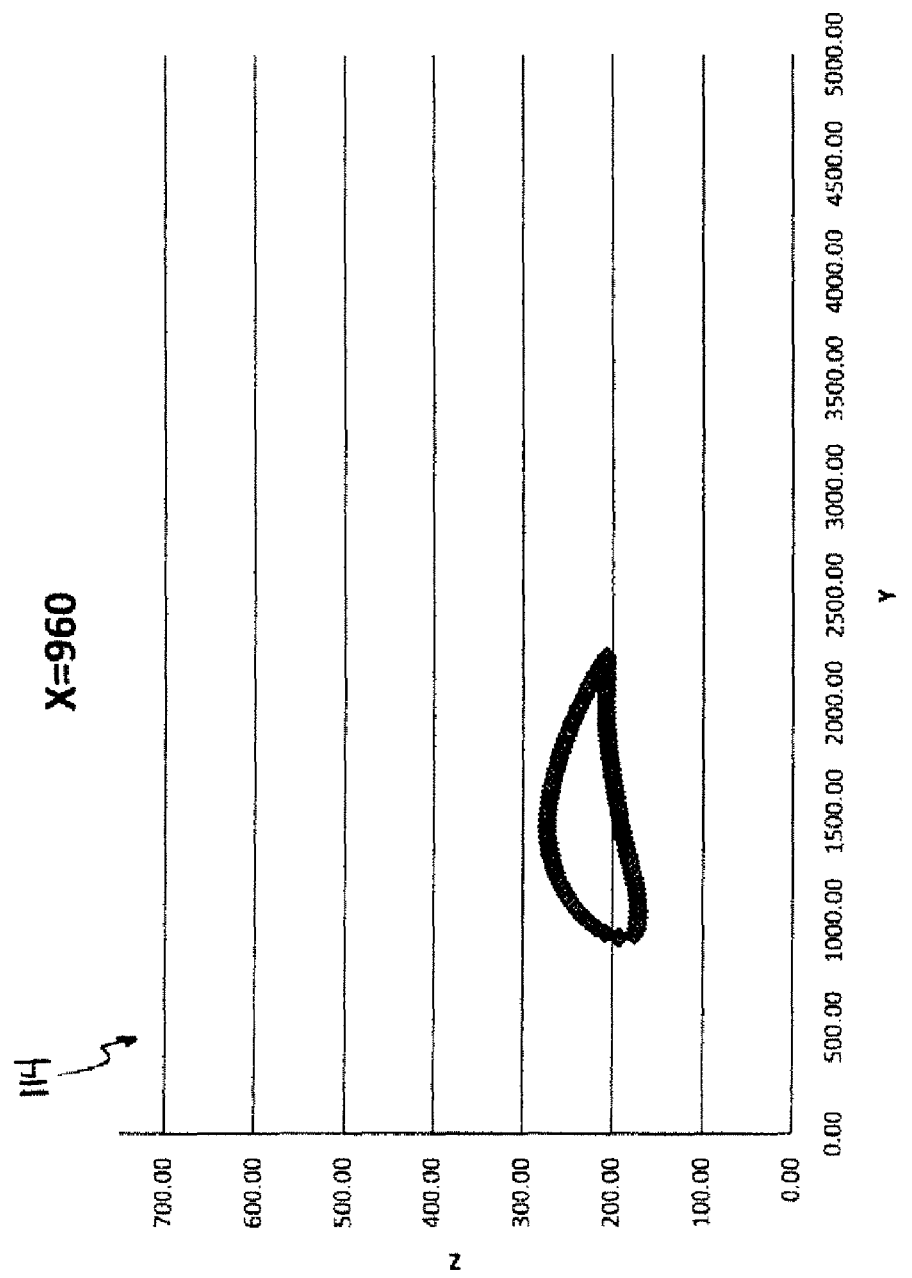
FIG. 13 is a graphical representation of Y and Z positions of upper and lower surfaces of the aircraft of FIG. 1 taken at an X position substantially equal to 960.0.

The upper and lower surfaces 28, 30 are defined at Y and Z positions corresponding substantially to the X position of 960.0, as shown in Table 8 and at 114 in FIG. 13.

TABLE 8

| Y | Z |
|---|---|
| 1010.85 | 170.95 |
| 1015.43 | 232.32 |
| 1037.07 | 170.84 |
| 1041.03 | 237.97 |
| 1063.28 | 171.16 |
| 1066.76 | 242.99 |
| 1089.49 | 171.72 |
| 1092.59 | 247.47 |
| 1115.69 | 172.6 |
| 1118.5 | 251.45 |
| 1141.88 | 173.69 |
| 1144.47 | 255 |
| 1168.07 | 175 |
| 1170.49 | 258.18 |
| 1194.24 | 176.48 |
| 1196.56 | 260.99 |
| 1220.41 | 178.07 |

TABLE 8-continued

| Y | Z |
|---|---|
| 1222.65 | 263.47 |
| 1246.57 | 179.69 |
| 1248.78 | 265.62 |
| 1272.74 | 181.3 |
| 1274.93 | 267.46 |
| 1298.91 | 182.89 |
| 1301.1 | 269.01 |
| 1325.07 | 184.45 |
| 1327.29 | 270.28 |
| 1351.25 | 185.95 |
| 1353.48 | 271.26 |
| 1377.42 | 187.41 |
| 1379.69 | 271.96 |
| 1403.6 | 188.82 |
| 1405.9 | 272.37 |
| 1429.78 | 190.18 |
| 1432.11 | 272.52 |
| 1455.96 | 191.49 |
| 1458.33 | 272.39 |
| 1482.15 | 192.76 |
| 1484.54 | 272.06 |
| 1508.33 | 193.98 |
| 1510.75 | 271.53 |
| 1534.52 | 195.17 |
| 1536.96 | 270.8 |
| 1560.71 | 196.31 |
| 1563.16 | 269.88 |
| 1586.9 | 197.42 |
| 1589.35 | 268.79 |
| 1613.1 | 198.49 |
| 1615.53 | 267.53 |
| 1639.29 | 199.52 |
| 1641.71 | 266.1 |
| 1665.49 | 200.51 |
| 1667.88 | 264.52 |
| 1691.69 | 201.47 |
| 1694.04 | 262.83 |
| 1717.88 | 202.39 |
| 1720.19 | 261.02 |
| 1744.09 | 203.25 |
| 1746.34 | 259.09 |
| 1770.29 | 204.06 |
| 1772.47 | 257.09 |
| 1796.49 | 204.79 |
| 1798.6 | 254.96 |
| 1822.7 | 205.45 |
| 1824.72 | 252.75 |
| 1848.91 | 206.02 |
| 1850.84 | 250.49 |
| 1875.12 | 206.49 |
| 1876.95 | 248.17 |
| 1901.33 | 206.84 |
| 1903.06 | 245.75 |
| 1927.55 | 207.08 |
| 1929.15 | 243.22 |
| 1953.76 | 207.25 |
| 1955.23 | 240.58 |
| 1979.98 | 207.32 |
| 1981.3 | 237.83 |
| 2006.19 | 207.32 |
| 2007.37 | 234.99 |
| 2032.41 | 207.26 |
| 2033.42 | 232.08 |
| 2058.62 | 207.16 |
| 2059.46 | 229.08 |
| 2084.84 | 207.03 |
| 2085.49 | 225.95 |
| 2111.05 | 206.87 |
| 2111.5 | 222.65 |
| 2137.27 | 206.75 |
| 2137.48 | 219.15 |
| 2163.42 | 215.4 |
| 2163.48 | 206.59 |
| 2189.32 | 211.37 |
| 2189.7 | 206.37 |
| 2215.18 | 206.84 |
| 919.81 | 192.98 |
| 932.43 | 175.87 |

TABLE 8-continued

| Y | Z |
|---|---|
| 940.67 | 208.36 |
| 958.47 | 172.92 |
| 964.97 | 218.14 |
| 984.65 | 171.58 |
| 990.03 | 225.84 |

Figure 14:
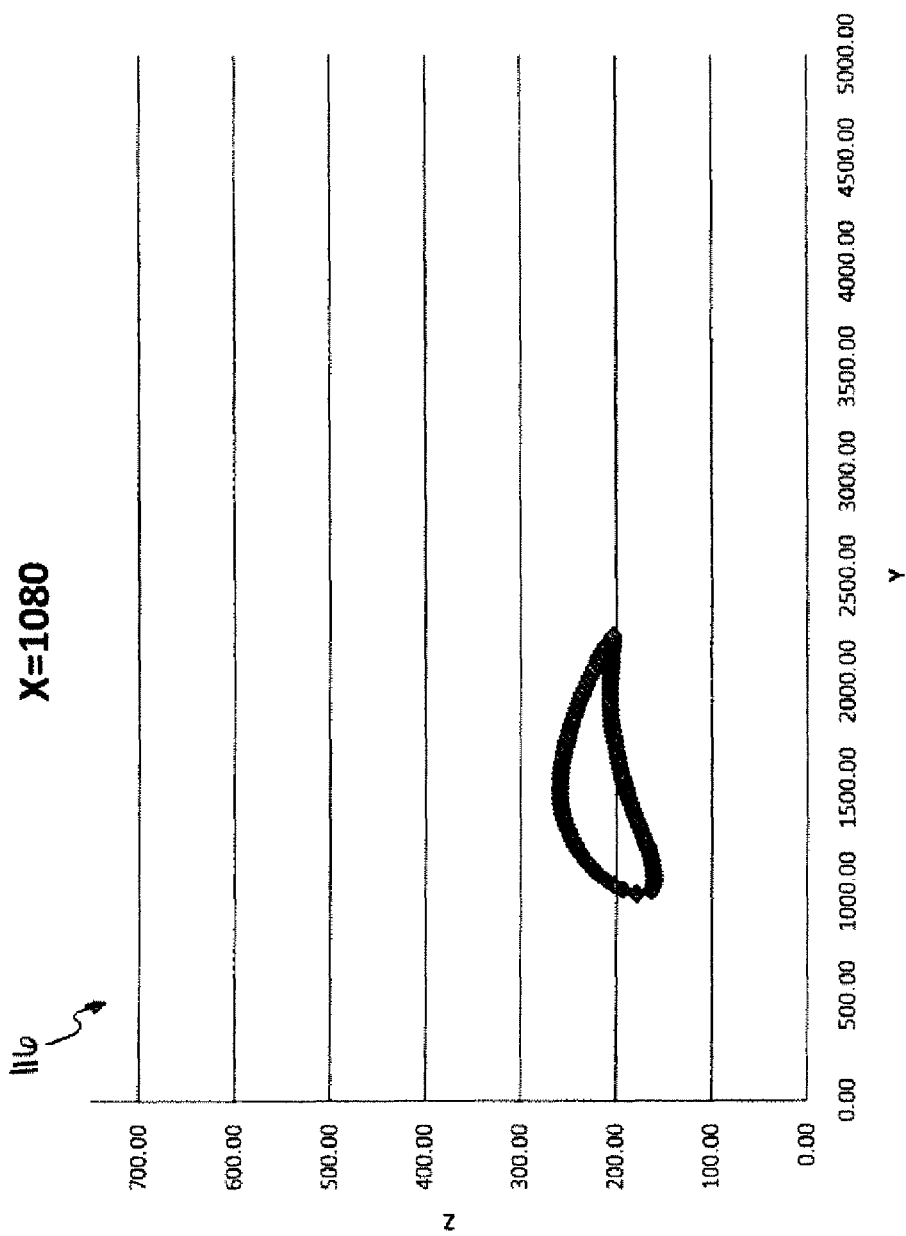
FIG. 14 is a graphical representation of Y and Z positions of upper and lower surfaces of the aircraft of FIG. 1 taken at an X position substantially equal to 1080.0.

The upper and lower surfaces 28, 30 are defined at Y and Z positions corresponding substantially to the X position of 1080.0, as shown in Table 9 and at 116 in FIG. 14.

TABLE 9

| Y | Z |
|---|---|
| 1007.07 | 193.254 |
| 1024.74 | 160.681 |
| 1030 | 202.825 |
| 1049.59 | 160.026 |
| 1053.66 | 210.444 |
| 1074.45 | 160.037 |
| 1077.66 | 216.894 |
| 1099.3 | 160.529 |
| 1101.86 | 222.568 |
| 1124.14 | 161.422 |
| 1126.2 | 227.615 |
| 1148.97 | 162.56 |
| 1150.64 | 232.134 |
| 1173.78 | 164.04 |
| 1175.17 | 236.176 |
| 1198.58 | 165.756 |
| 1199.76 | 239.807 |
| 1223.36 | 167.706 |
| 1224.4 | 243.068 |
| 1248.13 | 169.846 |
| 1249.09 | 245.98 |
| 1272.88 | 172.092 |
| 1273.81 | 248.57 |
| 1297.64 | 174.345 |
| 1298.56 | 250.847 |
| 1322.4 | 176.564 |
| 1323.34 | 252.835 |
| 1347.16 | 178.732 |
| 1348.14 | 254.541 |
| 1371.93 | 180.831 |
| 1372.95 | 255.974 |
| 1396.7 | 182.843 |
| 1397.78 | 257.136 |
| 1421.49 | 184.772 |
| 1422.62 | 258.017 |
| 1446.27 | 186.615 |
| 1447.47 | 258.612 |
| 1471.07 | 188.371 |
| 1472.33 | 258.946 |
| 1495.87 | 190.042 |
| 1497.19 | 258.998 |
| 1520.68 | 191.634 |
| 1522.04 | 258.881 |
| 1545.49 | 193.15 |
| 1546.9 | 258.576 |
| 1570.3 | 194.593 |
| 1571.75 | 258.093 |
| 1595.12 | 195.967 |
| 1596.6 | 257.438 |
| 1619.95 | 197.267 |
| 1621.44 | 256.625 |
| 1644.77 | 198.493 |
| 1646.28 | 255.66 |
| 1669.6 | 199.644 |
| 1671.11 | 254.544 |
| 1694.44 | 200.721 |
| 1695.94 | 253.288 |
| 1719.27 | 201.725 |
| 1720.76 | 251.927 |
| 1744.11 | 202.661 |
| 1745.57 | 250.447 |
| 1768.96 | 203.491 |

TABLE 9-continued

| Y | Z |
|---|---|
| 1770.38 | 248.857 |
| 1793.8 | 204.254 |
| 1795.18 | 247.221 |
| 1818.65 | 204.914 |
| 1819.97 | 245.425 |
| 1843.5 | 205.47 |
| 1844.76 | 243.559 |
| 1868.36 | 205.917 |
| 1869.54 | 241.639 |
| 1893.21 | 206.237 |
| 1894.32 | 239.656 |
| 1918.07 | 206.431 |
| 1919.09 | 237.578 |
| 1942.92 | 206.481 |
| 1943.85 | 235.391 |
| 1967.78 | 206.439 |
| 1968.61 | 233.1 |
| 1992.64 | 206.284 |
| 1993.35 | 230.715 |
| 2017.49 | 206.03 |
| 2018.08 | 228.25 |
| 2042.35 | 205.68 |
| 2042.81 | 225.723 |
| 2067.2 | 205.252 |
| 2067.53 | 223.109 |
| 2092.05 | 204.758 |
| 2092.24 | 220.362 |
| 2116.91 | 204.21 |
| 2116.92 | 217.433 |
| 2141.58 | 214.277 |
| 2141.76 | 203.697 |
| 2166.19 | 210.847 |
| 2166.61 | 203.148 |
| 2190.77 | 207.096 |
| 2191.46 | 202.511 |
| 2215.28 | 202.88 |
| 987.454 | 178.462 |
| 999.992 | 162.827 |

Figure 15:
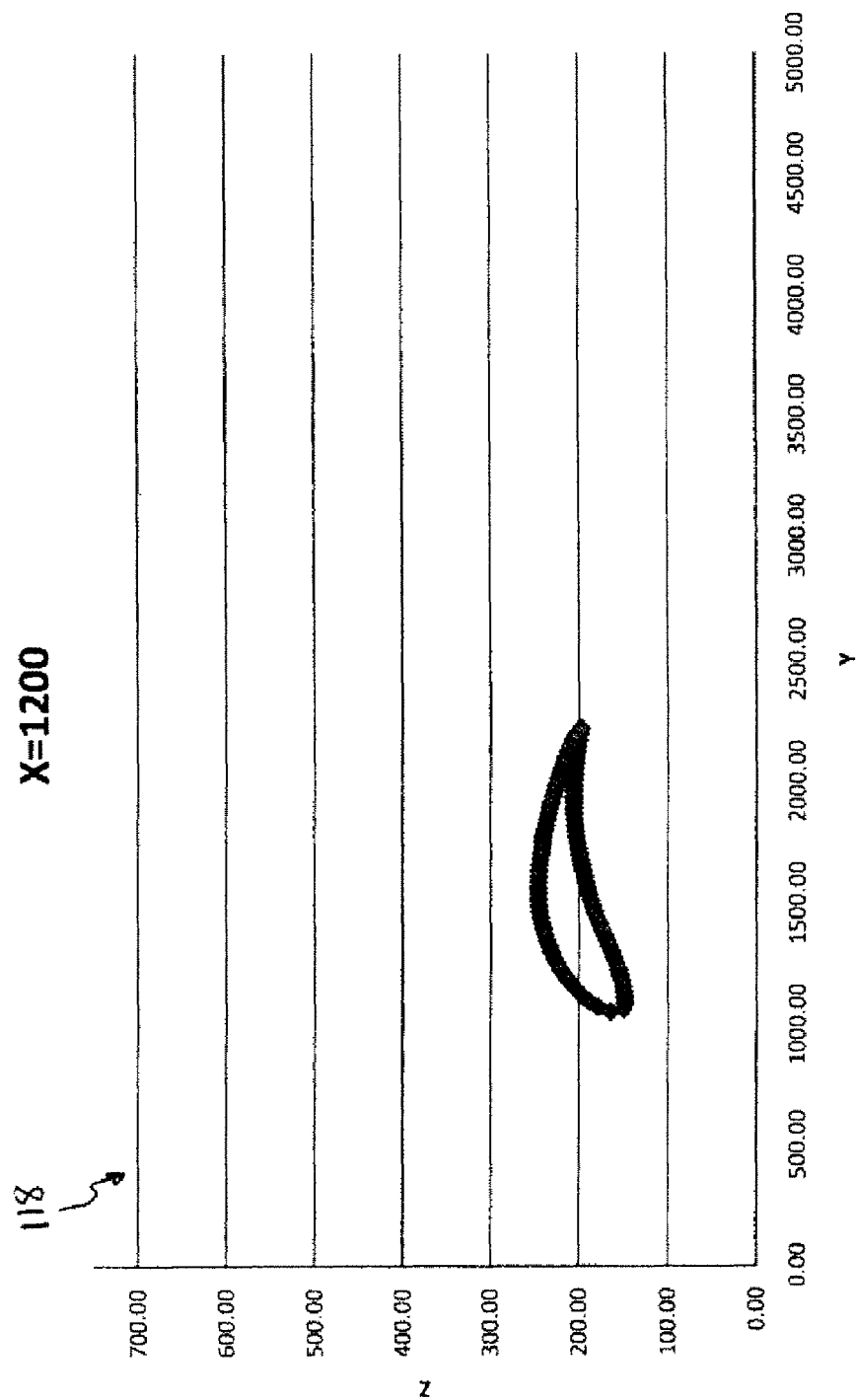
FIG. 15 is a graphical representation of Y and Z positions of upper and lower surfaces of the aircraft of FIG. 1 taken at an X position substantially equal to 1200.0.

The upper and lower surfaces 28, 30 are defined at Y and Z positions corresponding substantially to the X position of 1200.0, as shown in Table 10 and at 118 in FIG. 15.

TABLE 10

| Y | Z |
|---|---|
| 1055.69 | 164.888 |
| 1066.44 | 149.953 |
| 1074.47 | 178.648 |
| 1089.88 | 148.453 |
| 1096.08 | 187.886 |
| 1113.39 | 148.431 |
| 1118.36 | 195.354 |
| 1136.88 | 149.063 |
| 1140.98 | 201.736 |
| 1160.36 | 150.14 |
| 1163.79 | 207.402 |
| 1183.82 | 151.587 |
| 1186.75 | 212.454 |
| 1207.27 | 153.283 |
| 1209.81 | 216.994 |
| 1230.68 | 155.35 |
| 1232.96 | 221.079 |
| 1254.07 | 157.678 |
| 1256.17 | 224.77 |
| 1277.44 | 160.254 |
| 1279.44 | 228.104 |
| 1300.77 | 163.041 |
| 1302.75 | 231.099 |
| 1324.1 | 165.941 |
| 1326.1 | 233.787 |
| 1347.43 | 168.832 |
| 1349.48 | 236.182 |
| 1370.76 | 171.658 |
| 1372.89 | 238.301 |

TABLE 10-continued

| Y | Z |
|---|---|
| 1394.11 | 174.403 |
| 1396.33 | 240.151 |
| 1417.46 | 177.049 |
| 1419.78 | 241.739 |
| 1440.83 | 179.576 |
| 1443.24 | 243.065 |
| 1464.21 | 181.979 |
| 1466.73 | 244.113 |
| 1487.61 | 184.264 |
| 1490.22 | 244.879 |
| 1511.01 | 186.425 |
| 1513.72 | 245.39 |
| 1534.43 | 188.466 |
| 1537.22 | 245.615 |
| 1557.86 | 190.391 |
| 1560.73 | 245.7 |
| 1581.29 | 192.207 |
| 1584.23 | 245.615 |
| 1604.73 | 193.918 |
| 1607.74 | 245.37 |
| 1628.18 | 195.524 |
| 1631.24 | 244.972 |
| 1651.64 | 197.024 |
| 1654.74 | 244.432 |
| 1675.11 | 198.414 |
| 1678.23 | 243.757 |
| 1698.58 | 199.694 |
| 1701.72 | 242.946 |
| 1722.05 | 200.864 |
| 1725.21 | 242.009 |
| 1745.53 | 201.92 |
| 1748.69 | 240.971 |
| 1769.02 | 202.877 |
| 1772.17 | 239.82 |
| 1792.51 | 203.698 |
| 1795.64 | 238.567 |
| 1816 | 204.416 |
| 1819.11 | 237.298 |
| 1839.5 | 205.004 |
| 1842.57 | 235.827 |
| 1863 | 205.466 |
| 1866.03 | 234.303 |
| 1886.51 | 205.796 |
| 1889.48 | 232.721 |
| 1910.01 | 205.978 |
| 1912.93 | 231.07 |
| 1933.52 | 206.019 |
| 1936.37 | 229.325 |
| 1957.02 | 205.888 |
| 1959.8 | 227.479 |
| 1980.52 | 205.644 |
| 1983.22 | 225.533 |
| 2004.03 | 205.269 |
| 2006.64 | 223.507 |
| 2027.53 | 204.765 |
| 2030.05 | 221.415 |
| 2051.02 | 204.131 |
| 2053.46 | 219.27 |
| 2074.52 | 203.382 |
| 2076.86 | 217.036 |
| 2098.01 | 202.533 |
| 2100.24 | 214.659 |
| 2121.49 | 201.609 |
| 2123.61 | 212.082 |
| 2144.98 | 200.693 |
| 2146.94 | 209.254 |
| 2168.47 | 199.755 |
| 2170.24 | 206.119 |
| 2191.95 | 198.708 |
| 2193.48 | 202.624 |
| 2215.43 | 197.646 |

Figure 16:
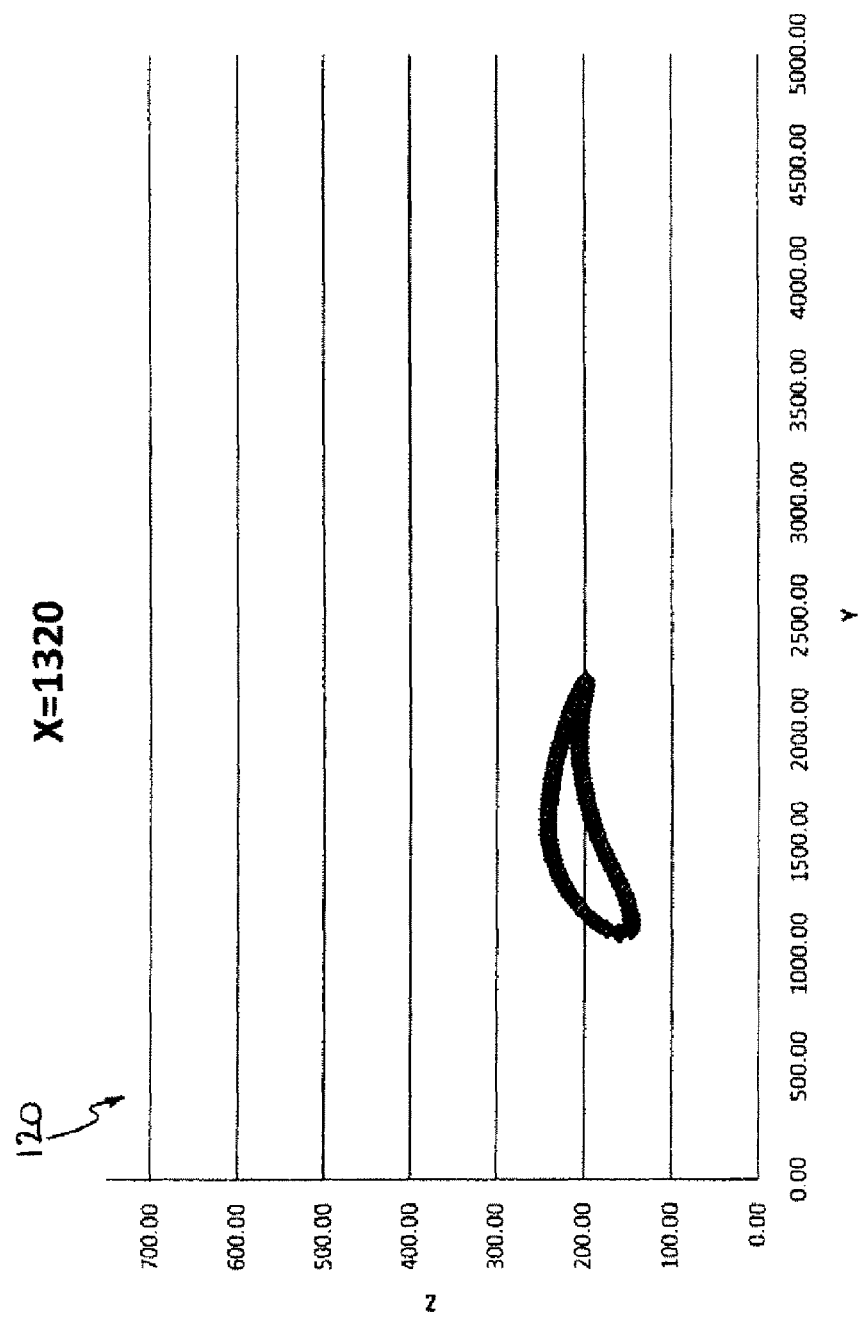
FIG. 16 is a graphical representation of Y and Z positions of upper and lower surfaces of the aircraft of FIG. 1 taken at an X position substantially equal to 1320.0.

The upper and lower surfaces 28, 30 are defined at Y and Z positions corresponding substantially to the X position of 1320.0, as shown in Table 11 and at 120 in FIG. 16.

TABLE 11

| Y | Z |
|---|---|
| 1092.2 | 160.051 |
| 1104.7 | 146.699 |
| 1109.84 | 173.963 |
| 1127.42 | 145.568 |
| 1130.65 | 183.156 |
| 1150.18 | 145.768 |
| 1152.16 | 190.576 |
| 1172.92 | 146.578 |
| 1174.01 | 196.918 |
| 1195.64 | 147.815 |
| 1196.06 | 202.558 |
| 1218.25 | 207.59 |
| 1218.35 | 149.397 |
| 1240.55 | 212.119 |
| 1241.03 | 151.22 |
| 1262.94 | 216.204 |
| 1263.68 | 153.42 |
| 1285.4 | 219.901 |
| 1286.31 | 155.859 |
| 1307.91 | 223.249 |
| 1308.91 | 158.548 |
| 1330.46 | 226.267 |
| 1331.48 | 161.438 |
| 1353.06 | 228.985 |
| 1354.04 | 164.43 |
| 1375.69 | 231.418 |
| 1376.6 | 167.403 |
| 1398.34 | 233.583 |
| 1399.18 | 170.305 |
| 1421.02 | 235.487 |
| 1421.76 | 173.124 |
| 1443.72 | 237.134 |
| 1444.35 | 175.841 |
| 1466.43 | 238.528 |
| 1466.96 | 178.436 |
| 1489.16 | 239.653 |
| 1489.59 | 180.909 |
| 1511.9 | 240.498 |
| 1512.22 | 183.257 |
| 1534.65 | 241.094 |
| 1534.87 | 185.484 |
| 1557.41 | 241.405 |
| 1557.53 | 187.587 |
| 1580.17 | 241.583 |
| 1580.2 | 189.574 |
| 1602.88 | 191.449 |
| 1602.92 | 241.598 |
| 1625.57 | 193.217 |
| 1625.68 | 241.461 |
| 1648.27 | 194.879 |
| 1648.44 | 241.173 |
| 1670.97 | 196.431 |
| 1671.19 | 240.753 |
| 1693.69 | 197.873 |
| 1693.94 | 240.204 |
| 1716.41 | 199.202 |
| 1716.69 | 239.525 |
| 1739.13 | 200.417 |
| 1739.43 | 238.723 |
| 1761.86 | 201.52 |
| 1762.18 | 237.825 |
| 1784.6 | 202.519 |
| 1784.91 | 236.814 |
| 1807.34 | 203.371 |
| 1807.64 | 235.704 |
| 1830.09 | 204.131 |
| 1830.37 | 234.578 |
| 1852.83 | 204.757 |
| 1853.09 | 233.264 |
| 1875.59 | 205.253 |
| 1875.81 | 231.887 |
| 1898.34 | 205.612 |
| 1898.52 | 230.454 |
| 1921.1 | 205.819 |
| 1921.23 | 228.951 |
| 1943.86 | 205.879 |
| 1943.93 | 227.36 |
| 1966.61 | 205.773 |

TABLE 11-continued

| Y | Z |
| --- | --- |
| 1966.63 | 225.669 |
| 1989.31 | 223.883 |
| 1989.37 | 205.55 |
| 2011.99 | 222.018 |
| 2012.13 | 205.188 |
| 2034.67 | 220.091 |
| 2034.88 | 204.694 |
| 2057.34 | 218.115 |
| 2057.63 | 204.064 |
| 2080.01 | 216.057 |
| 2080.37 | 203.316 |
| 2102.66 | 213.858 |
| 2103.12 | 202.459 |
| 2125.29 | 211.465 |
| 2125.85 | 201.519 |
| 2147.89 | 208.819 |
| 2148.59 | 200.595 |
| 2170.46 | 205.866 |
| 2171.33 | 199.622 |
| 2192.97 | 202.551 |
| 2194.06 | 198.536 |
| 2215.42 | 198.82 |

Figure 17:
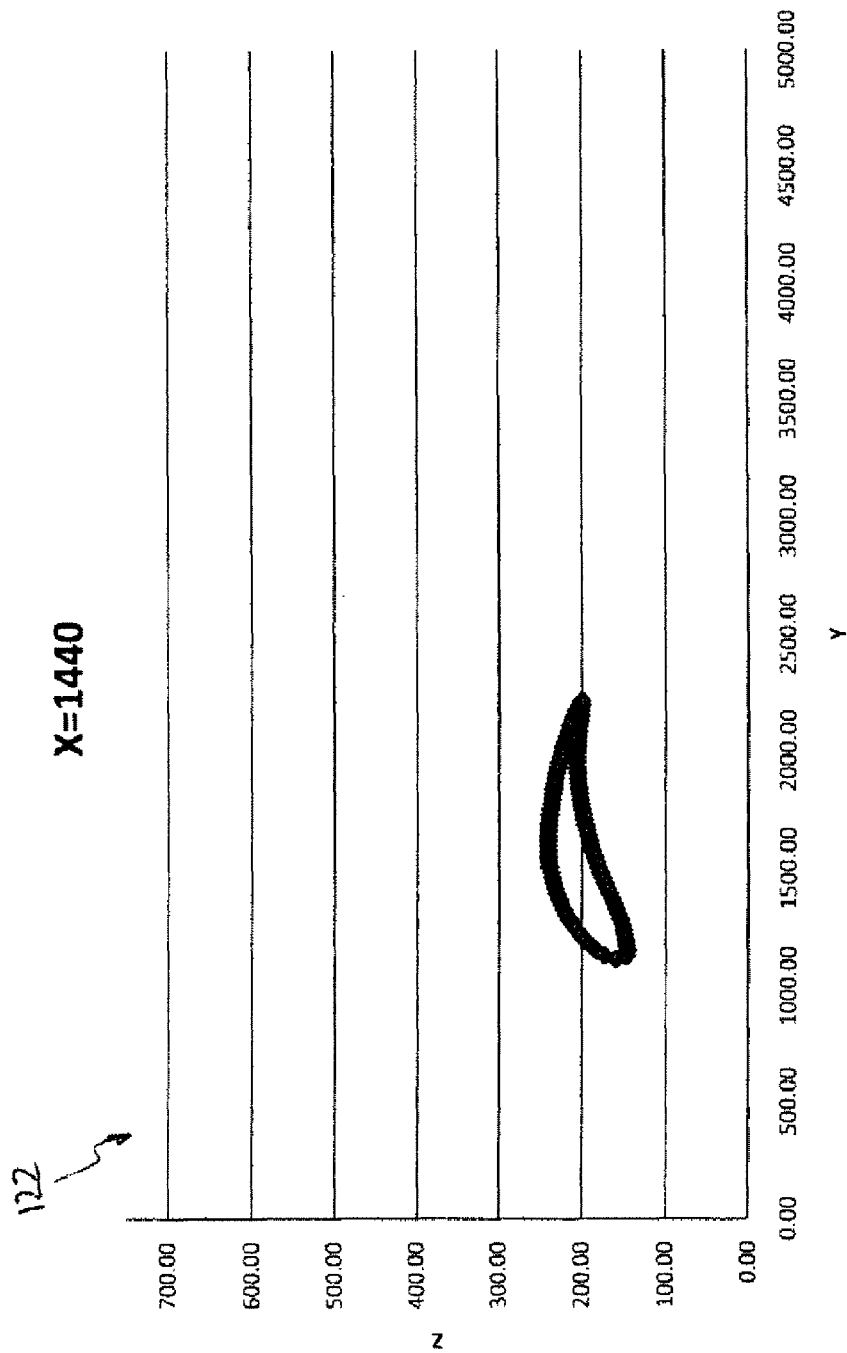
FIG. 17 is a graphical representation of Y and Z positions of upper and lower surfaces of the aircraft of FIG. 1 taken at an X position substantially equal to 1440.0.

The upper and lower surfaces 28, 30 are defined at Y and Z positions corresponding substantially to the X position of 1440.0, as shown in Table 12 and at 122 in FIG. 17.

TABLE 12

| Y | Z |
| --- | --- |
| 1119.7 | 159.834 |
| 1131.87 | 146.79 |
| 1136.9 | 173.426 |
| 1154.03 | 145.702 |
| 1157.18 | 182.434 |
| 1176.23 | 145.915 |
| 1178.15 | 189.715 |
| 1198.42 | 146.723 |
| 1199.46 | 195.946 |
| 1220.59 | 147.945 |
| 1220.95 | 201.493 |
| 1242.59 | 206.448 |
| 1242.74 | 149.502 |
| 1264.34 | 210.912 |
| 1264.87 | 151.292 |
| 1286.18 | 214.943 |
| 1286.96 | 153.439 |
| 1308.08 | 218.596 |
| 1309.04 | 155.818 |
| 1330.03 | 221.908 |
| 1331.08 | 158.433 |
| 1352.03 | 224.898 |
| 1353.11 | 161.24 |
| 1374.07 | 227.597 |
| 1375.12 | 164.14 |
| 1396.14 | 230.017 |
| 1397.14 | 167.024 |
| 1418.23 | 232.175 |
| 1419.16 | 169.842 |
| 1440.35 | 234.079 |
| 1441.19 | 172.583 |
| 1462.49 | 235.734 |
| 1463.23 | 175.229 |
| 1484.65 | 237.141 |
| 1485.29 | 177.763 |
| 1506.82 | 238.284 |
| 1507.36 | 180.183 |
| 1529.01 | 239.155 |
| 1529.44 | 182.489 |
| 1551.2 | 239.783 |
| 1551.54 | 184.681 |
| 1573.4 | 240.135 |
| 1573.64 | 186.759 |
| 1595.6 | 240.356 |
| 1595.76 | 188.729 |
| 1617.81 | 240.417 |
| 1617.88 | 190.596 |
| 1640.01 | 240.33 |
| 1640.01 | 192.364 |
| 1662.15 | 194.033 |
| 1662.21 | 240.099 |
| 1684.3 | 195.601 |
| 1684.41 | 239.734 |
| 1706.45 | 197.068 |
| 1706.61 | 239.245 |
| 1728.61 | 198.428 |
| 1728.8 | 238.63 |
| 1750.78 | 199.685 |
| 1750.99 | 237.894 |
| 1772.95 | 200.838 |
| 1773.18 | 237.065 |
| 1795.13 | 201.892 |
| 1795.36 | 236.126 |
| 1817.31 | 202.814 |
| 1817.54 | 235.09 |
| 1839.5 | 203.646 |
| 1839.71 | 234.039 |
| 1861.69 | 204.355 |
| 1861.88 | 232.804 |
| 1883.89 | 204.938 |
| 1884.05 | 231.508 |
| 1906.08 | 205.384 |
| 1906.21 | 230.157 |
| 1928.28 | 205.68 |
| 1928.36 | 228.738 |
| 1950.49 | 205.832 |
| 1950.52 | 227.233 |
| 1972.66 | 225.63 |
| 1972.69 | 205.825 |
| 1994.8 | 223.935 |
| 1994.89 | 205.701 |
| 2016.93 | 222.163 |
| 2017.09 | 205.443 |
| 2039.06 | 220.329 |
| 2039.29 | 205.056 |
| 2061.18 | 218.449 |
| 2061.49 | 204.535 |
| 2083.29 | 216.487 |
| 2083.68 | 203.895 |
| 2105.4 | 214.39 |
| 2105.87 | 203.151 |
| 2127.48 | 212.101 |
| 2128.06 | 202.324 |
| 2149.54 | 209.567 |
| 2150.24 | 201.502 |
| 2171.56 | 206.733 |
| 2172.43 | 200.616 |
| 2193.53 | 203.546 |
| 2194.61 | 199.621 |
| 2215.44 | 199.952 |

Figure 18:
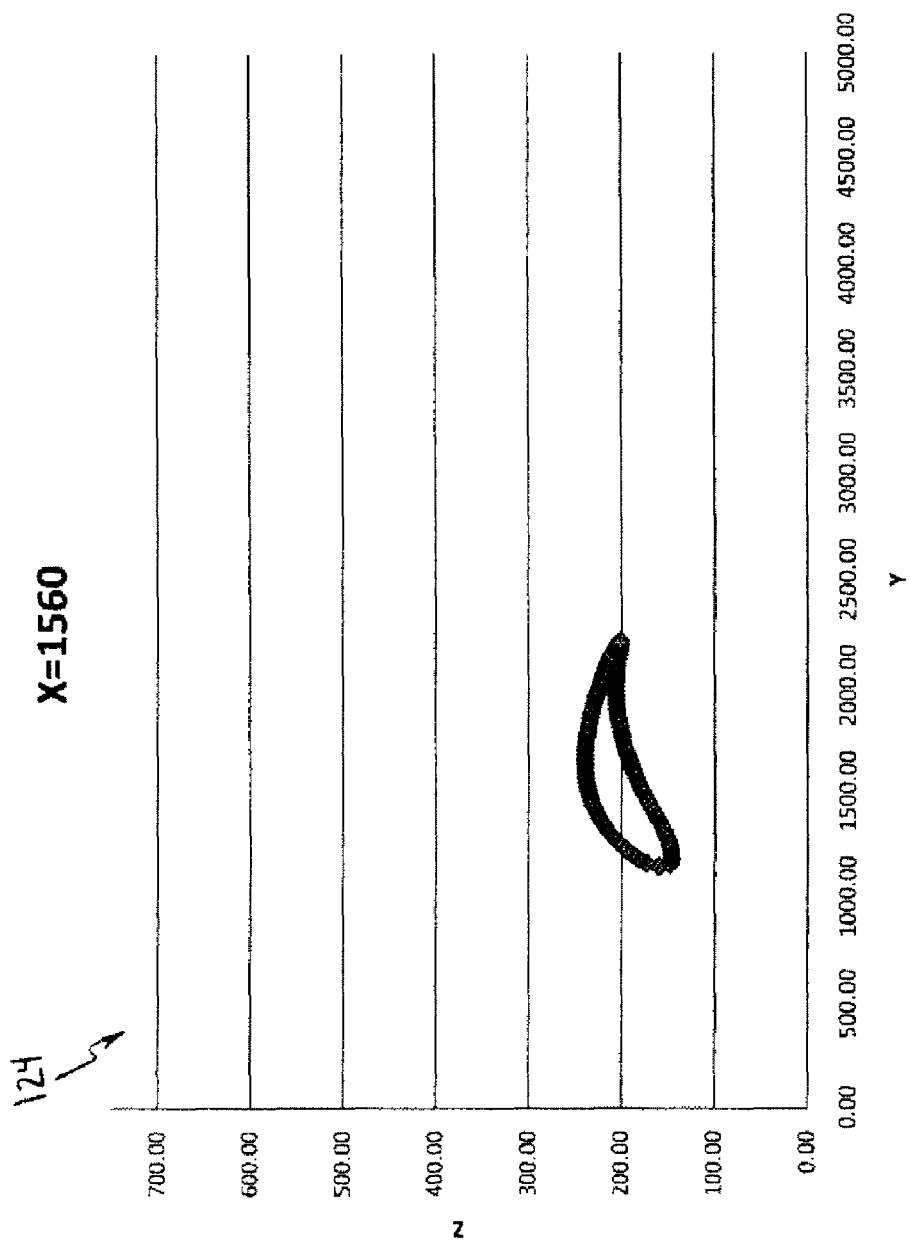
FIG. 18 is a graphical representation of Y and Z positions of upper and lower surfaces of the aircraft of FIG. 1 taken at an X position substantially equal to 1560.0.

The upper and lower surfaces 28, 30 are defined at Y and Z positions corresponding substantially to the X position of 1560.0, as shown in Table 13 and at 124 in FIG. 18.

TABLE 13

| Y | Z |
| --- | --- |
| 1147.19 | 159.615 |
| 1159.03 | 146.881 |
| 1163.95 | 172.889 |
| 1180.64 | 145.837 |
| 1183.7 | 181.711 |
| 1202.29 | 146.063 |
| 1204.14 | 188.854 |
| 1223.92 | 146.868 |
| 1224.9 | 194.974 |
| 1245.53 | 148.076 |
| 1245.85 | 200.428 |
| 1266.94 | 205.305 |

TABLE 13-continued

| Y | Z |
|---|---|
| 1267.13 | 149.607 |
| 1288.13 | 209.704 |
| 1288.7 | 151.364 |
| 1309.41 | 213.681 |
| 1310.25 | 153.458 |
| 1330.75 | 217.29 |
| 1331.77 | 155.776 |
| 1352.15 | 220.568 |
| 1353.27 | 158.318 |
| 1373.59 | 223.53 |
| 1374.74 | 161.042 |
| 1395.07 | 226.209 |
| 1396.2 | 163.852 |
| 1416.59 | 228.616 |
| 1417.67 | 166.645 |
| 1438.12 | 230.769 |
| 1439.14 | 169.379 |
| 1459.69 | 232.672 |
| 1460.63 | 172.043 |
| 1481.27 | 234.333 |
| 1482.12 | 174.618 |
| 1502.87 | 235.753 |
| 1503.62 | 177.09 |
| 1524.49 | 236.916 |
| 1525.14 | 179.457 |
| 1546.11 | 237.813 |
| 1546.67 | 181.721 |
| 1567.75 | 238.473 |
| 1568.21 | 183.877 |
| 1589.39 | 238.864 |
| 1589.76 | 185.931 |
| 1611.04 | 239.128 |
| 1611.32 | 187.884 |
| 1632.69 | 239.237 |
| 1632.88 | 189.744 |
| 1654.33 | 239.199 |
| 1654.46 | 191.512 |
| 1675.98 | 239.022 |
| 1676.04 | 193.188 |
| 1697.62 | 238.716 |
| 1697.63 | 194.772 |
| 1719.22 | 196.262 |
| 1719.27 | 238.287 |
| 1740.83 | 197.655 |
| 1740.91 | 237.735 |
| 1762.43 | 198.952 |
| 1762.54 | 237.068 |
| 1784.05 | 200.154 |
| 1784.18 | 236.306 |
| 1805.67 | 201.265 |
| 1805.81 | 235.439 |
| 1827.29 | 202.254 |
| 1827.43 | 234.477 |
| 1848.92 | 203.161 |
| 1849.06 | 233.5 |
| 1870.55 | 203.953 |
| 1870.67 | 232.345 |
| 1892.19 | 204.622 |
| 1892.29 | 231.129 |
| 1913.83 | 205.157 |
| 1913.89 | 229.86 |
| 1935.47 | 205.541 |
| 1935.5 | 228.524 |
| 1957.1 | 227.105 |
| 1957.12 | 205.788 |
| 1978.69 | 225.591 |
| 1978.76 | 205.873 |
| 2000.28 | 223.987 |
| 2000.41 | 205.851 |
| 2021.86 | 222.307 |
| 2022.06 | 205.699 |
| 2043.44 | 220.567 |
| 2043.7 | 205.417 |
| 2065.01 | 218.782 |
| 2065.34 | 205.005 |
| 2086.58 | 216.918 |
| 2086.99 | 204.476 |
| 2108.13 | 214.921 |

TABLE 13-continued

| Y | Z |
|---|---|
| 2108.62 | 203.844 |
| 2129.67 | 212.738 |
| 2130.26 | 203.127 |
| 2151.18 | 210.315 |
| 2151.89 | 202.406 |
| 2172.66 | 207.6 |
| 2173.53 | 201.612 |
| 2194.09 | 204.54 |
| 2195.15 | 200.705 |
| 2215.46 | 201.085 |

Figure 19:
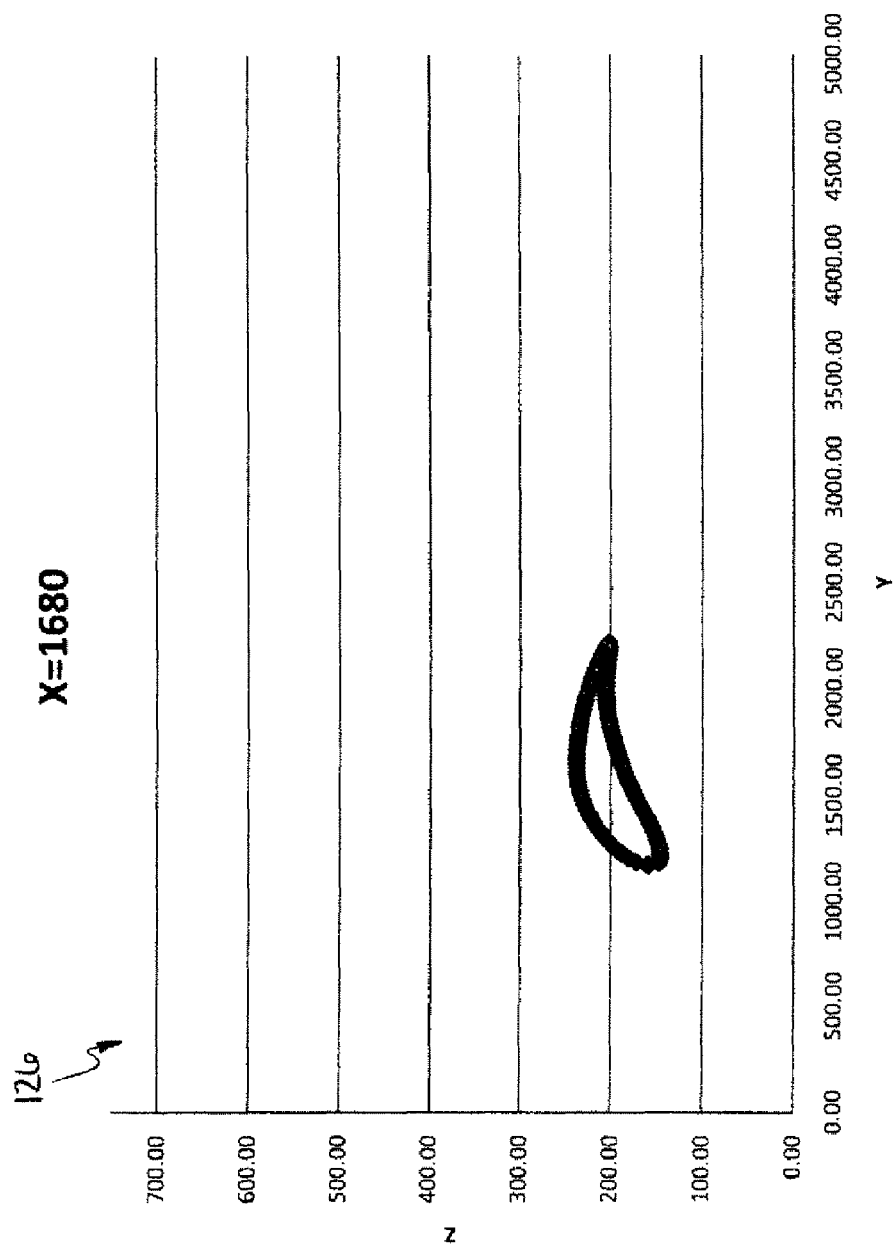
FIG. 19 is a graphical representation of Y and Z positions of upper and lower surfaces of the aircraft of FIG. 1 taken at an X position substantially equal to 1680.0.

The upper and lower surfaces 28, 30 are defined at Y and Z positions corresponding substantially to the X position of 1680.0, as shown in Table 14 and at 126 in FIG. 19.

TABLE 14

| Y | Z |
|---|---|
| 1174.69 | 159.39 |
| 1186.2 | 146.97 |
| 1191 | 172.35 |
| 1207.26 | 145.97 |
| 1210.23 | 180.99 |
| 1228.35 | 146.21 |
| 1230.12 | 187.99 |
| 1249.42 | 147.01 |
| 1250.34 | 194 |
| 1270.48 | 148.21 |
| 1270.74 | 199.36 |
| 1291.27 | 204.16 |
| 1291.52 | 149.71 |
| 1311.92 | 208.5 |
| 1312.54 | 151.44 |
| 1332.64 | 212.42 |
| 1333.53 | 153.48 |
| 1353.43 | 215.98 |
| 1354.5 | 155.73 |
| 1374.27 | 219.23 |
| 1375.45 | 158.2 |
| 1395.15 | 222.16 |
| 1396.38 | 160.85 |
| 1416.08 | 224.82 |
| 1417.29 | 163.56 |
| 1437.03 | 227.21 |
| 1438.21 | 166.27 |
| 1458.01 | 229.36 |
| 1459.13 | 168.92 |
| 1479.02 | 231.27 |
| 1480.07 | 171.5 |
| 1500.05 | 232.93 |
| 1501.01 | 174.01 |
| 1521.09 | 234.37 |
| 1521.96 | 176.42 |
| 1542.15 | 235.55 |
| 1542.93 | 178.73 |
| 1563.22 | 236.47 |
| 1563.9 | 180.95 |
| 1584.3 | 237.16 |
| 1584.88 | 183.08 |
| 1605.39 | 237.59 |
| 1605.88 | 185.1 |
| 1626.47 | 237.9 |
| 1626.88 | 187.04 |
| 1647.57 | 238.06 |
| 1647.89 | 188.89 |
| 1668.66 | 238.07 |
| 1668.91 | 190.66 |
| 1689.75 | 237.94 |
| 1689.93 | 192.34 |
| 1710.84 | 237.7 |
| 1710.96 | 193.94 |
| 1731.93 | 237.33 |
| 1732 | 195.46 |
| 1753.01 | 236.84 |
| 1753.04 | 196.88 |

TABLE 14-continued

| Y | Z |
|---|---|
| 1774.09 | 198.22 |
| 1774.1 | 236.24 |
| 1795.15 | 199.47 |
| 1795.18 | 235.55 |
| 1816.21 | 200.64 |
| 1816.25 | 234.75 |
| 1837.27 | 201.69 |
| 1837.33 | 233.86 |
| 1858.34 | 202.68 |
| 1858.4 | 232.96 |
| 1879.42 | 203.55 |
| 1879.46 | 231.89 |
| 1900.49 | 204.31 |
| 1900.52 | 230.75 |
| 1921.58 | 204.93 |
| 1921.58 | 229.56 |
| 1942.64 | 228.31 |
| 1942.66 | 205.4 |
| 1963.69 | 226.98 |
| 1963.75 | 205.74 |
| 1984.73 | 225.55 |
| 1984.84 | 205.93 |
| 2005.77 | 224.04 |
| 2005.93 | 206 |
| 2026.8 | 222.45 |
| 2027.02 | 205.96 |
| 2047.83 | 220.81 |
| 2048.12 | 205.78 |
| 2068.85 | 219.12 |
| 2069.2 | 205.47 |
| 2089.87 | 217.35 |
| 2090.29 | 205.06 |
| 2110.87 | 215.45 |
| 2111.38 | 204.54 |
| 2131.86 | 213.37 |
| 2132.46 | 203.93 |
| 2152.83 | 211.06 |
| 2153.54 | 203.31 |
| 2173.76 | 208.47 |
| 2174.62 | 202.61 |
| 2194.64 | 205.54 |
| 2195.7 | 201.79 |
| 2215.47 | 202.22 |

Figure 20:
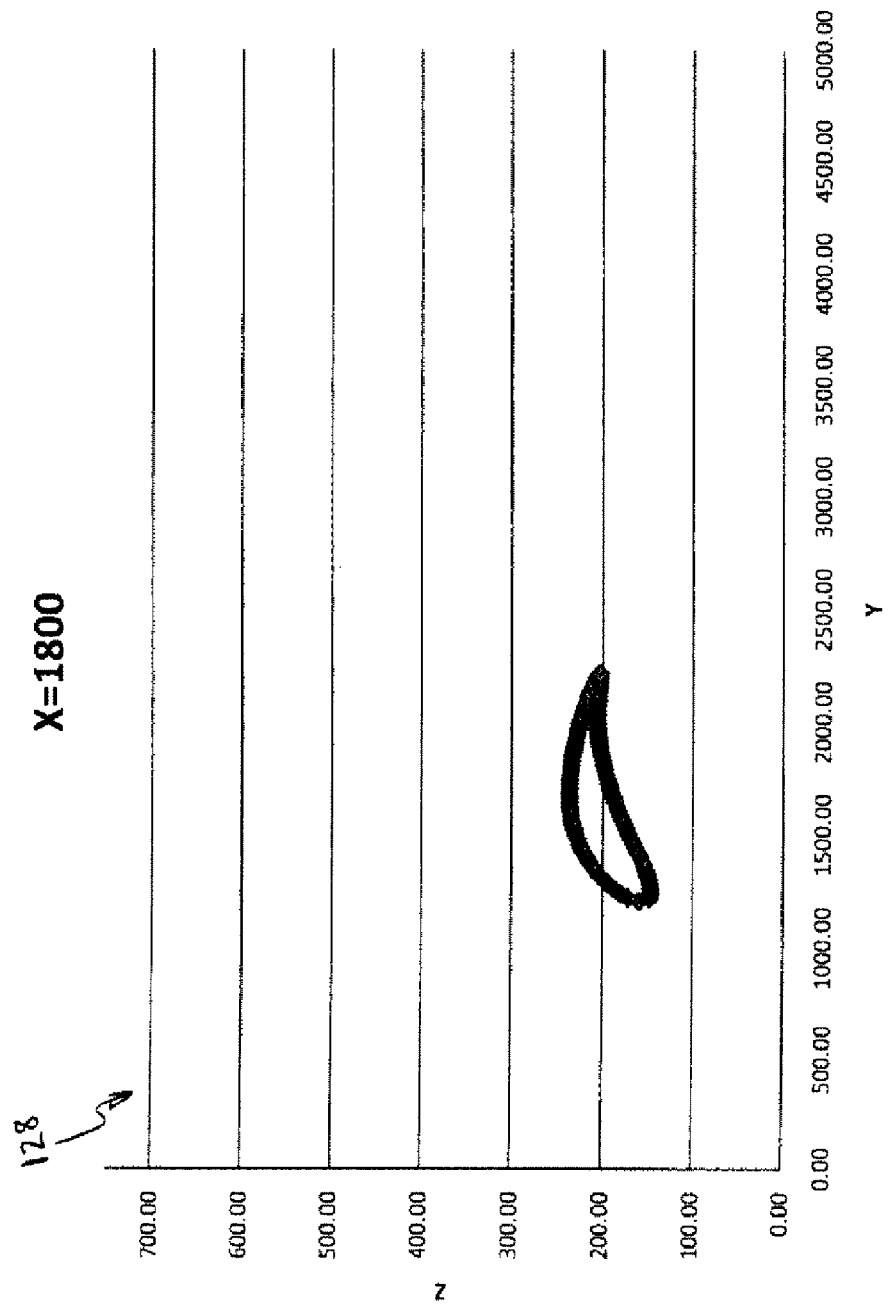
FIG. 20 is a graphical representation of Y and Z positions of upper and lower surfaces of the aircraft of FIG. 1 taken at an X position substantially equal to 1800.0.

The upper and lower surfaces 28, 30 are defined at Y and Z positions corresponding substantially to the X position of 1800.0, as shown in Table 15 and at 128 in FIG. 20.

TABLE 15

| Y | Z |
|---|---|
| 1202.19 | 159.171 |
| 1213.37 | 147.061 |
| 1218.05 | 171.812 |
| 1233.88 | 146.105 |
| 1236.76 | 180.264 |
| 1254.41 | 146.356 |
| 1256.11 | 187.131 |
| 1274.93 | 147.158 |
| 1275.78 | 193.029 |
| 1295.43 | 148.337 |
| 1295.63 | 198.298 |
| 1315.61 | 203.02 |
| 1315.92 | 149.816 |
| 1335.7 | 207.289 |
| 1336.38 | 151.508 |
| 1355.87 | 211.158 |
| 1356.82 | 153.499 |
| 1376.1 | 214.679 |
| 1377.24 | 155.694 |
| 1396.38 | 217.885 |
| 1397.64 | 158.091 |
| 1416.71 | 220.793 |
| 1418.01 | 160.648 |
| 1437.08 | 223.432 |

TABLE 15-continued

| Y | Z |
|---|---|
| 1438.38 | 163.277 |
| 1457.48 | 225.814 |
| 1458.75 | 165.891 |
| 1477.9 | 227.954 |
| 1479.13 | 168.456 |
| 1498.35 | 229.859 |
| 1499.51 | 170.962 |
| 1518.82 | 231.532 |
| 1519.9 | 173.396 |
| 1539.3 | 232.978 |
| 1540.3 | 175.746 |
| 1559.81 | 234.179 |
| 1560.71 | 178.008 |
| 1580.32 | 235.13 |
| 1581.14 | 180.186 |
| 1600.84 | 235.855 |
| 1601.57 | 182.273 |
| 1621.37 | 236.324 |
| 1622 | 184.276 |
| 1641.91 | 236.674 |
| 1642.45 | 186.196 |
| 1662.44 | 236.875 |
| 1662.9 | 188.039 |
| 1682.98 | 236.939 |
| 1683.36 | 189.805 |
| 1703.52 | 236.868 |
| 1703.83 | 191.497 |
| 1724.05 | 236.677 |
| 1724.3 | 193.112 |
| 1744.59 | 236.37 |
| 1744.78 | 194.65 |
| 1765.12 | 235.946 |
| 1765.27 | 196.107 |
| 1785.65 | 235.411 |
| 1785.76 | 197.485 |
| 1806.18 | 234.787 |
| 1806.25 | 198.783 |
| 1826.7 | 234.064 |
| 1826.75 | 200.009 |
| 1847.22 | 233.251 |
| 1847.26 | 201.131 |
| 1867.74 | 232.424 |
| 1867.77 | 202.191 |
| 1888.25 | 231.426 |
| 1888.28 | 203.147 |
| 1908.76 | 230.371 |
| 1908.8 | 203.989 |
| 1929.27 | 229.267 |
| 1929.33 | 204.7 |
| 1949.77 | 228.098 |
| 1949.86 | 205.263 |
| 1970.27 | 226.851 |
| 1970.39 | 205.692 |
| 1990.76 | 225.513 |
| 1990.92 | 205.983 |
| 2011.25 | 224.09 |
| 2011.46 | 206.152 |
| 2031.73 | 222.595 |
| 2031.99 | 206.21 |
| 2052.21 | 221.044 |
| 2052.53 | 206.14 |
| 2072.68 | 219.449 |
| 2073.07 | 205.946 |
| 2093.15 | 217.78 |
| 2093.6 | 205.636 |
| 2113.61 | 215.984 |
| 2114.13 | 205.228 |
| 2134.05 | 214.012 |
| 2134.66 | 204.737 |
| 2154.47 | 211.812 |
| 2155.19 | 204.217 |
| 2174.86 | 209.334 |
| 2175.72 | 203.601 |
| 2195.2 | 206.53 |
| 2196.24 | 202.872 |
| 2215.49 | 203.349 |

Figure 21:
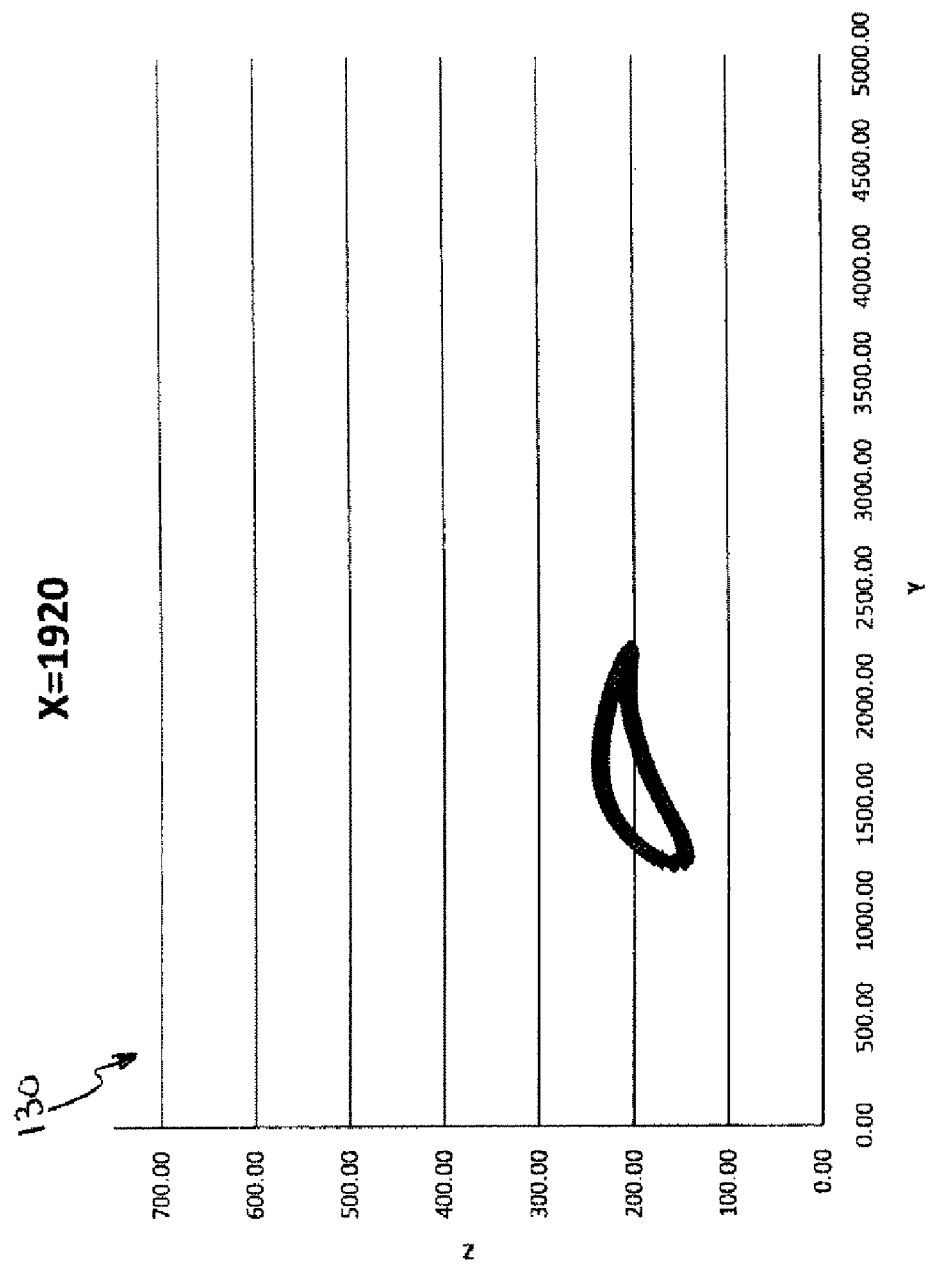
FIG. 21 is a graphical representation of Y and Z positions of upper and lower surfaces of the aircraft of FIG. 1 taken at an X position substantially equal to 1920.0.

The upper and lower surfaces 28, 30 are defined at Y and Z positions corresponding substantially to the X position of 1920.0, as shown in Table 16 and at 130 in FIG. 21.

TABLE 16

| Y | Z |
| --- | --- |
| 1229.68 | 158.946 |
| 1240.54 | 147.15 |
| 1245.1 | 171.272 |
| 1260.5 | 146.238 |
| 1263.28 | 179.54 |
| 1280.47 | 146.503 |
| 1282.09 | 186.268 |
| 1300.44 | 147.304 |
| 1301.21 | 192.056 |
| 1320.39 | 148.467 |
| 1320.51 | 197.232 |
| 1339.95 | 201.876 |
| 1340.32 | 149.922 |
| 1359.48 | 206.081 |
| 1360.23 | 151.581 |
| 1379.1 | 209.896 |
| 1380.12 | 153.519 |
| 1398.77 | 213.373 |
| 1399.98 | 155.653 |
| 1418.5 | 216.544 |
| 1419.83 | 157.978 |
| 1438.27 | 219.424 |
| 1439.66 | 160.452 |
| 1458.08 | 222.044 |
| 1459.48 | 162.989 |
| 1477.92 | 224.413 |
| 1479.3 | 165.515 |
| 1497.79 | 226.547 |
| 1499.12 | 167.995 |
| 1517.68 | 228.452 |
| 1518.96 | 170.423 |
| 1537.59 | 230.133 |
| 1538.8 | 172.786 |
| 1557.52 | 231.59 |
| 1558.65 | 175.074 |
| 1577.46 | 232.812 |
| 1578.51 | 177.284 |
| 1597.42 | 233.788 |
| 1598.38 | 179.417 |
| 1617.39 | 234.546 |
| 1618.25 | 181.472 |
| 1637.36 | 235.054 |
| 1638.14 | 183.449 |
| 1657.34 | 235.446 |
| 1658.03 | 185.353 |
| 1677.32 | 235.695 |
| 1677.92 | 187.187 |
| 1697.3 | 235.808 |
| 1697.83 | 188.953 |
| 1717.28 | 235.793 |
| 1717.74 | 190.653 |
| 1737.26 | 235.659 |
| 1737.65 | 192.283 |
| 1757.25 | 235.412 |
| 1757.57 | 193.844 |
| 1777.22 | 235.051 |
| 1777.5 | 195.334 |
| 1797.2 | 234.584 |
| 1797.43 | 196.752 |
| 1817.17 | 234.029 |
| 1817.36 | 198.1 |
| 1837.14 | 233.377 |
| 1837.31 | 199.376 |
| 1857.11 | 232.638 |
| 1857.25 | 200.574 |
| 1877.08 | 231.885 |
| 1877.2 | 201.705 |
| 1897.04 | 230.966 |
| 1897.16 | 202.743 |
| 1917 | 229.992 |
| 1917.12 | 203.673 |
| 1936.95 | 228.97 |
| 1937.08 | 204.471 |

TABLE 16-continued

| Y | Z |
| --- | --- |
| 1956.91 | 227.885 |
| 1957.05 | 205.124 |
| 1976.85 | 226.724 |
| 1977.03 | 205.646 |
| 1996.8 | 225.474 |
| 1997 | 206.029 |
| 2016.73 | 224.142 |
| 2016.98 | 206.305 |
| 2036.67 | 222.739 |
| 2036.97 | 206.465 |
| 2056.59 | 221.283 |
| 2056.95 | 206.501 |
| 2076.52 | 219.783 |
| 2076.93 | 206.414 |
| 2096.44 | 218.211 |
| 2096.91 | 206.216 |
| 2116.35 | 216.516 |
| 2116.89 | 205.92 |
| 2136.24 | 214.649 |
| 2136.87 | 205.539 |
| 2156.11 | 212.56 |
| 2156.84 | 205.123 |
| 2175.96 | 210.202 |
| 2176.82 | 204.596 |
| 2195.76 | 207.524 |
| 2196.79 | 203.956 |
| 2215.51 | 204.481 |

Figure 22:
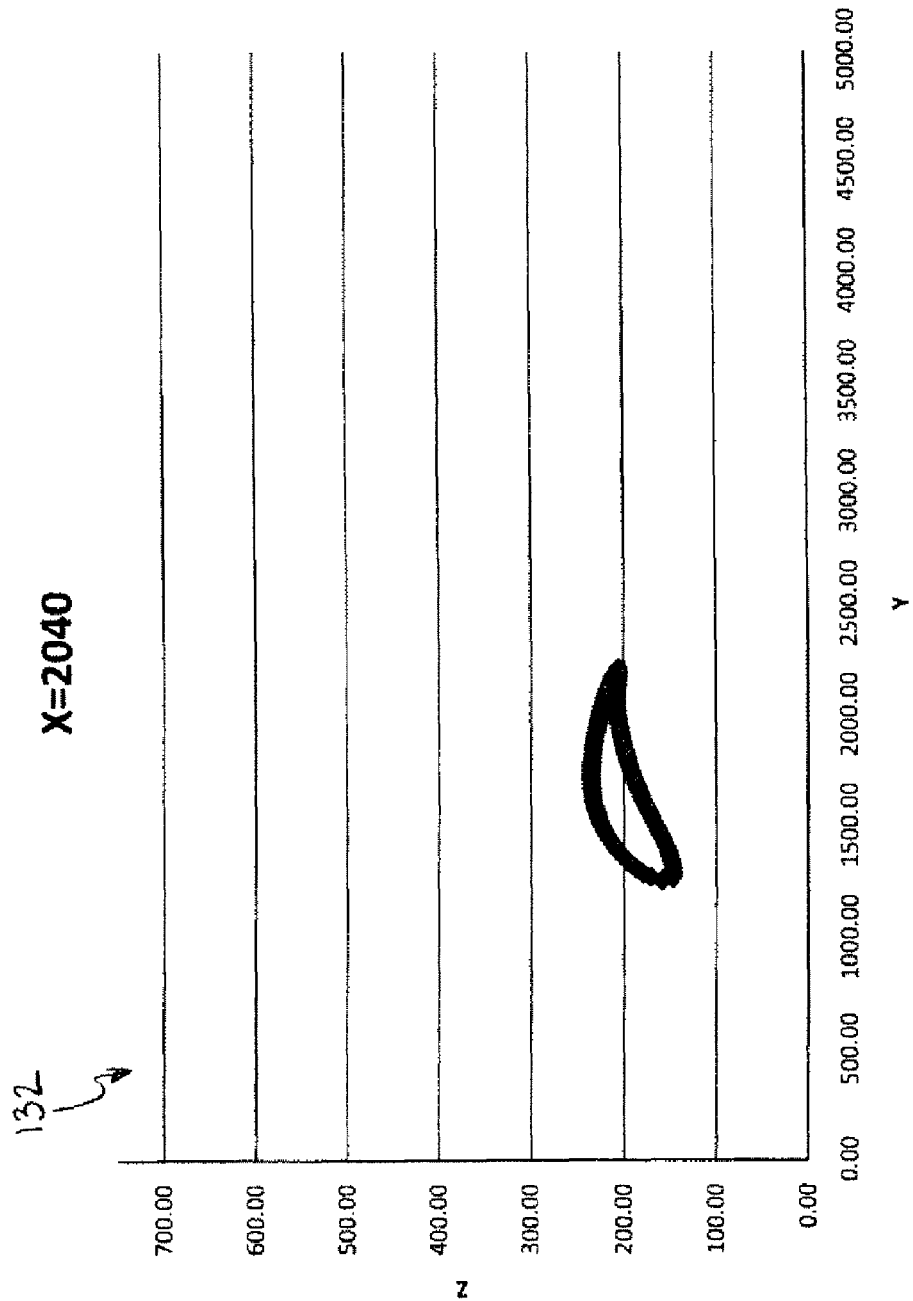
FIG. 22 is a graphical representation of Y and Z positions of upper and lower surfaces of the aircraft of FIG. 1 taken at an X position substantially equal to 2040.0.

The upper and lower surfaces 28, 30 are defined at Y and Z positions corresponding substantially to the X position of 2040.0, as shown in Table 17 and at 132 in FIG. 22.

TABLE 17

| Y | Z |
| --- | --- |
| 1257.18 | 158.719 |
| 1267.72 | 147.24 |
| 1272.15 | 170.731 |
| 1287.12 | 146.372 |
| 1289.8 | 178.815 |
| 1306.54 | 146.652 |
| 1308.07 | 185.405 |
| 1325.95 | 147.449 |
| 1326.65 | 191.083 |
| 1345.34 | 148.599 |
| 1345.4 | 196.166 |
| 1364.28 | 200.732 |
| 1364.72 | 150.029 |
| 1383.26 | 204.873 |
| 1384.08 | 151.654 |
| 1402.32 | 208.635 |
| 1403.41 | 153.541 |
| 1421.44 | 212.067 |
| 1422.73 | 155.613 |
| 1440.61 | 215.202 |
| 1442.02 | 157.865 |
| 1459.83 | 218.056 |
| 1461.3 | 160.257 |
| 1479.08 | 220.656 |
| 1480.58 | 162.703 |
| 1498.36 | 223.011 |
| 1499.85 | 165.138 |
| 1517.67 | 225.139 |
| 1519.13 | 167.534 |
| 1537.01 | 227.045 |
| 1538.41 | 169.885 |
| 1556.36 | 228.732 |
| 1557.7 | 172.178 |
| 1575.73 | 230.203 |
| 1577 | 174.404 |
| 1595.12 | 231.443 |
| 1596.31 | 176.561 |
| 1614.52 | 232.446 |
| 1615.62 | 178.651 |
| 1633.93 | 233.236 |

TABLE 17-continued

| Y | Z |
|---|---|
| 1634.94 | 180.67 |
| 1653.35 | 233.784 |
| 1654.27 | 182.622 |
| 1672.77 | 234.219 |
| 1673.61 | 184.51 |
| 1692.2 | 234.514 |
| 1692.95 | 186.335 |
| 1711.62 | 234.679 |
| 1712.3 | 188.101 |
| 1731.05 | 234.716 |
| 1731.65 | 189.808 |
| 1750.48 | 234.641 |
| 1751 | 191.454 |
| 1769.9 | 234.454 |
| 1770.37 | 193.039 |
| 1789.33 | 234.156 |
| 1789.73 | 194.56 |
| 1808.75 | 233.756 |
| 1809.11 | 196.019 |
| 1828.17 | 233.27 |
| 1828.48 | 197.417 |
| 1847.59 | 232.689 |
| 1847.86 | 198.748 |
| 1867 | 232.025 |
| 1867.25 | 200.008 |
| 1886.42 | 231.346 |
| 1886.64 | 201.217 |
| 1905.83 | 230.507 |
| 1906.03 | 202.338 |
| 1925.23 | 229.614 |
| 1925.43 | 203.356 |
| 1944.64 | 228.674 |
| 1944.84 | 204.243 |
| 1964.04 | 227.672 |
| 1964.25 | 204.984 |
| 1983.44 | 226.597 |
| 1983.67 | 205.597 |
| 2002.83 | 225.436 |
| 2003.09 | 206.081 |
| 2022.22 | 224.194 |
| 2022.51 | 206.454 |
| 2041.6 | 222.883 |
| 2041.94 | 206.719 |
| 2060.98 | 221.521 |
| 2061.37 | 206.863 |
| 2080.35 | 220.116 |
| 2080.79 | 206.883 |
| 2099.72 | 218.641 |
| 2100.22 | 206.796 |
| 2119.09 | 217.047 |
| 2119.65 | 206.612 |
| 2138.43 | 215.285 |
| 2139.07 | 206.343 |
| 2157.76 | 213.308 |
| 2158.49 | 206.03 |
| 2177.06 | 211.069 |
| 2177.92 | 205.592 |
| 2196.31 | 208.519 |
| 2197.34 | 205.04 |
| 2215.52 | 205.613 |

Figure 23:
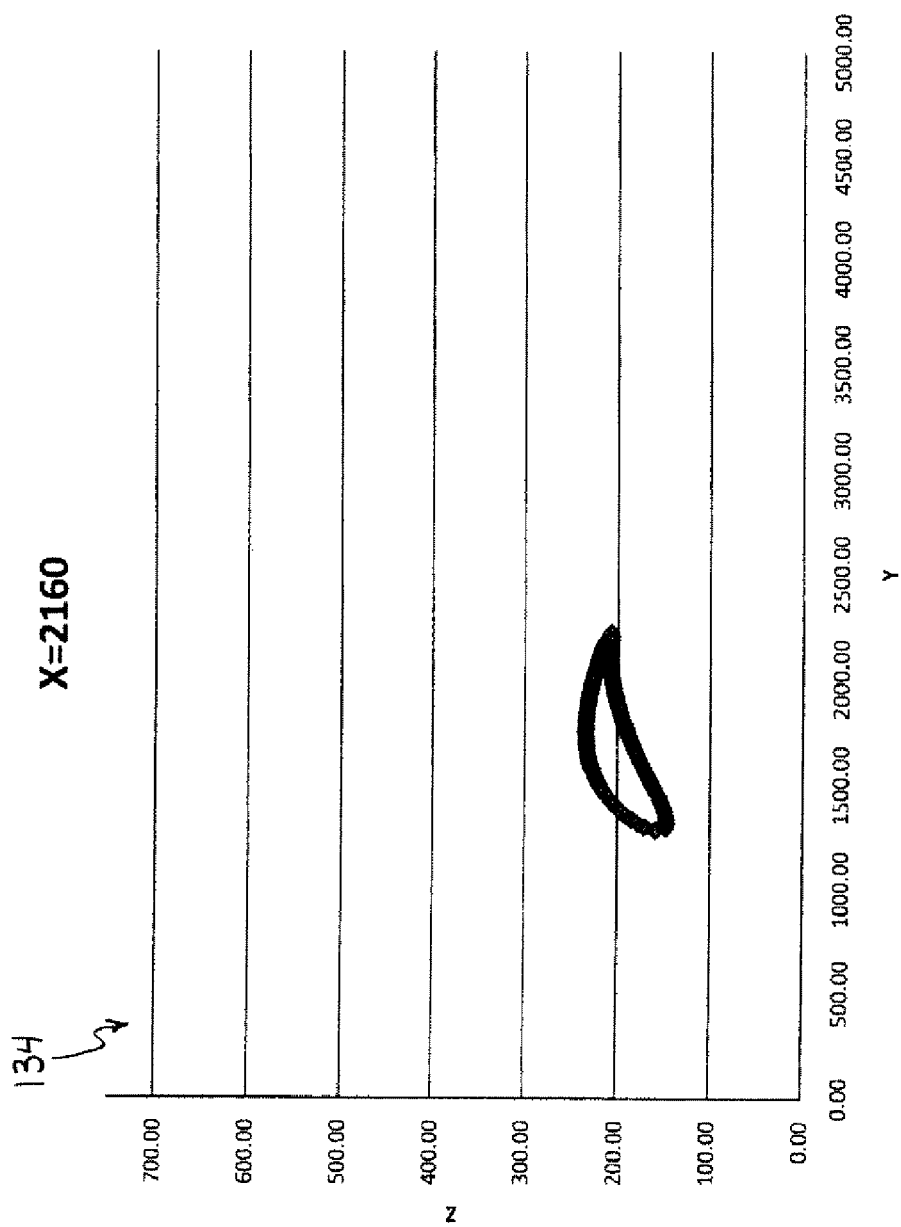
FIG. 23 is a graphical representation of Y and Z positions of upper and lower surfaces of the aircraft of FIG. 1 taken at an X position substantially equal to 2160.0.

The upper and lower surfaces 28, 30 are defined at Y and Z positions corresponding substantially to the X position of 2160.0, as shown in Table 18 and at 134 in FIG. 23.

TABLE 18

| Y | Z |
|---|---|
| 1284.67 | 158.489 |
| 1294.9 | 147.329 |
| 1299.19 | 170.189 |
| 1313.74 | 146.506 |
| 1316.32 | 178.089 |
| 1332.61 | 146.799 |
| 1334.05 | 184.541 |
| 1351.47 | 147.594 |
| 1352.08 | 190.109 |
| 1370.28 | 195.099 |
| 1370.31 | 148.731 |
| 1388.61 | 199.588 |
| 1389.13 | 150.135 |
| 1407.04 | 203.664 |
| 1407.93 | 151.727 |
| 1425.54 | 207.372 |
| 1426.71 | 153.562 |
| 1444.11 | 210.76 |
| 1445.48 | 155.574 |
| 1462.72 | 213.86 |
| 1464.22 | 157.753 |
| 1481.38 | 216.687 |
| 1482.95 | 160.062 |
| 1500.08 | 219.267 |
| 1501.68 | 162.418 |
| 1518.8 | 221.61 |
| 1520.41 | 164.763 |
| 1537.56 | 223.732 |
| 1539.14 | 167.075 |
| 1556.33 | 225.638 |
| 1557.87 | 169.347 |
| 1575.13 | 227.331 |
| 1576.61 | 171.569 |
| 1593.94 | 228.815 |
| 1595.36 | 173.734 |
| 1612.77 | 230.075 |
| 1614.11 | 175.839 |
| 1631.62 | 231.104 |
| 1632.88 | 177.884 |
| 1650.47 | 231.925 |
| 1651.64 | 179.87 |
| 1669.34 | 232.513 |
| 1670.42 | 181.796 |
| 1688.2 | 232.992 |
| 1689.2 | 183.668 |
| 1707.07 | 233.334 |
| 1707.98 | 185.484 |
| 1725.94 | 233.549 |
| 1726.77 | 187.25 |
| 1744.81 | 233.64 |
| 1745.57 | 188.964 |
| 1763.69 | 233.621 |
| 1764.36 | 190.624 |
| 1782.56 | 233.495 |
| 1783.17 | 192.233 |
| 1801.43 | 233.262 |
| 1801.98 | 193.786 |
| 1820.3 | 232.926 |
| 1820.79 | 195.286 |
| 1839.17 | 232.51 |
| 1839.61 | 196.734 |
| 1858.03 | 232.003 |
| 1858.43 | 198.125 |
| 1876.9 | 231.411 |
| 1877.25 | 199.453 |
| 1895.76 | 230.808 |
| 1896.08 | 200.731 |
| 1914.61 | 230.048 |
| 1914.92 | 201.934 |
| 1933.47 | 229.235 |
| 1933.76 | 203.037 |
| 1952.32 | 228.377 |
| 1952.6 | 204.013 |
| 1971.17 | 227.459 |
| 1971.46 | 204.845 |
| 1990.02 | 226.47 |
| 1990.32 | 205.549 |
| 2008.86 | 225.397 |
| 2009.18 | 206.133 |
| 2027.7 | 224.246 |
| 2028.05 | 206.605 |
| 2046.53 | 223.028 |
| 2046.91 | 206.976 |
| 2065.36 | 221.76 |
| 2065.79 | 207.223 |

TABLE 18-continued

| Y | Z |
|---|---|
| 2084.19 | 220.45 |
| 2084.66 | 207.353 |
| 2103.01 | 219.072 |
| 2103.53 | 207.376 |
| 2121.82 | 217.579 |
| 2122.4 | 207.304 |
| 2140.62 | 215.922 |
| 2141.27 | 207.147 |
| 2159.4 | 214.057 |
| 2160.15 | 206.938 |
| 2178.15 | 211.936 |
| 2179.01 | 206.587 |
| 2196.87 | 209.513 |
| 2197.88 | 206.124 |
| 2215.54 | 206.745 |

Figure 24:
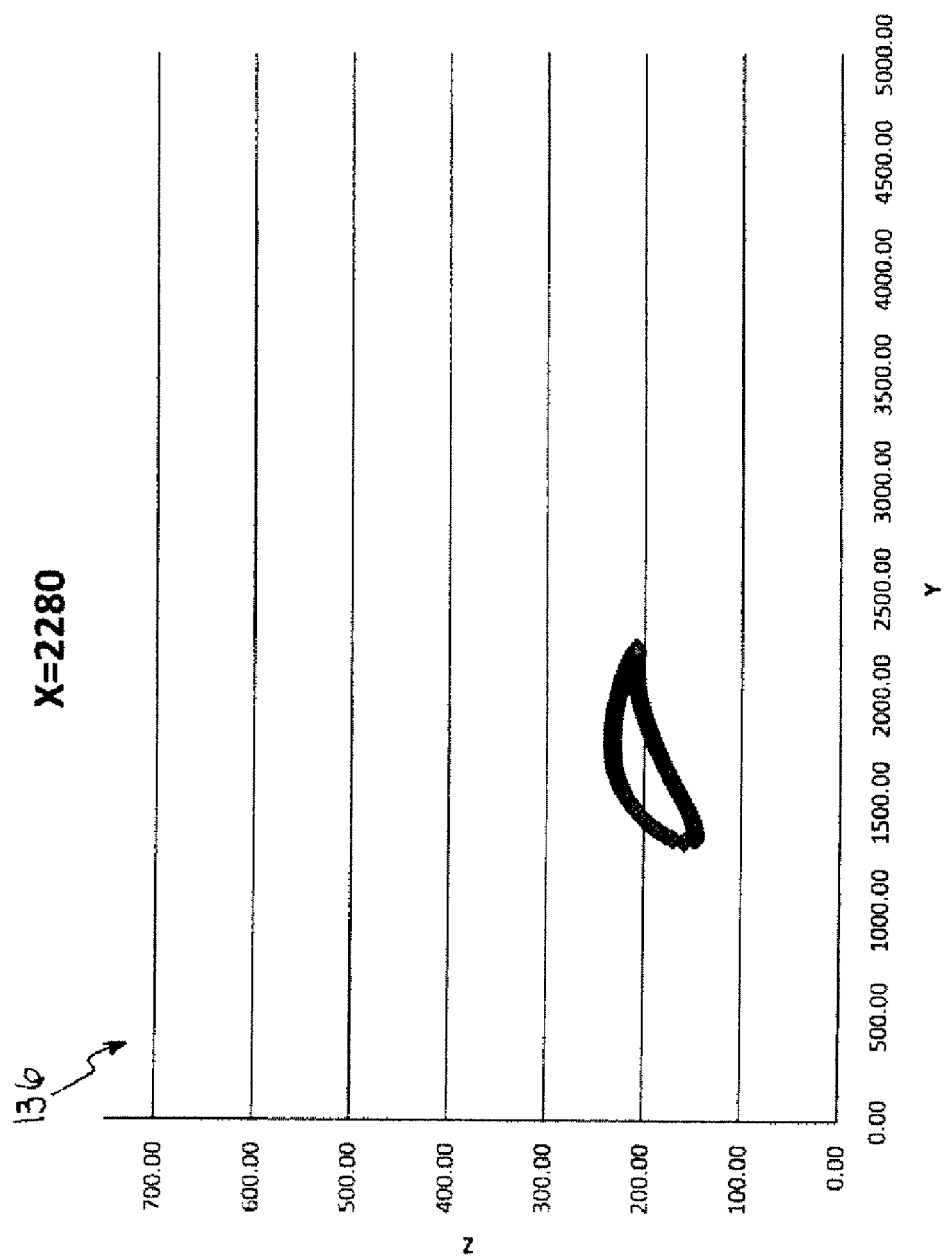
FIG. 24 is a graphical representation of Y and Z positions of upper and lower surfaces of the aircraft of FIG. 1 taken at an X position substantially equal to 2280.0.

The upper and lower surfaces 28, 30 are defined at Y and Z positions corresponding substantially to the X position of 2280.0, as shown in Table 19 and at 136 in FIG. 24.

TABLE 19

| Y | Z |
|---|---|
| 1312.16 | 158.26 |
| 1322.08 | 147.42 |
| 1326.23 | 169.65 |
| 1340.37 | 146.64 |
| 1342.83 | 177.36 |
| 1358.69 | 146.95 |
| 1360.03 | 183.68 |
| 1376.99 | 147.74 |
| 1377.51 | 189.13 |
| 1395.16 | 194.03 |
| 1395.27 | 148.86 |
| 1412.94 | 198.44 |
| 1413.54 | 150.24 |
| 1430.81 | 202.45 |
| 1431.79 | 151.8 |
| 1448.76 | 206.11 |
| 1450.02 | 153.58 |
| 1466.77 | 209.45 |
| 1468.23 | 155.54 |
| 1484.83 | 212.52 |
| 1486.43 | 157.64 |
| 1502.94 | 215.32 |
| 1504.61 | 159.87 |
| 1521.07 | 217.88 |
| 1522.79 | 162.13 |
| 1539.24 | 220.21 |
| 1540.97 | 164.39 |
| 1557.44 | 222.32 |
| 1559.15 | 166.62 |
| 1575.66 | 224.23 |
| 1577.34 | 168.81 |
| 1593.9 | 225.93 |
| 1595.53 | 170.96 |
| 1612.15 | 227.43 |
| 1613.73 | 173.06 |
| 1630.43 | 228.71 |
| 1631.93 | 175.12 |
| 1648.71 | 229.76 |
| 1650.14 | 177.12 |
| 1667.01 | 230.62 |
| 1668.35 | 179.07 |
| 1685.32 | 231.24 |
| 1686.57 | 180.97 |
| 1703.63 | 231.76 |
| 1704.79 | 182.83 |
| 1721.94 | 232.15 |
| 1723.02 | 184.63 |
| 1740.26 | 232.42 |
| 1741.26 | 186.4 |
| 1758.58 | 232.57 |
| 1759.49 | 188.12 |
| 1776.89 | 232.6 |

TABLE 19-continued

| Y | Z |
|---|---|
| 1777.73 | 189.8 |
| 1795.21 | 232.54 |
| 1795.98 | 191.43 |
| 1813.53 | 232.37 |
| 1814.23 | 193.01 |
| 1831.85 | 232.1 |
| 1832.48 | 194.55 |
| 1850.16 | 231.75 |
| 1850.74 | 196.04 |
| 1868.47 | 231.32 |
| 1869 | 197.49 |
| 1886.78 | 230.8 |
| 1887.26 | 198.89 |
| 1905.09 | 230.27 |
| 1905.53 | 200.24 |
| 1923.4 | 229.59 |
| 1923.81 | 201.53 |
| 1941.7 | 228.86 |
| 1942.08 | 202.72 |
| 1960.01 | 228.08 |
| 1960.37 | 203.78 |
| 1978.3 | 227.25 |
| 1978.67 | 204.7 |
| 1996.6 | 226.34 |
| 1996.97 | 205.5 |
| 2014.89 | 225.36 |
| 2015.27 | 206.18 |
| 2033.18 | 224.3 |
| 2033.58 | 206.76 |
| 2051.46 | 223.17 |
| 2051.89 | 207.23 |
| 2069.74 | 222 |
| 2070.21 | 207.58 |
| 2088.02 | 220.78 |
| 2088.52 | 207.82 |
| 2106.29 | 219.5 |
| 2106.84 | 207.96 |
| 2124.56 | 218.11 |
| 2125.16 | 208 |
| 2142.81 | 216.56 |
| 2143.48 | 207.95 |
| 2161.05 | 214.81 |
| 2161.8 | 207.84 |
| 2179.25 | 212.8 |
| 2180.11 | 207.58 |
| 2197.43 | 210.51 |
| 2198.43 | 207.21 |
| 2215.56 | 207.88 |

Figure 25:
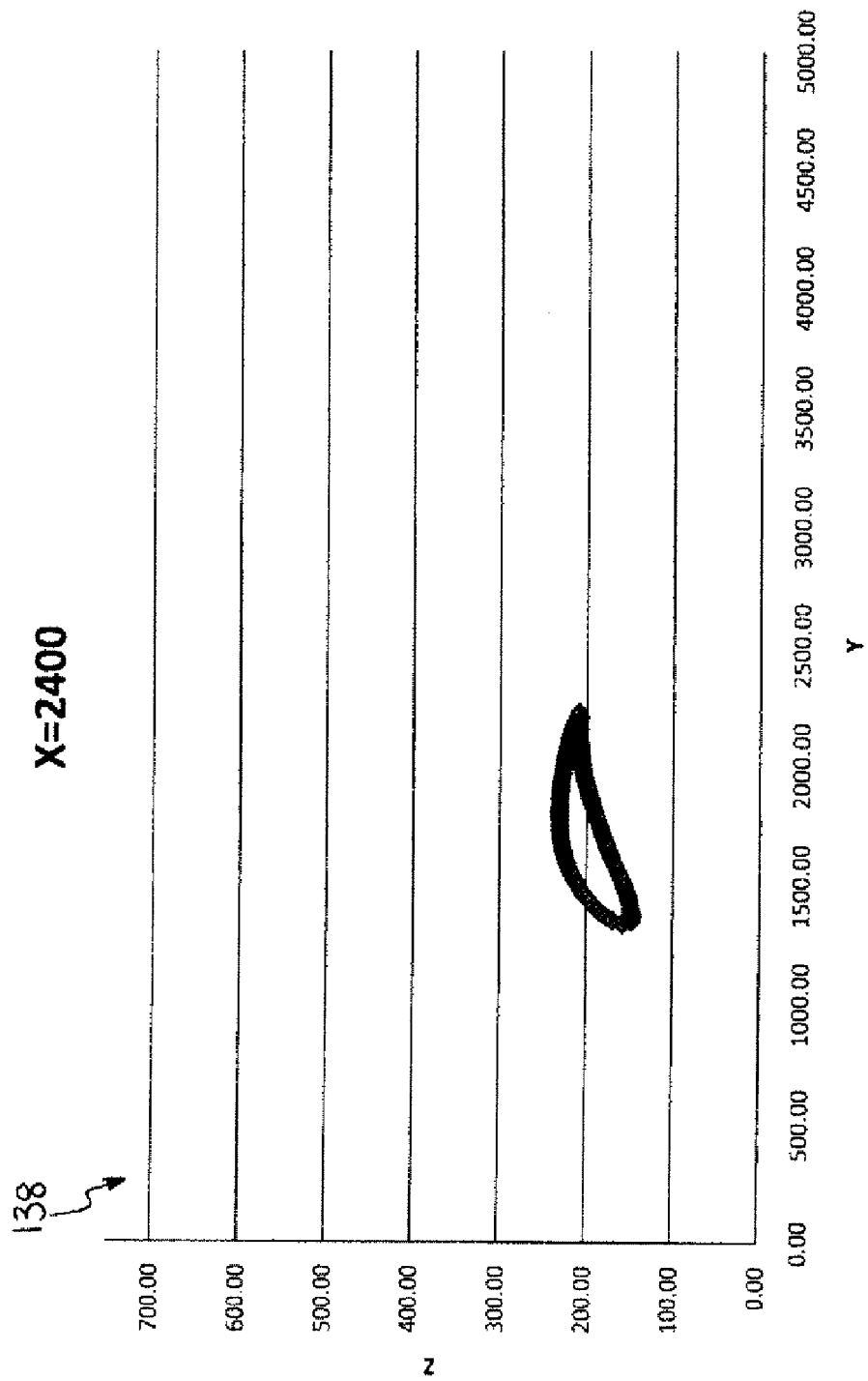
FIG. 25 is a graphical representation of Y and Z positions of upper and lower surfaces of the aircraft of FIG. 1 taken at an X position substantially equal to 2400.0.

The upper and lower surfaces 28, 30 are defined at Y and Z positions corresponding substantially to the X position of 2400.0, as shown in Table 20 and at 138 in FIG. 25.

TABLE 20

| Y | Z |
|---|---|
| 1339.65 | 158.021 |
| 1349.26 | 147.505 |
| 1353.27 | 169.1 |
| 1367 | 146.773 |
| 1369.35 | 176.634 |
| 1384.77 | 147.093 |
| 1386 | 182.811 |
| 1402.51 | 147.885 |
| 1402.94 | 188.158 |
| 1420.04 | 192.964 |
| 1420.24 | 148.993 |
| 1437.27 | 197.299 |
| 1437.95 | 150.349 |
| 1454.59 | 201.245 |
| 1455.65 | 151.874 |
| 1471.98 | 204.846 |
| 1473.33 | 153.607 |
| 1489.43 | 208.146 |
| 1490.99 | 155.497 |

TABLE 20-continued

| Y | Z |
|---|---|
| 1506.94 | 211.176 |
| 1508.64 | 157.532 |
| 1524.48 | 213.948 |
| 1526.28 | 159.675 |
| 1542.07 | 216.489 |
| 1543.91 | 161.849 |
| 1559.68 | 218.807 |
| 1561.54 | 164.016 |
| 1577.32 | 220.917 |
| 1579.17 | 166.158 |
| 1594.98 | 222.823 |
| 1596.81 | 168.274 |
| 1612.66 | 224.53 |
| 1614.45 | 170.355 |
| 1630.36 | 226.04 |
| 1632.1 | 172.396 |
| 1648.08 | 227.339 |
| 1649.75 | 174.396 |
| 1665.81 | 228.421 |
| 1667.4 | 176.353 |
| 1683.55 | 229.308 |
| 1685.06 | 178.271 |
| 1701.3 | 229.974 |
| 1702.73 | 180.146 |
| 1719.06 | 230.538 |
| 1720.4 | 181.984 |
| 1736.81 | 230.973 |
| 1738.07 | 183.784 |
| 1754.58 | 231.289 |
| 1755.75 | 185.547 |
| 1772.34 | 231.489 |
| 1773.43 | 187.276 |
| 1790.1 | 231.585 |
| 1791.11 | 188.969 |
| 1807.87 | 231.58 |
| 1808.8 | 190.624 |
| 1825.63 | 231.473 |
| 1826.49 | 192.241 |
| 1843.39 | 231.272 |
| 1844.18 | 193.82 |
| 1861.15 | 230.993 |
| 1861.88 | 195.364 |
| 1878.91 | 230.629 |
| 1879.58 | 196.863 |
| 1896.67 | 230.186 |
| 1897.28 | 198.328 |
| 1914.43 | 229.732 |
| 1914.99 | 199.756 |
| 1932.19 | 229.13 |
| 1932.7 | 201.124 |
| 1949.94 | 228.478 |
| 1950.42 | 202.401 |
| 1967.69 | 227.784 |
| 1968.14 | 203.555 |
| 1985.44 | 227.034 |
| 1985.88 | 204.564 |
| 2003.18 | 226.216 |
| 2003.62 | 205.45 |
| 2020.92 | 225.32 |
| 2021.37 | 206.236 |
| 2038.66 | 224.349 |
| 2039.12 | 206.903 |
| 2056.39 | 223.317 |
| 2056.87 | 207.485 |
| 2074.13 | 222.237 |
| 2074.63 | 207.943 |
| 2091.85 | 221.117 |
| 2092.39 | 208.294 |
| 2109.58 | 219.934 |
| 2110.16 | 208.535 |
| 2127.3 | 218.642 |
| 2127.92 | 208.689 |
| 2145 | 217.196 |
| 2145.68 | 208.752 |
| 2162.69 | 215.554 |
| 2163.45 | 208.75 |
| 2180.35 | 213.67 |
| 2181.21 | 208.577 |

TABLE 20-continued

| Y | Z |
|---|---|
| 2197.98 | 211.503 |
| 2198.97 | 208.292 |
| 2215.57 | 209.009 |

Figure 26:
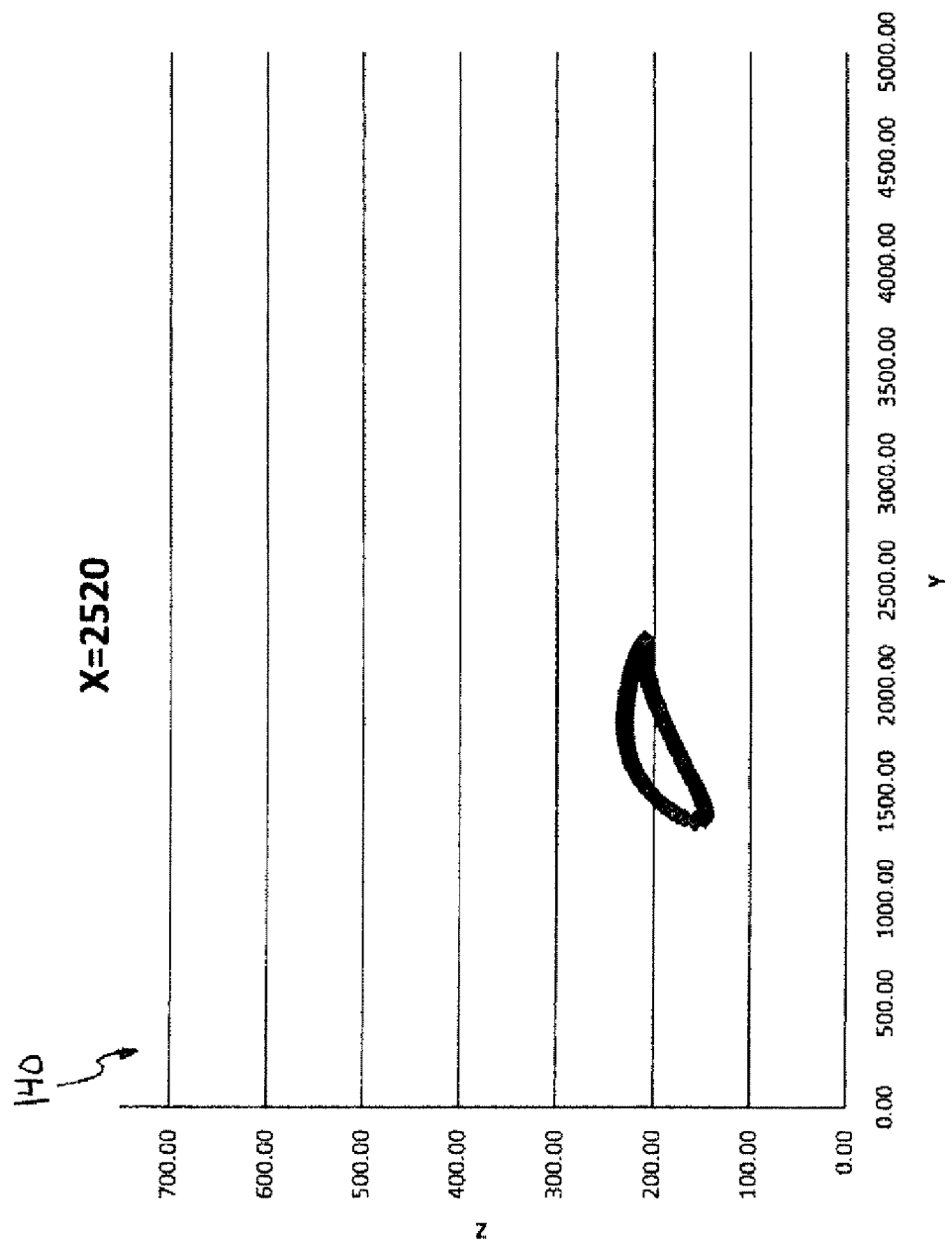
FIG. 26 is a graphical representation of Y and Z positions of upper and lower surfaces of the aircraft of FIG. 1 taken at an X position substantially equal to 2520.0.

The upper and lower surfaces 28, 30 are defined at Y and Z positions corresponding substantially to the X position of 2520.0, as shown in Table 21 and at 140 in FIG. 26.

TABLE 21

| Y | Z |
|---|---|
| 1367.13 | 157.624 |
| 1376.43 | 147.413 |
| 1380.29 | 168.397 |
| 1393.62 | 146.725 |
| 1395.84 | 175.754 |
| 1410.82 | 147.062 |
| 1411.96 | 181.799 |
| 1428.02 | 147.845 |
| 1428.35 | 187.046 |
| 1444.9 | 191.758 |
| 1445.19 | 148.938 |
| 1461.57 | 196.022 |
| 1462.35 | 150.267 |
| 1478.34 | 199.907 |
| 1479.5 | 151.76 |
| 1495.18 | 203.462 |
| 1496.62 | 153.439 |
| 1512.08 | 206.721 |
| 1513.74 | 155.27 |
| 1529.02 | 209.717 |
| 1530.84 | 157.234 |
| 1546.01 | 212.469 |
| 1547.92 | 159.292 |
| 1563.04 | 214.993 |
| 1565.01 | 161.377 |
| 1580.09 | 217.303 |
| 1582.09 | 163.454 |
| 1597.17 | 219.41 |
| 1599.18 | 165.513 |
| 1614.28 | 221.32 |
| 1616.27 | 167.55 |
| 1631.4 | 223.039 |
| 1633.36 | 169.561 |
| 1648.55 | 224.565 |
| 1650.46 | 171.542 |
| 1665.71 | 225.885 |
| 1667.56 | 173.491 |
| 1682.88 | 226.997 |
| 1684.66 | 175.407 |
| 1700.07 | 227.925 |
| 1701.77 | 177.291 |
| 1717.26 | 228.629 |
| 1718.88 | 179.143 |
| 1734.46 | 229.242 |
| 1735.99 | 180.965 |
| 1751.67 | 229.725 |
| 1753.11 | 182.758 |
| 1768.87 | 230.089 |
| 1770.23 | 184.523 |
| 1786.08 | 230.347 |
| 1787.35 | 186.26 |
| 1803.29 | 230.501 |
| 1804.48 | 187.969 |
| 1820.5 | 230.556 |
| 1821.61 | 189.649 |
| 1837.71 | 230.516 |
| 1838.74 | 191.3 |
| 1854.92 | 230.385 |
| 1855.87 | 192.921 |
| 1872.13 | 230.17 |
| 1873.01 | 194.512 |
| 1889.34 | 229.88 |
| 1890.15 | 196.075 |
| 1906.55 | 229.521 |

TABLE 21-continued

| Y | Z |
|---|---|
| 1907.29 | 197.61 |
| 1923.76 | 229.096 |
| 1924.44 | 199.114 |
| 1940.96 | 228.603 |
| 1941.59 | 200.566 |
| 1958.16 | 228.041 |
| 1958.74 | 201.933 |
| 1975.36 | 227.423 |
| 1975.91 | 203.178 |
| 1992.56 | 226.755 |
| 1993.08 | 204.283 |
| 2009.75 | 226.02 |
| 2010.27 | 205.267 |
| 2026.95 | 225.21 |
| 2027.45 | 206.149 |
| 2044.13 | 224.328 |
| 2044.65 | 206.925 |
| 2061.32 | 223.383 |
| 2061.84 | 207.596 |
| 2078.5 | 222.393 |
| 2079.05 | 208.161 |
| 2095.68 | 221.364 |
| 2096.25 | 208.622 |
| 2112.86 | 220.272 |
| 2113.46 | 208.981 |
| 2130.03 | 219.073 |
| 2130.67 | 209.241 |
| 2147.18 | 217.726 |
| 2147.88 | 209.413 |
| 2164.33 | 216.185 |
| 2165.09 | 209.51 |
| 2181.44 | 214.408 |
| 2182.3 | 209.426 |
| 2198.53 | 212.353 |
| 2199.51 | 209.219 |
| 2215.58 | 209.976 |

Figure 27:
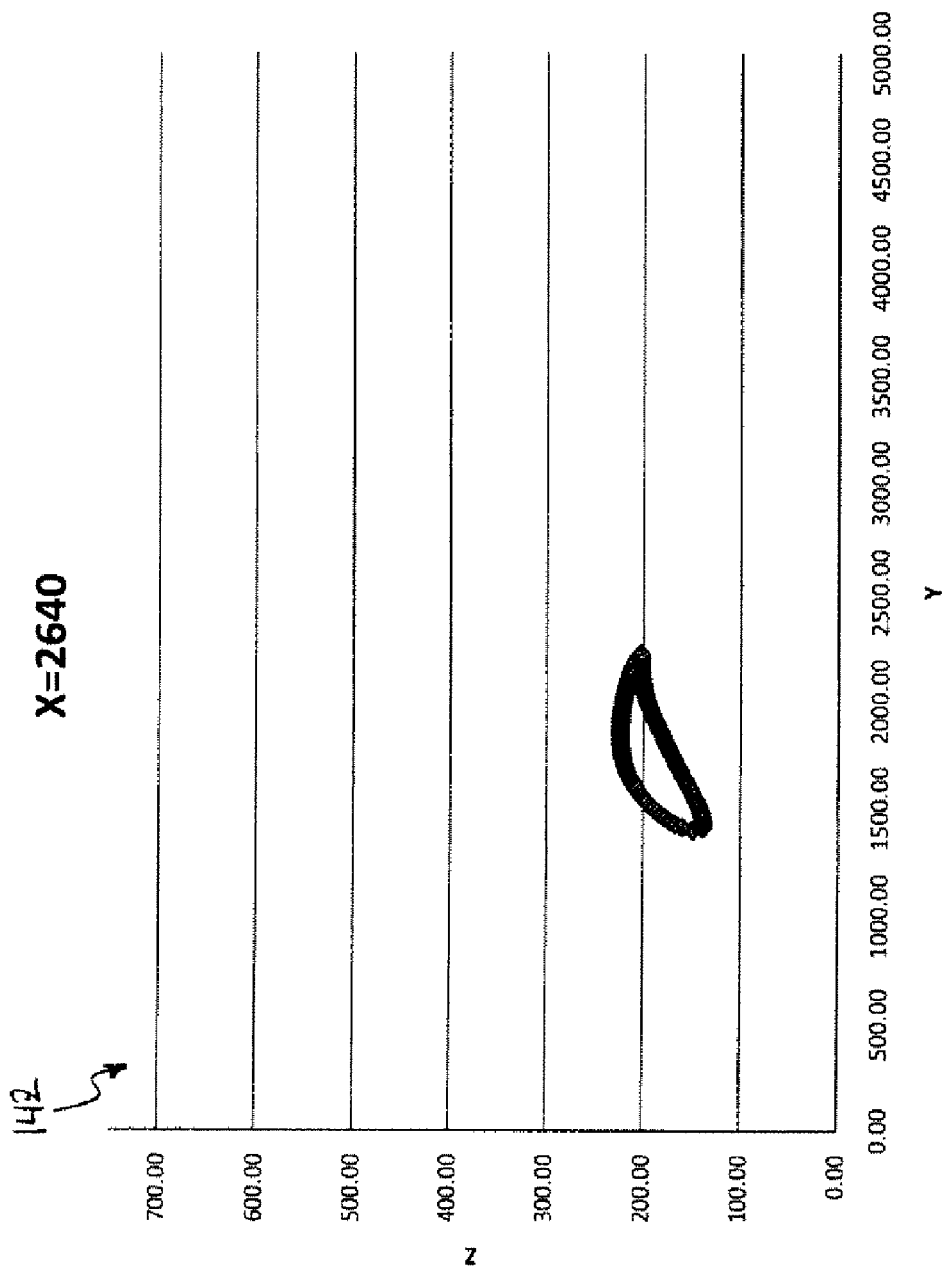
FIG. 27 is a graphical representation of Y and Z positions of upper and lower surfaces of the aircraft of FIG. 1 taken at an X position substantially equal to 2640.0.

The upper and lower surfaces 28, 30 are defined at Y and Z positions corresponding substantially to the X position of 2640.0, as shown in Table 22 and at 142 in FIG. 27.

TABLE 22

| Y | Z |
|---|---|
| 1394.47 | 149.48 |
| 1402.87 | 139.041 |
| 1407.13 | 160.038 |
| 1419.51 | 138.27 |
| 1422.1 | 167.358 |
| 1436.18 | 138.573 |
| 1437.63 | 173.403 |
| 1452.83 | 139.328 |
| 1453.44 | 178.668 |
| 1469.42 | 183.41 |
| 1469.46 | 140.384 |
| 1485.52 | 187.715 |
| 1486.08 | 141.676 |
| 1501.72 | 191.649 |
| 1502.69 | 143.13 |
| 1517.99 | 195.261 |
| 1519.28 | 144.746 |
| 1534.32 | 198.585 |
| 1535.85 | 146.506 |
| 1550.71 | 201.65 |
| 1552.41 | 148.398 |
| 1567.13 | 204.476 |
| 1568.96 | 150.384 |
| 1583.59 | 207.079 |
| 1585.51 | 152.398 |
| 1600.09 | 209.472 |
| 1602.05 | 154.408 |
| 1616.61 | 211.667 |
| 1618.6 | 156.407 |
| 1633.16 | 213.67 |
| 1635.15 | 158.393 |

TABLE 22-continued

| Y | Z |
|---|---|
| 1649.73 | 215.483 |
| 1651.7 | 160.363 |
| 1666.32 | 217.105 |
| 1668.26 | 162.314 |
| 1682.92 | 218.53 |
| 1684.81 | 164.245 |
| 1699.54 | 219.76 |
| 1701.37 | 166.154 |
| 1716.18 | 220.806 |
| 1717.93 | 168.042 |
| 1732.83 | 221.608 |
| 1734.49 | 169.909 |
| 1749.48 | 222.304 |
| 1751.06 | 171.756 |
| 1766.14 | 222.891 |
| 1767.63 | 173.584 |
| 1782.8 | 223.354 |
| 1784.2 | 175.394 |
| 1799.46 | 223.7 |
| 1800.77 | 177.184 |
| 1816.13 | 223.942 |
| 1817.34 | 178.957 |
| 1832.8 | 224.084 |
| 1833.92 | 180.711 |
| 1849.46 | 224.128 |
| 1850.5 | 182.445 |
| 1866.13 | 224.078 |
| 1867.08 | 184.158 |
| 1882.8 | 223.941 |
| 1883.66 | 185.852 |
| 1899.47 | 223.725 |
| 1900.24 | 187.526 |
| 1916.13 | 223.436 |
| 1916.83 | 189.182 |
| 1932.79 | 223.075 |
| 1933.41 | 190.819 |
| 1949.46 | 222.64 |
| 1950 | 192.427 |
| 1966.12 | 222.129 |
| 1966.6 | 193.966 |
| 1982.77 | 221.555 |
| 1983.21 | 195.387 |
| 1999.43 | 220.927 |
| 1999.83 | 196.655 |
| 2016.08 | 220.226 |
| 2016.46 | 197.793 |
| 2032.73 | 219.441 |
| 2033.09 | 198.819 |
| 2049.38 | 218.573 |
| 2049.74 | 199.731 |
| 2066.02 | 217.627 |
| 2066.39 | 200.529 |
| 2082.66 | 216.618 |
| 2083.04 | 201.213 |
| 2099.29 | 215.559 |
| 2099.7 | 201.78 |
| 2115.92 | 214.424 |
| 2116.36 | 202.23 |
| 2132.54 | 213.169 |
| 2133.03 | 202.564 |
| 2149.14 | 211.741 |
| 2149.69 | 202.785 |
| 2165.73 | 210.084 |
| 2166.36 | 202.904 |
| 2182.28 | 208.144 |
| 2183.03 | 202.792 |
| 2198.79 | 205.857 |
| 2199.69 | 202.501 |
| 2215.24 | 203.162 |

Figure 28:
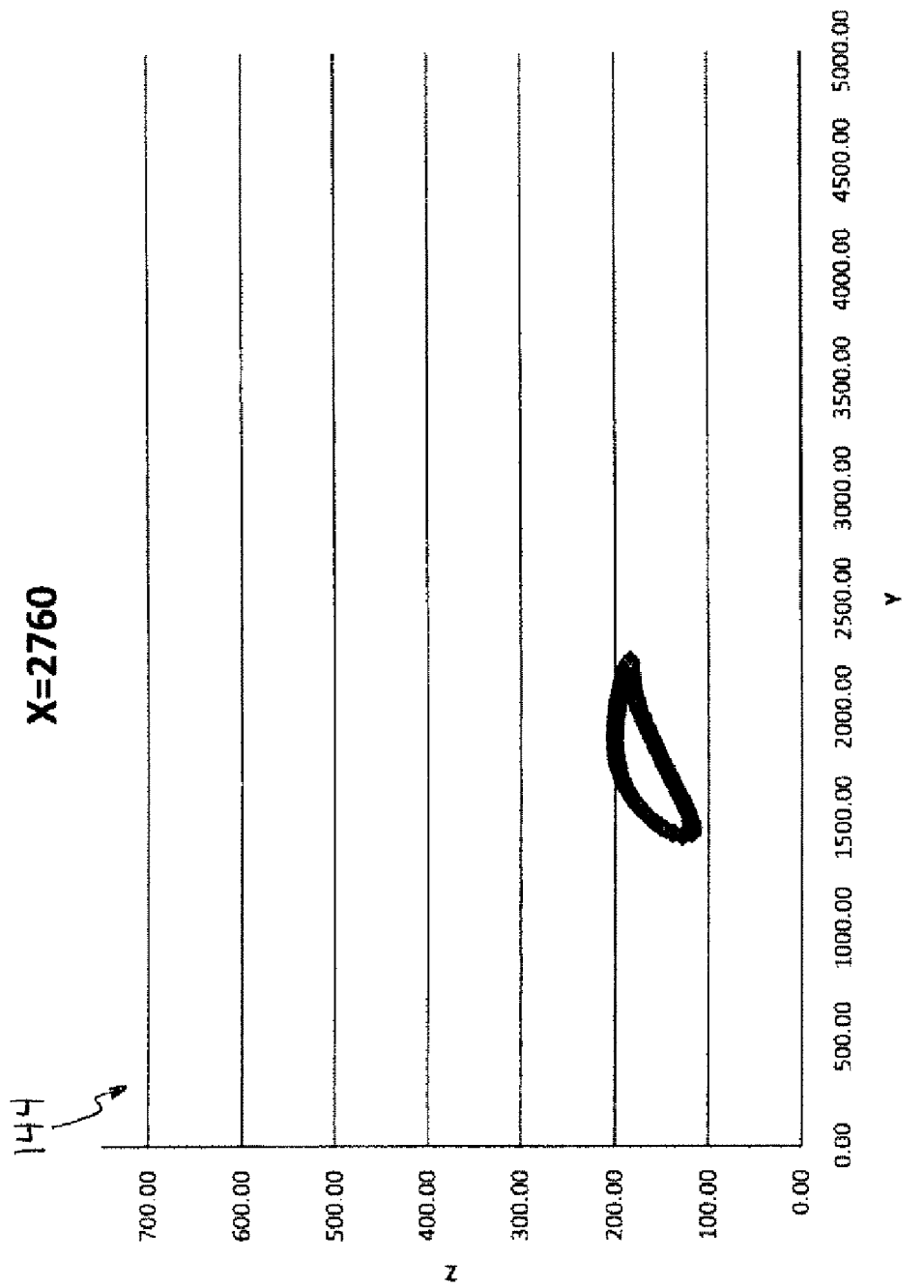
FIG. 28 is a graphical representation of Y and Z positions of upper and lower surfaces of the aircraft of FIG. 1 taken at an X position substantially equal to 2760.0.

The upper and lower surfaces 28, 30 are defined at Y and Z positions corresponding substantially to the X position of 2760.0, as shown in Table 23 and at 144 in FIG. 28.

TABLE 23

| Y | Z |
|---|---|
| 1423.1 | 128.141 |
| 1431.64 | 118.295 |
| 1435.19 | 138.463 |
| 1447.69 | 117.651 |
| 1449.59 | 145.592 |
| 1463.76 | 118.022 |
| 1464.55 | 151.467 |
| 1479.8 | 156.583 |
| 1479.82 | 118.823 |
| 1495.2 | 161.184 |
| 1495.86 | 119.92 |
| 1510.73 | 165.351 |
| 1511.88 | 121.235 |
| 1526.35 | 169.155 |
| 1527.89 | 122.708 |
| 1542.05 | 172.641 |
| 1543.89 | 124.331 |
| 1557.8 | 175.845 |
| 1559.87 | 126.091 |
| 1573.61 | 178.797 |
| 1575.83 | 127.968 |
| 1589.45 | 181.514 |
| 1591.79 | 129.91 |
| 1605.34 | 184.014 |
| 1607.75 | 131.858 |
| 1621.25 | 186.309 |
| 1623.71 | 133.798 |
| 1637.19 | 188.41 |
| 1639.67 | 135.729 |
| 1653.16 | 190.323 |
| 1655.63 | 137.649 |
| 1669.14 | 192.045 |
| 1671.6 | 139.555 |
| 1685.15 | 193.578 |
| 1687.56 | 141.445 |
| 1701.17 | 194.924 |
| 1703.53 | 143.319 |
| 1717.2 | 196.084 |
| 1719.5 | 145.176 |
| 1733.25 | 197.036 |
| 1735.47 | 147.018 |
| 1749.32 | 197.8 |
| 1751.44 | 148.843 |
| 1765.38 | 198.484 |
| 1767.42 | 150.654 |
| 1781.45 | 199.045 |
| 1783.39 | 152.45 |
| 1797.52 | 199.49 |
| 1799.37 | 154.232 |
| 1813.59 | 199.831 |
| 1815.35 | 156.001 |
| 1829.67 | 200.074 |
| 1831.33 | 157.755 |
| 1845.75 | 200.226 |
| 1847.31 | 159.495 |
| 1861.83 | 200.289 |
| 1863.3 | 161.22 |
| 1877.91 | 200.268 |
| 1879.28 | 162.929 |
| 1893.98 | 200.171 |
| 1895.27 | 164.624 |
| 1910.06 | 200.003 |
| 1911.26 | 166.306 |
| 1926.14 | 199.771 |
| 1927.25 | 167.975 |
| 1942.21 | 199.477 |
| 1943.24 | 169.625 |
| 1958.29 | 199.118 |
| 1959.24 | 171.236 |
| 1974.36 | 198.697 |
| 1975.24 | 172.761 |
| 1990.43 | 198.227 |
| 1991.26 | 174.163 |
| 2006.5 | 197.711 |
| 2007.28 | 175.43 |
| 2022.57 | 197.131 |
| 2023.32 | 176.589 |
| 2038.64 | 196.482 |

TABLE 23-continued

| Y | Z |
|---|---|
| 2039.36 | 177.657 |
| 2054.7 | 195.772 |
| 2055.41 | 178.629 |
| 2070.76 | 195.013 |
| 2071.46 | 179.502 |
| 2086.82 | 194.211 |
| 2087.52 | 180.278 |
| 2102.87 | 193.381 |
| 2103.58 | 180.959 |
| 2118.93 | 192.495 |
| 2119.65 | 181.547 |
| 2134.98 | 191.517 |
| 2135.72 | 182.047 |
| 2151.02 | 190.409 |
| 2151.79 | 182.466 |
| 2167.04 | 189.136 |
| 2167.86 | 182.798 |
| 2183.05 | 187.662 |
| 2183.94 | 182.937 |
| 2199.04 | 185.957 |
| 2200.01 | 182.967 |
| 2215 | 183.991 |

Figure 29:
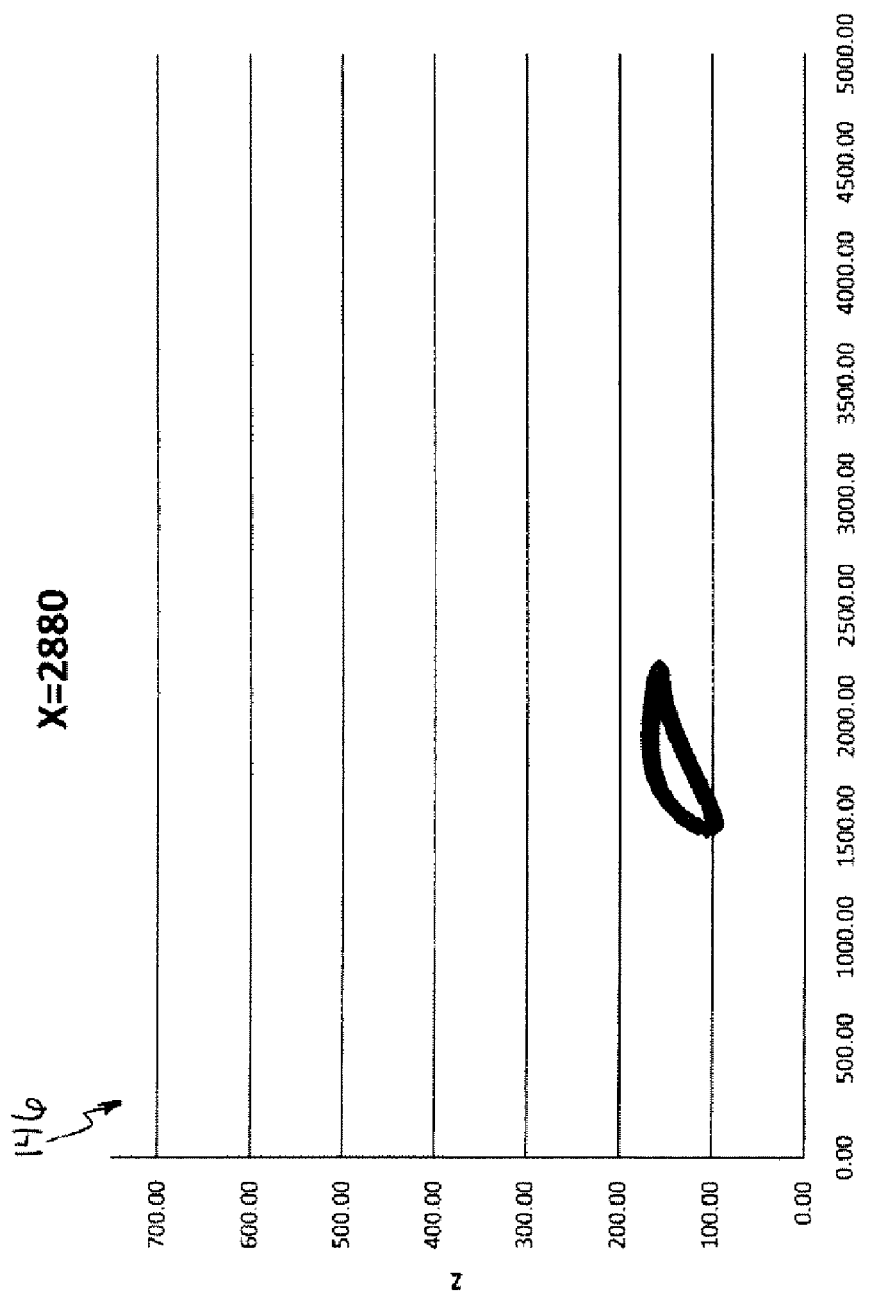
FIG. 29 is a graphical representation of Y and Z positions of upper and lower surfaces of the aircraft of FIG. 1 taken at an X position substantially equal to 2880.0.

The upper and lower surfaces 28, 30 are defined at Y and Z positions corresponding substantially to the X position of 2880.0, as shown in Table 24 and at 146 in FIG. 29.

TABLE 24

| Y | Z |
|---|---|
| 1491.84 | 105.988 |
| 1500.75 | 97.6649 |
| 1502.74 | 115.477 |
| 1515.39 | 97.2462 |
| 1515.94 | 121.839 |
| 1529.66 | 126.996 |
| 1530.04 | 97.6842 |
| 1543.63 | 131.459 |
| 1544.67 | 98.4911 |
| 1557.74 | 135.423 |
| 1559.29 | 99.5643 |
| 1571.97 | 138.976 |
| 1573.89 | 100.816 |
| 1586.28 | 142.189 |
| 1588.48 | 102.209 |
| 1600.65 | 145.107 |
| 1603.05 | 103.733 |
| 1615.07 | 147.767 |
| 1617.62 | 105.371 |
| 1629.53 | 150.197 |
| 1632.17 | 107.095 |
| 1644.02 | 152.414 |
| 1646.72 | 108.843 |
| 1658.54 | 154.437 |
| 1661.27 | 110.582 |
| 1673.09 | 156.279 |
| 1675.82 | 112.31 |
| 1687.66 | 157.948 |
| 1690.38 | 114.027 |
| 1702.24 | 159.447 |
| 1704.93 | 115.729 |
| 1716.85 | 160.78 |
| 1719.49 | 117.415 |
| 1731.46 | 161.95 |
| 1734.05 | 119.084 |
| 1746.09 | 162.963 |
| 1748.61 | 120.736 |
| 1760.73 | 163.807 |
| 1763.18 | 122.371 |
| 1775.38 | 164.485 |
| 1777.74 | 123.989 |
| 1790.03 | 165.093 |
| 1792.31 | 125.592 |
| 1804.68 | 165.606 |
| 1806.88 | 127.179 |

TABLE 24-continued

| Y | Z |
|---|---|
| 1819.34 | 166.027 |
| 1821.45 | 128.751 |
| 1834 | 166.365 |
| 1836.02 | 130.308 |
| 1848.66 | 166.627 |
| 1850.59 | 131.85 |
| 1863.32 | 166.82 |
| 1865.17 | 133.376 |
| 1877.99 | 166.946 |
| 1879.75 | 134.888 |
| 1892.65 | 167.011 |
| 1894.32 | 136.382 |
| 1907.31 | 167.019 |
| 1908.9 | 137.861 |
| 1921.97 | 166.977 |
| 1923.49 | 139.324 |
| 1936.64 | 166.889 |
| 1938.07 | 140.772 |
| 1951.3 | 166.759 |
| 1952.65 | 142.204 |
| 1965.96 | 166.588 |
| 1967.24 | 143.615 |
| 1980.62 | 166.376 |
| 1981.83 | 144.983 |
| 1995.29 | 166.127 |
| 1996.43 | 146.278 |
| 2009.95 | 165.849 |
| 2011.04 | 147.478 |
| 2024.61 | 165.542 |
| 2025.65 | 148.576 |
| 2039.27 | 165.194 |
| 2040.27 | 149.597 |
| 2053.92 | 164.805 |
| 2054.89 | 150.546 |
| 2068.58 | 164.379 |
| 2069.52 | 151.424 |
| 2083.24 | 163.923 |
| 2084.15 | 152.23 |
| 2097.89 | 163.442 |
| 2098.79 | 152.962 |
| 2112.55 | 162.944 |
| 2113.43 | 153.623 |
| 2127.2 | 162.413 |
| 2128.07 | 154.213 |
| 2141.85 | 161.823 |
| 2142.72 | 154.734 |
| 2156.5 | 161.148 |
| 2157.37 | 155.189 |
| 2171.14 | 160.359 |
| 2172.02 | 155.578 |
| 2185.77 | 159.427 |
| 2186.67 | 155.828 |
| 2200.4 | 158.32 |
| 2201.32 | 155.961 |
| 2215 | 157.003 |

Figure 30:
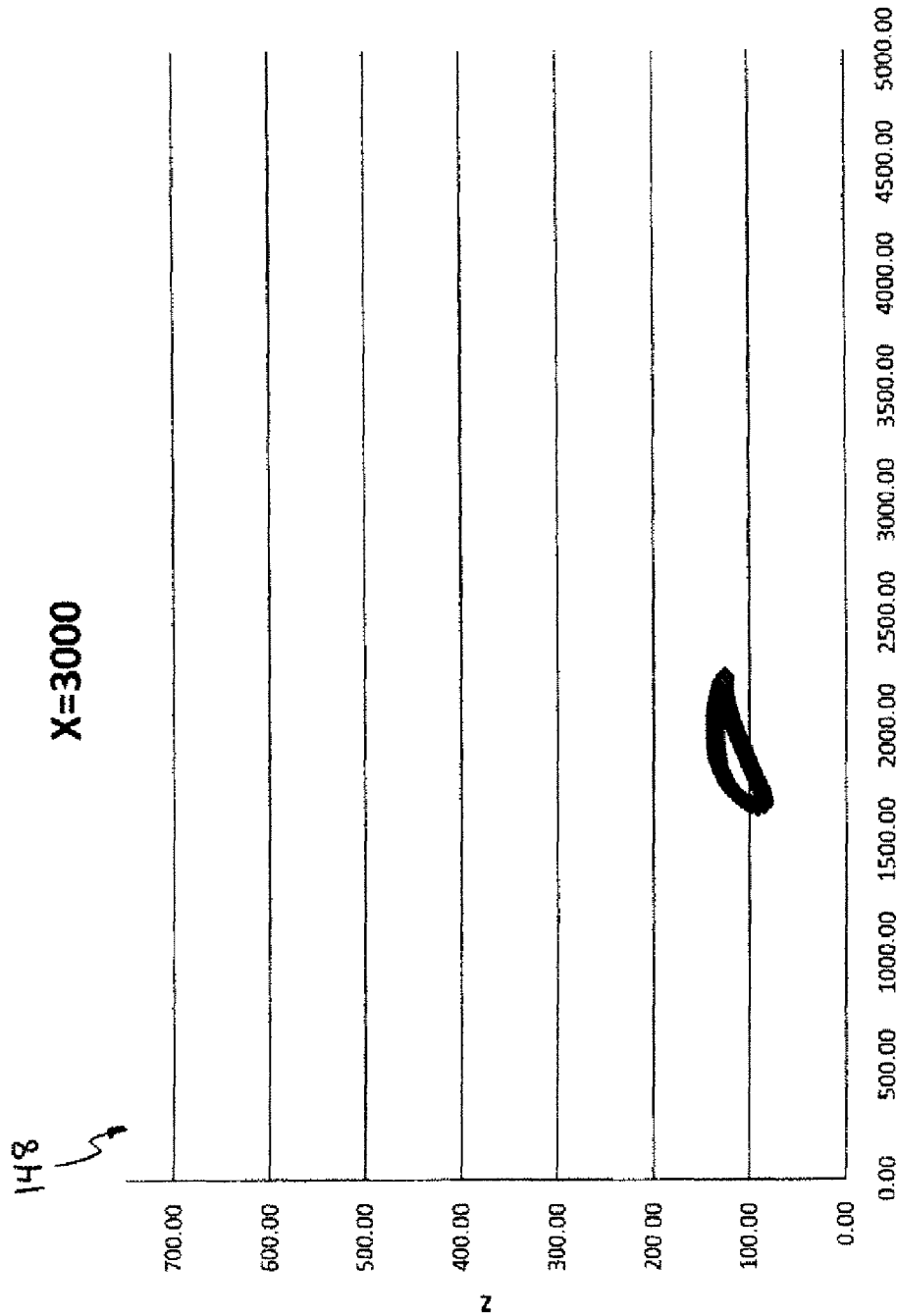
FIG. 30 is a graphical representation of Y and Z positions of upper and lower surfaces of the aircraft of FIG. 1 taken at an X position substantially equal to 3000.0.

The upper and lower surfaces 28, 30 are defined at Y and Z positions corresponding substantially to the X position of 3000.0, as shown in Table 25 and at 148 in FIG. 30.

TABLE 25

| Y | Z |
|---|---|
| 1648.32 | 91.5407 |
| 1655.24 | 84.8022 |
| 1657.03 | 98.7589 |
| 1666.71 | 84.4397 |
| 1667.47 | 103.513 |
| 1678.18 | 84.7776 |
| 1678.3 | 107.309 |
| 1689.3 | 110.564 |
| 1689.64 | 85.4011 |
| 1700.42 | 113.419 |
| 1701.09 | 86.2148 |
| 1711.61 | 115.958 |

TABLE 25-continued

| Y | Z |
|---|---|
| 1712.53 | 87.1624 |
| 1722.85 | 118.235 |
| 1723.96 | 88.2029 |
| 1734.14 | 120.291 |
| 1735.38 | 89.3282 |
| 1745.47 | 122.155 |
| 1746.8 | 90.5268 |
| 1756.82 | 123.85 |
| 1758.21 | 91.7858 |
| 1768.19 | 125.392 |
| 1769.62 | 93.077 |
| 1779.58 | 126.795 |
| 1781.02 | 94.3645 |
| 1790.98 | 128.071 |
| 1792.43 | 95.6394 |
| 1802.4 | 129.228 |
| 1803.84 | 96.9011 |
| 1813.83 | 130.272 |
| 1815.25 | 98.1491 |
| 1825.27 | 131.207 |
| 1826.66 | 99.3821 |
| 1836.71 | 132.035 |
| 1838.07 | 100.599 |
| 1848.17 | 132.763 |
| 1849.49 | 101.799 |
| 1859.62 | 133.393 |
| 1860.91 | 102.983 |
| 1871.09 | 133.922 |
| 1872.33 | 104.151 |
| 1882.56 | 134.347 |
| 1883.75 | 105.301 |
| 1894.03 | 134.72 |
| 1895.17 | 106.435 |
| 1905.5 | 135.041 |
| 1906.59 | 107.553 |
| 1916.97 | 135.302 |
| 1918.02 | 108.654 |
| 1928.44 | 135.51 |
| 1929.45 | 109.739 |
| 1939.92 | 135.667 |
| 1940.88 | 110.807 |
| 1951.4 | 135.778 |
| 1952.31 | 111.858 |
| 1962.87 | 135.845 |
| 1963.74 | 112.892 |
| 1974.35 | 135.868 |
| 1975.17 | 113.907 |
| 1985.82 | 135.85 |
| 1986.61 | 114.904 |
| 1997.3 | 135.791 |
| 1998.04 | 115.88 |
| 2008.77 | 135.695 |
| 2009.48 | 116.836 |
| 2020.25 | 135.563 |
| 2020.92 | 117.772 |
| 2031.72 | 135.396 |
| 2032.36 | 118.688 |
| 2043.2 | 135.194 |
| 2043.81 | 119.581 |
| 2054.67 | 134.955 |
| 2055.25 | 120.448 |
| 2066.14 | 134.679 |
| 2066.7 | 121.277 |
| 2077.62 | 134.365 |
| 2078.16 | 122.048 |
| 2089.09 | 134.014 |
| 2089.61 | 122.748 |
| 2100.56 | 133.625 |
| 2101.07 | 123.368 |
| 2112.02 | 133.187 |
| 2112.54 | 123.916 |
| 2123.49 | 132.696 |
| 2124.01 | 124.395 |
| 2134.95 | 132.151 |
| 2135.48 | 124.801 |
| 2146.41 | 131.552 |
| 2146.95 | 125.129 |
| 2157.87 | 130.896 |

TABLE 25-continued

| Y | Z |
|---|---|
| 2158.43 | 125.373 |
| 2169.32 | 130.175 |
| 2169.91 | 125.525 |
| 2180.77 | 129.357 |
| 2181.39 | 125.578 |
| 2192.2 | 128.395 |
| 2192.86 | 125.526 |
| 2203.62 | 127.223 |
| 2204.34 | 125.313 |
| 2215 | 125.747 |

The upper and lower surfaces 28, 30 are defined at Y and Z positions corresponding substantially to the X position of 3120.0, as shown in Table 26 and at 150 in FIG. 31.

TABLE 26

| Y | Z |
|---|---|
| 2068.13 | 86.96 |
| 2068.78 | 85.27 |
| 2070.95 | 87.9 |
| 2071.7 | 84.73 |
| 2073.85 | 88.54 |
| 2074.67 | 84.58 |
| 2076.79 | 89.06 |
| 2077.64 | 84.55 |
| 2079.73 | 89.5 |
| 2080.62 | 84.57 |
| 2082.68 | 89.89 |
| 2083.59 | 84.61 |
| 2085.64 | 90.23 |
| 2086.57 | 84.67 |
| 2088.6 | 90.53 |
| 2089.54 | 84.74 |
| 2091.56 | 90.8 |
| 2092.52 | 84.82 |
| 2094.53 | 91.05 |
| 2095.49 | 84.91 |
| 2097.5 | 91.27 |
| 2098.47 | 85 |
| 2100.47 | 91.47 |
| 2101.44 | 85.09 |
| 2103.44 | 91.65 |
| 2104.42 | 85.18 |
| 2106.41 | 91.81 |
| 2107.39 | 85.28 |
| 2109.38 | 91.96 |
| 2110.37 | 85.37 |
| 2112.35 | 92.09 |
| 2113.34 | 85.47 |
| 2115.33 | 92.2 |
| 2116.31 | 85.56 |
| 2118.3 | 92.3 |
| 2119.29 | 85.66 |
| 2121.28 | 92.38 |
| 2122.26 | 85.75 |
| 2124.25 | 92.45 |
| 2125.24 | 85.84 |
| 2127.23 | 92.51 |
| 2128.21 | 85.94 |
| 2130.21 | 92.55 |
| 2131.19 | 86.02 |
| 2133.18 | 92.58 |
| 2134.16 | 86.11 |
| 2136.16 | 92.6 |
| 2137.13 | 86.2 |
| 2139.14 | 92.6 |
| 2140.11 | 86.28 |
| 2142.11 | 92.6 |
| 2143.08 | 86.36 |
| 2145.09 | 92.58 |
| 2146.06 | 86.43 |
| 2148.06 | 92.55 |
| 2149.03 | 86.51 |
| 2151.04 | 92.51 |

TABLE 26-continued

| Y | Z |
|---|---|
| 2152.01 | 86.57 |
| 2154.02 | 92.46 |
| 2154.98 | 86.64 |
| 2156.99 | 92.4 |
| 2157.96 | 86.7 |
| 2159.97 | 92.33 |
| 2160.93 | 86.76 |
| 2162.94 | 92.25 |
| 2163.91 | 86.81 |
| 2165.92 | 92.16 |
| 2166.88 | 86.86 |
| 2168.89 | 92.05 |
| 2169.86 | 86.9 |
| 2171.87 | 91.94 |
| 2172.83 | 86.95 |
| 2174.84 | 91.82 |
| 2175.81 | 86.99 |
| 2177.81 | 91.69 |
| 2178.79 | 87.04 |
| 2180.79 | 91.54 |
| 2181.76 | 87.1 |
| 2183.76 | 91.38 |
| 2184.74 | 87.16 |
| 2186.73 | 91.2 |
| 2187.71 | 87.22 |
| 2189.7 | 91.02 |
| 2190.69 | 87.29 |
| 2192.67 | 90.82 |
| 2193.66 | 87.36 |
| 2195.64 | 90.61 |
| 2196.64 | 87.44 |
| 2198.6 | 90.39 |
| 2199.61 | 87.53 |
| 2201.57 | 90.15 |
| 2202.59 | 87.62 |
| 2204.54 | 89.9 |
| 2205.56 | 87.72 |
| 2207.5 | 89.65 |
| 2208.54 | 87.82 |
| 2210.46 | 89.38 |
| 2211.51 | 87.93 |
| 2213.43 | 89.09 |
| 2214.48 | 88.04 |

While the best modes for carrying out the invention have been described in detail, those familiar with the art to which this invention relates will recognize various alternative designs and embodiments for practicing the invention within the scope of the appended claims.

What is claimed as new and desired to be secured by Letters Patent of the United States is:

1. An aircraft configured for flight in an atmosphere having a low density, the aircraft comprising:

a fuselage;

a pair of wings extending from the fuselage in opposition to one another;

a rear stabilizer extending from the fuselage in spaced relationship to the pair of wings;

wherein each of the fuselage, the pair of wings, and the rear stabilizer present an upper surface opposing a lower surface;

wherein the upper and lower surfaces are defined at an X position along an X-axis in a 3-dimensional X, Y, Z configuration; and wherein the upper and lower surfaces are defined at Y and Z positions along respective Y and Z axes, corresponding substantially to the following table:

| Y | Z |
|---|---|
| 1005.68 | 117.26 |
| 1037.25 | 437.34 |
| 1049.79 | 117.67 |
| 1081.35 | 438.41 |
| 1093.90 | 118.26 |
| 1125.46 | 438.83 |
| 1138.00 | 119.03 |
| 1169.57 | 438.60 |
| 1182.11 | 119.96 |
| 1213.67 | 437.72 |
| 1226.20 | 121.01 |
| 1257.75 | 436.19 |
| 1270.30 | 122.11 |
| 1301.81 | 434.01 |
| 1314.40 | 123.20 |
| 1345.83 | 431.19 |
| 1358.50 | 124.30 |
| 1389.81 | 427.74 |
| 1402.59 | 125.48 |
| 1433.73 | 423.67 |
| 1446.68 | 126.77 |
| 1477.59 | 419.01 |
| 1490.77 | 128.22 |
| 1521.39 | 413.76 |
| 1534.85 | 129.87 |
| 1565.12 | 407.93 |
| 1578.92 | 131.74 |
| 1608.77 | 401.56 |
| 1622.98 | 133.88 |
| 1652.34 | 394.68 |
| 1667.02 | 136.33 |
| 1695.83 | 387.34 |
| 1711.05 | 139.13 |
| 1739.27 | 379.66 |
| 1755.04 | 142.31 |
| 1782.65 | 371.68 |
| 1799.01 | 145.91 |
| 1825.98 | 363.42 |
| 1842.93 | 149.98 |
| 1869.25 | 354.84 |
| 1886.80 | 154.56 |
| 1912.45 | 345.90 |
| 191.27 | 193.72 |
| 1930.61 | 159.67 |
| 1955.57 | 336.63 |
| 195.79 | 236.57 |
| 1974.36 | 165.31 |
| 1998.63 | 327.04 |
| 2018.04 | 171.45 |
| 2041.63 | 317.21 |
| 2061.66 | 178.05 |
| 2084.61 | 307.28 |
| 2105.22 | 185.01 |
| 2127.58 | 297.33 |
| 2148.72 | 192.28 |
| 2170.47 | 287.02 |
| 217.43 | 159.25 |
| 2192.19 | 199.79 |
| 2213.16 | 275.91 |
| 2235.63 | 207.48 |
| 223.69 | 270.30 |
| 2255.58 | 263.80 |
| 2279.04 | 215.29 |
| 2297.80 | 251.03 |
| 2321.20 | 224.19 |
| 257.36 | 140.96 |
| 260.67 | 294.21 |
| 300.44 | 131.64 |
| 300.83 | 312.40 |
| 342.35 | 327.29 |
| 344.24 | 126.54 |
| 3744.64 | 668.04 |
| 3758.76 | 679.04 |
| 3765.49 | 654.10 |
| 3778.09 | 682.59 |
| 3784.17 | 650.65 |
| 3797.57 | 685.21 |
| 3803.05 | 648.55 |

-continued

| Y | Z |
|---|---|
| 3817.10 | 687.46 |
| 3822.01 | 647.30 |
| 3836.67 | 689.38 |
| 3840.99 | 646.64 |
| 384.41 | 340.58 |
| 3856.25 | 691.10 |
| 3859.99 | 646.44 |
| 3875.86 | 692.61 |
| 3878.99 | 646.57 |
| 388.22 | 123.63 |
| 3895.47 | 694.00 |
| 3897.98 | 647.01 |
| 3915.08 | 695.32 |
| 3916.97 | 647.73 |
| 3934.71 | 696.47 |
| 3935.94 | 648.72 |
| 3954.35 | 697.51 |
| 3954.91 | 649.85 |
| 3973.87 | 651.12 |
| 3973.98 | 698.57 |
| 3992.81 | 652.63 |
| 3993.61 | 699.65 |
| 4011.73 | 654.36 |
| 4013.25 | 700.76 |
| 4030.63 | 656.29 |
| 4032.88 | 701.89 |
| 4049.51 | 658.39 |
| 4052.51 | 703.04 |
| 4068.38 | 660.63 |
| 4072.14 | 704.20 |
| 4087.23 | 662.99 |
| 4091.77 | 705.37 |
| 4106.07 | 665.47 |
| 4111.39 | 706.53 |
| 4124.89 | 668.04 |
| 4131.02 | 707.69 |
| 4143.70 | 670.71 |
| 4150.65 | 708.86 |
| 4162.50 | 673.48 |
| 4166.85 | 699.98 |
| 4181.28 | 676.32 |
| 4181.67 | 687.05 |
| 4198.83 | 681.03 |
| 4200.06 | 679.25 |
| 4218.82 | 682.24 |
| 426.85 | 352.58 |
| 432.29 | 121.80 |
| 469.58 | 363.51 |
| 476.39 | 120.56 |
| 512.54 | 373.55 |
| 520.48 | 119.50 |
| 555.68 | 382.76 |
| 564.59 | 118.60 |
| 598.98 | 391.18 |
| 608.69 | 117.90 |
| 642.42 | 398.84 |
| 652.80 | 117.40 |
| 685.98 | 405.76 |
| 696.91 | 117.05 |
| 729.65 | 411.98 |
| 741.02 | 116.83 |
| 773.41 | 417.53 |
| 785.13 | 116.70 |
| 817.25 | 422.43 |
| 829.24 | 116.66 |
| 861.15 | 426.68 |
| 873.35 | 116.71 |
| 905.12 | 430.30 |
| 917.46 | 116.82 |
| 949.13 | 433.28 |
| 961.57 | 117.00 |
| 993.17 | 435.63. |

2. An aircraft, as set forth in claim 1, wherein the X position corresponds substantially to 120.00.

3. An aircraft, as set forth in claim 2, wherein the upper and lower surfaces are defined at an X position along the X axis corresponding substantially to 240.00; and wherein the upper and lower surfaces are defined at Y and Z positions along the respective Y and Z axes, corresponding substantially to the following table:

| Y | Z |
|---|---|
| 1008.69 | 127.06 |
| 1035.50 | 427.37 |
| 1055.31 | 127.70 |
| 1082.12 | 428.34 |
| 1101.92 | 128.52 |
| 1128.74 | 428.60 |
| 1148.53 | 129.52 |
| 1175.36 | 428.16 |
| 1195.14 | 130.67 |
| 1221.97 | 427.01 |
| 1241.75 | 131.90 |
| 1268.56 | 425.16 |
| 1288.36 | 133.13 |
| 1315.11 | 422.62 |
| 1334.97 | 134.31 |
| 1361.62 | 419.40 |
| 1381.58 | 135.49 |
| 1408.08 | 415.51 |
| 1428.18 | 136.76 |
| 1454.48 | 410.96 |
| 1474.78 | 138.17 |
| 1500.81 | 405.74 |
| 1521.38 | 139.78 |
| 1547.07 | 399.92 |
| 1567.97 | 141.55 |
| 1593.25 | 393.54 |
| 1614.55 | 143.52 |
| 1639.37 | 386.67 |
| 1661.12 | 145.73 |
| 1685.42 | 379.37 |
| 1707.68 | 148.24 |
| 1731.41 | 371.73 |
| 1754.21 | 151.10 |
| 1777.36 | 363.82 |
| 1800.72 | 154.39 |
| 1823.26 | 355.65 |
| 1847.19 | 158.14 |
| 1869.11 | 347.17 |
| 1893.62 | 162.36 |
| 1914.91 | 338.47 |
| 1940.02 | 166.93 |
| 1960.69 | 329.65 |
| 1986.38 | 171.86 |
| 2006.45 | 320.69 |
| 2032.70 | 177.22 |
| 2052.16 | 311.53 |
| 2078.96 | 181.86 |
| 2097.84 | 302.18 |
| 2125.33 | 176.99 |
| 2143.44 | 292.47 |
| 2171.70 | 172.12 |
| 2188.87 | 281.99 |
| 2218.07 | 167.24 |
| 2229.98 | 271.22 |
| 2264.44 | 162.37 |
| 2274.71 | 258.07 |
| 2310.80 | 157.50 |
| 2319.28 | 244.41 |
| 2348.36 | 224.64 |
| 2357.32 | 155.36 |
| 2394.98 | 224.64 |
| 2403.94 | 155.36 |
| 2441.61 | 224.64 |
| 2450.53 | 155.55 |
| 2487.43 | 232.42 |
| 2494.11 | 172.14 |
| 2533.33 | 240.64 |
| 2537.23 | 189.87 |
| 2579.49 | 209.55 |

-continued

| Y | Z |
|---|---|
| 2579.59 | 246.32 |
| 2617.72 | 235.62 |
| 375.12 | 256.43 |
| 375.38 | 211.58 |
| 3785.74 | 578.95 |
| 3812.53 | 591.49 |
| 3818.72 | 563.38 |
| 3844.17 | 595.82 |
| 3850.44 | 560.38 |
| 3875.93 | 599.02 |
| 3882.31 | 559.49 |
| 3907.76 | 601.60 |
| 3914.19 | 559.73 |
| 3939.60 | 603.87 |
| 3946.06 | 560.73 |
| 3971.45 | 606.08 |
| 3977.89 | 562.42 |
| 4003.30 | 608.33 |
| 4009.70 | 564.57 |
| 4035.15 | 610.63 |
| 4041.47 | 567.25 |
| 404.71 | 291.98 |
| 4066.99 | 612.96 |
| 4073.18 | 570.54 |
| 408.89 | 180.02 |
| 4098.83 | 615.30 |
| 4104.84 | 574.31 |
| 4130.68 | 617.66 |
| 4136.45 | 578.44 |
| 4162.52 | 620.02 |
| 4168.02 | 582.89 |
| 4194.36 | 622.41 |
| 4199.55 | 587.61 |
| 4226.19 | 624.81 |
| 4231.05 | 592.57 |
| 4258.03 | 627.25 |
| 4262.51 | 597.73 |
| 4289.86 | 629.73 |
| 4293.95 | 603.02 |
| 4321.69 | 632.26 |
| 4325.36 | 608.45 |
| 4353.51 | 634.85 |
| 4356.76 | 614.01 |
| 4385.33 | 637.50 |
| 4388.13 | 619.68 |
| 4417.14 | 640.23 |
| 4419.48 | 625.46 |
| 443.64 | 317.50 |
| 4448.95 | 643.04 |
| 4450.83 | 631.30 |
| 4480.74 | 645.95 |
| 4482.16 | 637.19 |
| 4512.52 | 649.00 |
| 4513.49 | 643.11 |
| 451.81 | 162.04 |
| 4544.29 | 652.24 |
| 4544.81 | 649.04 |
| 4576.04 | 655.48 |
| 485.93 | 337.08 |
| 497.07 | 150.97 |
| 529.74 | 353.01 |
| 543.10 | 143.56 |
| 574.36 | 366.50 |
| 589.41 | 138.24 |
| 619.51 | 378.10 |
| 635.87 | 134.33 |
| 665.05 | 388.12 |
| 682.41 | 131.46 |
| 710.86 | 396.76 |
| 728.98 | 129.39 |
| 756.89 | 404.15 |
| 775.58 | 127.96 |
| 803.09 | 410.42 |
| 822.20 | 127.05 |
| 849.42 | 415.64 |
| 868.82 | 126.58 |
| 895.85 | 419.88 |
| 915.44 | 126.47 |

| Y | Z |
|---|---|
| 942.36 | 423.21 |
| 962.07 | 126.64 |
| 988.91 | 425.68. |

4. An aircraft, as set forth in claim 1, wherein the upper and lower surfaces are defined at an X position along the X axis corresponding substantially to 360.00; and
wherein the upper and lower surfaces are defined at Y and Z positions along the respective Y and Z axes, corresponding substantially to the following table:

| Y | Z |
|---|---|
| 1086.84 | 190.93 |
| 1102.24 | 349.39 |
| 1198.80 | 193.20 |
| 1214.21 | 348.27 |
| 1310.75 | 195.91 |
| 1326.09 | 343.42 |
| 1422.70 | 198.87 |
| 1437.77 | 335.26 |
| 1534.62 | 202.55 |
| 1549.19 | 324.11 |
| 1646.51 | 207.09 |
| 1660.41 | 311.04 |
| 1758.38 | 212.21 |
| 1771.53 | 297.17 |
| 1870.25 | 217.19 |
| 1882.71 | 283.67 |
| 1898.79 | 281.75 |
| 1914.87 | 279.80 |
| 1930.94 | 277.82 |
| 1947.01 | 275.81 |
| 1963.08 | 273.77 |
| 1979.14 | 271.69 |
| 1982.18 | 220.41 |
| 1994.25 | 220.57 |
| 1995.20 | 269.58 |
| 2006.30 | 220.73 |
| 2011.25 | 267.45 |
| 2018.35 | 220.89 |
| 2027.30 | 265.29 |
| 2030.40 | 221.06 |
| 2042.44 | 221.23 |
| 2043.35 | 263.11 |
| 2054.49 | 221.41 |
| 2059.39 | 260.89 |
| 2066.54 | 221.59 |
| 2075.43 | 258.65 |
| 2078.58 | 221.78 |
| 2090.63 | 221.97 |
| 2091.46 | 256.38 |
| 2102.68 | 222.16 |
| 2107.49 | 254.08 |
| 2114.72 | 222.36 |
| 2123.52 | 251.74 |
| 2126.77 | 222.57 |
| 2138.82 | 222.79 |
| 2139.54 | 249.35 |
| 2150.86 | 223.01 |
| 2155.55 | 246.93 |
| 2162.91 | 223.25 |
| 2171.56 | 244.47 |
| 2174.96 | 223.49 |
| 2187.00 | 223.73 |
| 2187.56 | 241.96 |
| 2199.05 | 223.96 |
| 2203.55 | 239.41 |
| 2211.10 | 224.17 |
| 2219.53 | 236.81 |
| 2223.14 | 224.35 |
| 2235.19 | 224.53 |
| 2235.51 | 234.15 |
| 2247.24 | 224.76 |
| 2251.48 | 231.44 |
| 2259.28 | 225.00 |
| 2267.43 | 228.68 |
| 2271.33 | 225.19 |
| 2283.38 | 225.34 |
| 3048.66 | 358.95 |
| 3081.81 | 392.98 |
| 3107.69 | 361.82 |
| 3136.06 | 416.99 |
| 3166.11 | 372.19 |
| 3191.42 | 438.32 |
| 3224.07 | 384.89 |
| 3247.35 | 458.10 |
| 3281.70 | 399.03 |
| 3303.68 | 476.74 |
| 3339.04 | 414.27 |
| 3360.32 | 494.40 |
| 3396.12 | 430.48 |
| 3417.24 | 511.15 |
| 3452.93 | 447.60 |
| 3474.42 | 526.97 |
| 3509.45 | 465.66 |
| 3531.88 | 541.76 |
| 3565.62 | 484.79 |
| 3589.64 | 555.29 |
| 3621.32 | 505.25 |
| 3647.80 | 567.02 |
| 3676.23 | 527.69 |
| 3706.54 | 575.16 |
| 3728.99 | 554.71 |
| 3826.84 | 489.85 |
| 3832.12 | 496.49 |
| 3840.92 | 499.08 |
| 3847.10 | 535.94 |
| 3847.74 | 526.80 |
| 3848.05 | 545.04 |
| 3849.86 | 517.90 |
| 3849.91 | 500.87 |
| 3850.83 | 553.76 |
| 3853.66 | 509.57 |
| 3855.48 | 561.64 |
| 3857.12 | 475.49 |
| 3858.96 | 502.36 |
| 3861.71 | 568.34 |
| 3869.10 | 573.75 |
| 3877.22 | 577.98 |
| 3885.81 | 581.18 |
| 3886.67 | 472.77 |
| 3894.67 | 583.54 |
| 3903.68 | 585.18 |
| 3912.79 | 586.24 |
| 3916.34 | 472.11 |
| 3921.94 | 586.79 |
| 3931.11 | 586.90 |
| 3940.27 | 586.64 |
| 3946.02 | 472.46 |
| 3949.42 | 586.05 |
| 3958.54 | 585.16 |
| 3967.64 | 584.00 |
| 3975.68 | 473.52 |
| 3976.70 | 582.60 |
| 3985.72 | 580.97 |
| 3994.70 | 579.14 |
| 4003.64 | 577.12 |
| 4005.32 | 475.08 |
| 4012.54 | 574.92 |
| 4017.44 | 517.03 |
| 4021.40 | 572.55 |
| 4023.21 | 516.81 |
| 4025.68 | 521.05 |
| 4030.21 | 570.02 |
| 4032.35 | 517.48 |
| 4033.84 | 525.22 |
| 4034.93 | 477.15 |
| 4038.98 | 567.34 |
| 4041.49 | 518.14 |
| 4041.93 | 529.53 |

| Y | Z |
|---|---|
| 4045.14 | 562.47 |
| 4046.03 | 553.34 |
| 4046.92 | 544.22 |
| 4047.81 | 535.09 |
| 4050.64 | 518.81 |
| 4059.78 | 519.47 |
| 4064.51 | 479.52 |
| 4068.92 | 520.14 |
| 4078.07 | 520.80 |
| 4087.21 | 521.46 |
| 4094.05 | 482.41 |
| 4096.36 | 522.12 |
| 4105.50 | 522.79 |
| 4114.64 | 523.46 |
| 4123.54 | 485.79 |
| 4123.79 | 524.12 |
| 4132.93 | 524.79 |
| 4142.07 | 525.47 |
| 4151.22 | 526.14 |
| 4152.98 | 489.55 |
| 4160.36 | 526.82 |
| 4169.50 | 527.51 |
| 4178.64 | 528.19 |
| 4182.39 | 493.62 |
| 4187.79 | 528.87 |
| 4196.93 | 529.56 |
| 4206.07 | 530.25 |
| 4211.75 | 497.96 |
| 4215.21 | 530.94 |
| 4224.35 | 531.63 |
| 4233.49 | 532.32 |
| 4241.07 | 502.55 |
| 4242.64 | 533.02 |
| 4251.78 | 533.71 |
| 4260.92 | 534.41 |
| 4270.06 | 535.12 |
| 4270.36 | 507.33 |
| 4279.20 | 535.83 |
| 4288.34 | 536.54 |
| 4297.48 | 537.26 |
| 4299.63 | 512.26 |
| 4306.62 | 537.98 |
| 4315.76 | 538.71 |
| 4324.90 | 539.45 |
| 4328.88 | 517.33 |
| 4334.03 | 540.19 |
| 4343.17 | 540.93 |
| 4352.31 | 541.68 |
| 4358.11 | 522.51 |
| 4361.44 | 542.44 |
| 4370.58 | 543.20 |
| 4379.72 | 543.97 |
| 4387.31 | 527.80 |
| 4388.85 | 544.75 |
| 4397.99 | 545.53 |
| 4407.12 | 546.32 |
| 4416.25 | 547.11 |
| 4416.50 | 533.19 |
| 4425.39 | 547.92 |
| 4434.52 | 548.73 |
| 4443.65 | 549.55 |
| 4445.68 | 538.63 |
| 4452.78 | 550.38 |
| 4461.91 | 551.21 |
| 4471.04 | 552.06 |
| 4474.85 | 544.10 |
| 4480.17 | 552.91 |
| 4489.29 | 553.77 |
| 4498.42 | 554.65 |
| 4504.02 | 549.59 |
| 4507.54 | 555.54 |
| 4516.66 | 556.50 |
| 4525.78 | 557.42 |
| 4533.18 | 555.15 |
| 4534.90 | 558.35 |
| 4544.02 | 559.30 |
| 4553.13 | 560.29 |
| 4562.25 | 561.12 |

| Y | Z |
|---|---|
| 559.57 | 250.22 |
| 639.33 | 201.09 |
| 658.26 | 300.04 |
| 750.95 | 192.40 |
| 767.61 | 323.90 |
| 862.89 | 189.60 |
| 878.62 | 338.46 |
| 974.87 | 189.52 |
| 990.30 | 346.44. |

5. An aircraft, as set forth in claim 2, wherein the upper and lower surfaces are defined at an X position along the X axis corresponding substantially to 480.00; and wherein the upper and lower surfaces are defined at Y and Z positions along the respective Y and Z axes, corresponding substantially to the following table:

| Y | Z |
|---|---|
| 1077.08 | 199.89 |
| 1082.96 | 322.95 |
| 1206.22 | 199.56 |
| 1212.07 | 325.39 |
| 1335.36 | 200.25 |
| 1341.18 | 322.85 |
| 1464.49 | 201.92 |
| 1470.13 | 315.91 |
| 1593.60 | 204.67 |
| 1598.83 | 305.33 |
| 1722.69 | 208.38 |
| 1727.32 | 292.36 |
| 1851.78 | 211.95 |
| 1855.65 | 277.99 |
| 1980.88 | 214.94 |
| 1983.77 | 261.74 |
| 2109.98 | 218.44 |
| 2111.60 | 243.44 |
| 2239.06 | 222.40 |
| 3867.94 | 400.76 |
| 3871.64 | 405.98 |
| 3878.13 | 408.22 |
| 3884.81 | 409.80 |
| 3891.56 | 411.11 |
| 3895.51 | 387.56 |
| 3898.33 | 412.24 |
| 3905.13 | 413.23 |
| 3911.94 | 414.10 |
| 3918.76 | 414.91 |
| 3922.87 | 385.00 |
| 3925.59 | 415.68 |
| 3932.42 | 416.38 |
| 3939.25 | 417.04 |
| 3946.09 | 417.66 |
| 3950.34 | 384.38 |
| 3952.94 | 418.25 |
| 3959.78 | 418.83 |
| 3966.63 | 419.39 |
| 3973.47 | 419.94 |
| 3977.82 | 384.81 |
| 3980.32 | 420.49 |
| 3987.17 | 421.03 |
| 3994.01 | 421.57 |
| 4000.86 | 422.10 |
| 4005.28 | 385.91 |
| 4007.71 | 422.62 |
| 4014.56 | 423.15 |
| 4021.41 | 423.67 |
| 4028.25 | 424.19 |
| 4032.72 | 387.49 |
| 4035.10 | 424.71 |
| 4041.95 | 425.22 |
| 4048.80 | 425.72 |
| 4055.65 | 426.22 |

-continued

| Y | Z |
|---|---|
| 4060.13 | 389.44 |
| 4062.50 | 426.72 |
| 4069.35 | 427.21 |
| 4076.20 | 427.70 |
| 4083.05 | 428.19 |
| 4087.52 | 391.73 |
| 4089.91 | 428.68 |
| 4096.76 | 429.17 |
| 4103.61 | 429.66 |
| 4110.46 | 430.15 |
| 4114.89 | 394.28 |
| 4117.31 | 430.64 |
| 4124.16 | 431.14 |
| 4131.01 | 431.63 |
| 4137.86 | 432.13 |
| 4142.21 | 397.27 |
| 4144.71 | 432.63 |
| 4151.56 | 433.14 |
| 4158.41 | 433.64 |
| 4165.26 | 434.15 |
| 4169.48 | 400.66 |
| 4172.11 | 434.66 |
| 4178.96 | 435.17 |
| 4185.81 | 435.69 |
| 4192.65 | 436.20 |
| 4196.72 | 404.35 |
| 4199.50 | 436.71 |
| 4206.35 | 437.23 |
| 4213.20 | 437.74 |
| 4220.05 | 438.26 |
| 4223.91 | 408.31 |
| 4226.90 | 438.78 |
| 4233.75 | 439.29 |
| 4240.60 | 439.81 |
| 4247.44 | 440.33 |
| 4251.07 | 412.53 |
| 4254.29 | 440.85 |
| 4261.14 | 441.38 |
| 4267.99 | 441.90 |
| 4274.84 | 442.43 |
| 4278.20 | 416.94 |
| 4281.69 | 442.96 |
| 4288.53 | 443.49 |
| 4295.38 | 444.03 |
| 4302.23 | 444.57 |
| 4305.30 | 421.50 |
| 4309.07 | 445.11 |
| 4315.92 | 445.66 |
| 4322.77 | 446.20 |
| 4329.61 | 446.76 |
| 4332.38 | 426.19 |
| 4336.46 | 447.31 |
| 4343.30 | 447.87 |
| 4350.15 | 448.43 |
| 4356.99 | 449.00 |
| 4359.44 | 431.00 |
| 4363.84 | 449.57 |
| 4370.68 | 450.14 |
| 4377.53 | 450.72 |
| 4384.37 | 451.30 |
| 4386.48 | 435.92 |
| 4391.21 | 451.89 |
| 4398.06 | 452.48 |
| 4404.90 | 453.07 |
| 4411.74 | 453.67 |
| 4413.51 | 440.91 |
| 4418.58 | 454.27 |
| 4425.43 | 454.87 |
| 4432.27 | 455.48 |
| 4439.11 | 456.10 |
| 4440.53 | 445.93 |
| 4445.95 | 456.73 |
| 4452.79 | 457.36 |
| 4459.62 | 457.99 |
| 4466.46 | 458.63 |
| 4467.54 | 450.99 |
| 4473.30 | 459.27 |
| 4480.14 | 459.92 |
| 4486.98 | 460.57 |
| 4493.81 | 461.23 |
| 4494.55 | 456.08 |
| 4500.65 | 461.90 |
| 4507.48 | 462.63 |
| 4514.31 | 463.31 |
| 4521.14 | 464.01 |
| 4521.54 | 461.25 |
| 4527.98 | 464.71 |
| 4534.81 | 465.43 |
| 4541.64 | 466.17 |
| 4548.47 | 466.77 |
| 690.16 | 215.29 |
| 699.61 | 273.01 |
| 818.87 | 205.28 |
| 825.87 | 299.61 |
| 947.95 | 201.53 |
| 954.09 | 314.78. |

6. An aircraft, as set forth in claim 1, wherein the upper and lower surfaces are defined at an X position along the X axis corresponding substantially to 600.00; and wherein the upper and lower surfaces are defined at Y and Z positions along the respective Y and Z axes, corresponding substantially to the following table:

| Y | Z |
|---|---|
| 1002.53 | 196.57 |
| 1008.08 | 303.00 |
| 1124.05 | 195.41 |
| 1129.33 | 310.96 |
| 1245.58 | 195.46 |
| 1250.83 | 313.53 |
| 1367.11 | 196.43 |
| 1372.33 | 311.41 |
| 1488.62 | 198.30 |
| 1493.70 | 305.16 |
| 1610.12 | 201.16 |
| 1614.84 | 295.48 |
| 1731.59 | 204.88 |
| 1735.78 | 283.56 |
| 1853.07 | 208.45 |
| 1856.59 | 270.31 |
| 1974.56 | 211.45 |
| 1977.18 | 255.29 |
| 2096.04 | 214.92 |
| 2097.53 | 238.35 |
| 2217.51 | 218.79 |
| 3909.04 | 311.66 |
| 3912.74 | 316.21 |
| 3918.68 | 318.32 |
| 3924.80 | 319.87 |
| 3930.99 | 321.12 |
| 3933.90 | 299.62 |
| 3937.21 | 322.15 |
| 3943.46 | 323.04 |
| 3949.72 | 323.86 |
| 3955.99 | 324.61 |
| 3959.06 | 297.15 |
| 3962.26 | 325.29 |
| 3968.54 | 325.93 |
| 3974.83 | 326.54 |
| 3981.11 | 327.12 |
| 3984.33 | 296.48 |
| 3987.40 | 327.69 |
| 3993.69 | 328.25 |
| 3999.97 | 328.80 |
| 4006.26 | 329.34 |
| 4009.62 | 296.89 |
| 4012.55 | 329.86 |
| 4018.84 | 330.38 |
| 4025.13 | 330.89 |

-continued

| Y | Z |
|---|---|
| 4031.43 | 331.39 |
| 4034.88 | 297.89 |
| 4037.72 | 331.89 |
| 4044.01 | 332.38 |
| 4050.31 | 332.86 |
| 4056.60 | 333.33 |
| 4060.12 | 299.45 |
| 4062.89 | 333.80 |
| 4069.19 | 334.25 |
| 4075.49 | 334.70 |
| 4081.78 | 335.15 |
| 4085.34 | 301.39 |
| 4088.08 | 335.59 |
| 4094.37 | 336.04 |
| 4100.67 | 336.48 |
| 4106.97 | 336.92 |
| 4110.53 | 303.61 |
| 4113.26 | 337.36 |
| 4119.56 | 337.81 |
| 4125.86 | 338.25 |
| 4132.15 | 338.70 |
| 4135.70 | 306.06 |
| 4138.45 | 339.16 |
| 4144.74 | 339.61 |
| 4151.04 | 340.07 |
| 4157.33 | 340.53 |
| 4160.84 | 308.72 |
| 4163.63 | 341.00 |
| 4169.92 | 341.46 |
| 4176.22 | 341.93 |
| 4182.51 | 342.40 |
| 4185.95 | 311.75 |
| 4188.81 | 342.87 |
| 4195.10 | 343.34 |
| 4201.40 | 343.82 |
| 4207.69 | 344.29 |
| 4211.02 | 315.08 |
| 4213.98 | 344.76 |
| 4220.28 | 345.23 |
| 4226.57 | 345.71 |
| 4232.87 | 346.18 |
| 4236.05 | 318.67 |
| 4239.16 | 346.66 |
| 4245.46 | 347.13 |
| 4251.75 | 347.61 |
| 4258.04 | 348.09 |
| 4261.04 | 322.50 |
| 4264.34 | 348.57 |
| 4270.63 | 349.05 |
| 4276.92 | 349.53 |
| 4283.22 | 350.02 |
| 4286.01 | 326.54 |
| 4289.51 | 350.51 |
| 4295.80 | 351.00 |
| 4302.10 | 351.49 |
| 4308.39 | 351.99 |
| 4310.95 | 330.73 |
| 4314.68 | 352.49 |
| 4320.97 | 352.99 |
| 4327.26 | 353.49 |
| 4333.56 | 354.00 |
| 4335.86 | 335.06 |
| 4339.85 | 354.51 |
| 4346.14 | 355.02 |
| 4352.43 | 355.54 |
| 4358.72 | 356.06 |
| 4360.76 | 339.50 |
| 4365.01 | 356.59 |
| 4371.30 | 357.12 |
| 4377.59 | 357.65 |
| 4383.88 | 358.18 |
| 4385.64 | 344.03 |
| 4390.17 | 358.72 |
| 4396.46 | 359.26 |
| 4402.74 | 359.81 |
| 4409.03 | 360.36 |
| 4410.51 | 348.61 |
| 4415.32 | 360.92 |
| 4421.61 | 361.48 |
| 4427.89 | 362.04 |
| 4434.18 | 362.60 |
| 4435.37 | 353.22 |
| 4440.47 | 363.18 |
| 4446.75 | 363.76 |
| 4453.04 | 364.35 |
| 4459.32 | 364.95 |
| 4460.22 | 357.88 |
| 4465.60 | 365.54 |
| 4471.89 | 366.14 |
| 4478.17 | 366.74 |
| 4484.45 | 367.34 |
| 4485.07 | 362.58 |
| 4490.73 | 367.96 |
| 4497.02 | 368.59 |
| 4503.29 | 369.25 |
| 4509.57 | 369.89 |
| 4509.91 | 367.32 |
| 4515.85 | 370.54 |
| 4522.13 | 371.19 |
| 4528.40 | 371.88 |
| 4534.68 | 372.41 |
| 759.89 | 208.82 |
| 768.68 | 263.12 |
| 881.04 | 199.75 |
| 887.44 | 288.44. |

7. An aircraft, as set forth in claim 1, wherein the upper and lower surfaces are defined at an X position along the X axis corresponding substantially to 720.00; and
   wherein the upper and lower surfaces are defined at Y and Z positions along the respective Y and Z axes, corresponding substantially to the following table:

| Y | Z |
|---|---|
| 1057.50 | 189.57 |
| 1062.37 | 288.34 |
| 1173.27 | 190.72 |
| 1177.84 | 296.68 |
| 1289.03 | 192.65 |
| 1293.56 | 299.84 |
| 1404.79 | 194.98 |
| 1409.32 | 298.43 |
| 1520.53 | 197.72 |
| 1524.98 | 293.14 |
| 1636.26 | 200.95 |
| 1640.44 | 284.67 |
| 1751.98 | 204.55 |
| 1755.73 | 274.07 |
| 1867.72 | 207.66 |
| 1870.89 | 262.15 |
| 1983.47 | 209.90 |
| 1985.86 | 248.54 |
| 2099.23 | 212.16 |
| 2100.61 | 233.12 |
| 2214.98 | 214.62 |
| 3950.14 | 222.57 |
| 3953.72 | 226.60 |
| 3959.07 | 228.71 |
| 3964.63 | 230.20 |
| 3970.28 | 231.29 |
| 3972.28 | 211.68 |
| 3975.97 | 232.22 |
| 3981.66 | 233.04 |
| 3987.38 | 233.76 |
| 3993.09 | 234.43 |
| 3995.23 | 209.25 |
| 3998.82 | 235.05 |
| 4004.54 | 235.65 |
| 4010.27 | 236.23 |
| 4016.00 | 236.80 |

| Y | Z |
|---|---|
| 4018.31 | 208.50 |
| 4021.73 | 237.35 |
| 4027.46 | 237.88 |
| 4033.20 | 238.38 |
| 4038.93 | 238.88 |
| 4041.41 | 208.72 |
| 4044.67 | 239.37 |
| 4050.41 | 239.84 |
| 4056.14 | 240.31 |
| 4061.88 | 240.75 |
| 4064.48 | 209.63 |
| 4067.63 | 241.19 |
| 4073.37 | 241.61 |
| 4079.11 | 242.02 |
| 4084.85 | 242.43 |
| 4087.54 | 210.97 |
| 4090.59 | 242.83 |
| 4096.34 | 243.22 |
| 4102.08 | 243.62 |
| 4107.82 | 244.01 |
| 4110.56 | 212.81 |
| 4113.57 | 244.41 |
| 4119.31 | 244.80 |
| 4125.05 | 245.20 |
| 4130.80 | 245.61 |
| 4133.55 | 214.98 |
| 4136.54 | 246.01 |
| 4142.28 | 246.42 |
| 4148.03 | 246.83 |
| 4153.77 | 247.24 |
| 4156.52 | 217.39 |
| 4159.51 | 247.66 |
| 4165.25 | 248.08 |
| 4170.99 | 248.51 |
| 4176.73 | 248.93 |
| 4179.47 | 219.98 |
| 4182.47 | 249.36 |
| 4188.22 | 249.79 |
| 4193.96 | 250.22 |
| 4199.70 | 250.65 |
| 4202.40 | 222.74 |
| 4205.44 | 251.08 |
| 4211.18 | 251.51 |
| 4216.92 | 251.94 |
| 4222.66 | 252.37 |
| 4225.30 | 225.75 |
| 4228.40 | 252.80 |
| 4234.14 | 253.23 |
| 4239.88 | 253.67 |
| 4245.62 | 254.10 |
| 4248.16 | 229.01 |
| 4251.36 | 254.53 |
| 4257.10 | 254.97 |
| 4262.84 | 255.40 |
| 4268.59 | 255.84 |
| 4270.99 | 232.47 |
| 4274.33 | 256.28 |
| 4280.07 | 256.72 |
| 4285.81 | 257.16 |
| 4291.55 | 257.61 |
| 4293.80 | 236.14 |
| 4297.29 | 258.05 |
| 4303.02 | 258.50 |
| 4308.76 | 258.95 |
| 4314.50 | 259.40 |
| 4316.57 | 239.96 |
| 4320.24 | 259.86 |
| 4325.98 | 260.31 |
| 4331.72 | 260.77 |
| 4337.46 | 261.24 |
| 4339.32 | 243.92 |
| 4343.20 | 261.70 |
| 4348.93 | 262.17 |
| 4354.67 | 262.64 |
| 4360.41 | 263.12 |
| 4362.06 | 247.98 |
| 4366.15 | 263.60 |
| 4371.88 | 264.08 |

| Y | Z |
|---|---|
| 4377.62 | 264.56 |
| 4383.36 | 265.05 |
| 4384.78 | 252.11 |
| 4389.09 | 265.54 |
| 4394.83 | 266.04 |
| 4400.56 | 266.54 |
| 4406.30 | 267.04 |
| 4407.50 | 256.29 |
| 4412.03 | 267.55 |
| 4417.77 | 268.06 |
| 4423.50 | 268.57 |
| 4429.23 | 269.09 |
| 4430.20 | 260.50 |
| 4434.97 | 269.61 |
| 4440.70 | 270.14 |
| 4446.43 | 270.67 |
| 4452.16 | 271.22 |
| 4452.90 | 264.77 |
| 4457.89 | 271.77 |
| 4463.62 | 272.33 |
| 4469.35 | 272.89 |
| 4475.08 | 273.45 |
| 4475.59 | 269.09 |
| 4480.81 | 274.01 |
| 4486.54 | 274.58 |
| 4492.27 | 275.16 |
| 4497.99 | 275.77 |
| 4498.28 | 273.39 |
| 4503.72 | 276.36 |
| 4509.45 | 276.96 |
| 4515.17 | 277.58 |
| 4520.90 | 278.06 |
| 826.19 | 197.36 |
| 834.61 | 248.63 |
| 941.73 | 190.57 |
| 947.55 | 273.66. |

8. An aircraft, as set forth in claim 1, wherein the upper and lower surfaces are defined at an X position along the X axis corresponding substantially to 840.00; and
   wherein the upper and lower surfaces are defined at Y and Z positions along the respective Y and Z axes, corresponding substantially to the following table:

| Y | Z |
|---|---|
| 1002.27 | 180.87 |
| 1007.37 | 258.37 |
| 1112.55 | 182.29 |
| 1116.63 | 273.28 |
| 1222.79 | 186.01 |
| 1226.56 | 282.08 |
| 1333.01 | 190.03 |
| 1336.78 | 285.90 |
| 1443.24 | 193.86 |
| 1447.07 | 285.24 |
| 1553.47 | 197.56 |
| 1557.28 | 280.96 |
| 1663.71 | 201.20 |
| 1667.34 | 273.74 |
| 1773.95 | 204.66 |
| 1777.24 | 264.50 |
| 1884.22 | 207.25 |
| 1887.03 | 253.94 |
| 1994.50 | 208.61 |
| 1996.65 | 241.75 |
| 2104.80 | 209.51 |
| 2106.07 | 227.88 |
| 2215.09 | 210.38 |
| 4086.08 | 149.58 |
| 4090.29 | 149.87 |
| 4094.50 | 150.16 |
| 4098.71 | 150.45 |

-continued

| Y | Z |
|---|---|
| 4102.93 | 150.74 |
| 4107.14 | 151.02 |
| 4111.35 | 151.30 |
| 4115.57 | 151.59 |
| 4119.78 | 151.87 |
| 4123.99 | 152.15 |
| 4128.21 | 152.44 |
| 4132.42 | 152.73 |
| 4136.63 | 153.02 |
| 4140.84 | 153.31 |
| 4141.74 | 124.32 |
| 4145.06 | 153.61 |
| 4149.27 | 153.90 |
| 4153.48 | 154.20 |
| 4157.10 | 125.80 |
| 4157.69 | 154.50 |
| 4161.91 | 154.81 |
| 4166.12 | 155.12 |
| 4170.33 | 155.42 |
| 4172.44 | 127.46 |
| 4174.54 | 155.73 |
| 4178.75 | 156.05 |
| 4182.96 | 156.36 |
| 4187.17 | 156.67 |
| 4187.76 | 129.27 |
| 4191.38 | 156.99 |
| 4195.59 | 157.30 |
| 4199.81 | 157.62 |
| 4203.07 | 131.18 |
| 4204.02 | 157.93 |
| 4208.23 | 158.25 |
| 4212.44 | 158.57 |
| 4216.65 | 158.88 |
| 4218.37 | 133.20 |
| 4220.86 | 159.20 |
| 4225.07 | 159.51 |
| 4229.28 | 159.83 |
| 4233.49 | 160.14 |
| 4233.66 | 135.30 |
| 4237.70 | 160.46 |
| 4241.91 | 160.78 |
| 4246.13 | 161.09 |
| 4248.93 | 137.50 |
| 4250.34 | 161.41 |
| 4254.55 | 161.73 |
| 4258.76 | 162.05 |
| 4262.97 | 162.36 |
| 4264.19 | 139.78 |
| 4267.18 | 162.68 |
| 4271.39 | 163.00 |
| 4275.60 | 163.33 |
| 4279.44 | 142.15 |
| 4279.81 | 163.65 |
| 4284.02 | 163.97 |
| 4288.23 | 164.29 |
| 4292.44 | 164.62 |
| 4294.67 | 144.59 |
| 4296.65 | 164.94 |
| 4300.86 | 165.27 |
| 4305.07 | 165.60 |
| 4309.28 | 165.92 |
| 4309.90 | 147.11 |
| 4313.49 | 166.25 |
| 4317.70 | 166.59 |
| 4321.91 | 166.92 |
| 4325.11 | 149.69 |
| 4326.12 | 167.25 |
| 4330.33 | 167.59 |
| 4334.54 | 167.92 |
| 4338.75 | 168.26 |
| 4340.31 | 152.34 |
| 4342.96 | 168.60 |
| 4347.17 | 168.94 |
| 4351.38 | 169.29 |
| 4355.50 | 155.03 |
| 4355.58 | 169.63 |
| 4359.79 | 169.98 |
| 4364.00 | 170.33 |

-continued

| Y | Z |
|---|---|
| 4368.21 | 170.68 |
| 4370.69 | 157.76 |
| 4372.42 | 171.03 |
| 4376.62 | 171.39 |
| 4380.83 | 171.74 |
| 4385.04 | 172.10 |
| 4385.87 | 160.52 |
| 4389.25 | 172.46 |
| 4393.45 | 172.83 |
| 4397.66 | 173.19 |
| 4401.05 | 163.31 |
| 4401.87 | 173.56 |
| 4406.07 | 173.93 |
| 4410.28 | 174.30 |
| 4414.49 | 174.67 |
| 4416.22 | 166.13 |
| 4418.69 | 175.05 |
| 4422.90 | 175.43 |
| 4427.10 | 175.81 |
| 4431.31 | 176.19 |
| 4431.38 | 168.99 |
| 4435.51 | 176.58 |
| 4439.72 | 176.97 |
| 4443.92 | 177.36 |
| 4446.54 | 171.87 |
| 4448.13 | 177.76 |
| 4452.33 | 178.16 |
| 4456.53 | 178.58 |
| 4460.73 | 179.00 |
| 4461.70 | 174.74 |
| 4464.94 | 179.43 |
| 4469.14 | 179.85 |
| 4473.34 | 180.27 |
| 4476.87 | 177.58 |
| 4477.54 | 180.69 |
| 4481.74 | 181.12 |
| 4485.94 | 181.55 |
| 4490.14 | 182.00 |
| 4492.02 | 180.51 |
| 4494.34 | 182.45 |
| 4498.54 | 182.90 |
| 4502.74 | 183.35 |
| 4507.11 | 183.71 |
| 892.09 | 185.17 |
| 900.01 | 233.46. |

9. An aircraft, as set forth in claim 1, wherein the upper and lower surfaces are defined at an X position along the X axis corresponding substantially to 960.00; and wherein the upper and lower surfaces are defined at Y and Z positions along the respective Y and Z axes, corresponding substantially to the following table:

| Y | Z |
|---|---|
| 1010.85 | 170.95 |
| 1015.43 | 232.32 |
| 1037.07 | 170.84 |
| 1041.03 | 237.97 |
| 1063.28 | 171.16 |
| 1066.76 | 242.99 |
| 1089.49 | 171.72 |
| 1092.59 | 247.47 |
| 1115.69 | 172.60 |
| 1118.50 | 251.45 |
| 1141.88 | 173.69 |
| 1144.47 | 255.00 |
| 1168.07 | 175.00 |
| 1170.49 | 258.18 |
| 1194.24 | 176.48 |
| 1196.56 | 260.99 |
| 1220.41 | 178.07 |
| 1222.65 | 263.47 |

-continued

| Y | Z |
|---|---|
| 1246.57 | 179.69 |
| 1248.78 | 265.62 |
| 1272.74 | 181.30 |
| 1274.93 | 267.46 |
| 1298.91 | 182.89 |
| 1301.10 | 269.01 |
| 1325.07 | 184.45 |
| 1327.29 | 270.28 |
| 1351.25 | 185.95 |
| 1353.48 | 271.26 |
| 1377.42 | 187.41 |
| 1379.69 | 271.96 |
| 1403.60 | 188.82 |
| 1405.90 | 272.37 |
| 1429.78 | 190.18 |
| 1432.11 | 272.52 |
| 1455.96 | 191.49 |
| 1458.33 | 272.39 |
| 1482.15 | 192.76 |
| 1484.54 | 272.06 |
| 1508.33 | 193.98 |
| 1510.75 | 271.53 |
| 1534.52 | 195.17 |
| 1536.96 | 270.80 |
| 1560.71 | 196.31 |
| 1563.16 | 269.88 |
| 1586.90 | 197.42 |
| 1589.35 | 268.79 |
| 1613.10 | 198.49 |
| 1615.53 | 267.53 |
| 1639.29 | 199.52 |
| 1641.71 | 266.10 |
| 1665.49 | 200.51 |
| 1667.88 | 264.52 |
| 1691.69 | 201.47 |
| 1694.04 | 262.83 |
| 1717.88 | 202.39 |
| 1720.19 | 261.02 |
| 1744.09 | 203.25 |
| 1746.34 | 259.09 |
| 1770.29 | 204.06 |
| 1772.47 | 257.09 |
| 1796.49 | 204.79 |
| 1798.60 | 254.96 |
| 1822.70 | 205.45 |
| 1824.72 | 252.75 |
| 1848.91 | 206.02 |
| 1850.84 | 250.49 |
| 1875.12 | 206.49 |
| 1876.95 | 248.17 |
| 1901.33 | 206.84 |
| 1903.06 | 245.75 |
| 1927.55 | 207.08 |
| 1929.15 | 243.22 |
| 1953.76 | 207.25 |
| 1955.23 | 240.58 |
| 1979.98 | 207.32 |
| 1981.30 | 237.83 |
| 2006.19 | 207.32 |
| 2007.37 | 234.99 |
| 2032.41 | 207.26 |
| 2033.42 | 232.08 |
| 2058.62 | 207.16 |
| 2059.46 | 229.08 |
| 2084.84 | 207.03 |
| 2085.49 | 225.95 |
| 2111.05 | 206.87 |
| 2111.50 | 222.65 |
| 2137.27 | 206.75 |
| 2137.48 | 219.15 |
| 2163.42 | 215.40 |
| 2163.48 | 206.59 |
| 2189.32 | 211.37 |
| 2189.70 | 206.37 |
| 2215.18 | 206.84 |
| 919.81 | 192.98 |
| 932.43 | 175.87 |
| 940.67 | 208.36 |

-continued

| Y | Z |
|---|---|
| 958.47 | 172.92 |
| 964.97 | 218.14 |
| 984.65 | 171.58 |
| 990.03 | 225.84. |

10. An aircraft, as set forth in claim 1, wherein the upper and lower surfaces are defined at an X position along the X axis corresponding substantially to 1680.00; and wherein the upper and lower surfaces are defined at Y and Z positions along the respective Y and Z axes, corresponding substantially to the following table:

| Y | Z |
|---|---|
| 1174.69 | 159.39 |
| 1186.20 | 146.97 |
| 1191.00 | 172.35 |
| 1207.26 | 145.97 |
| 1210.23 | 180.99 |
| 1228.35 | 146.21 |
| 1230.12 | 187.99 |
| 1249.42 | 147.01 |
| 1250.34 | 194.00 |
| 1270.48 | 148.21 |
| 1270.74 | 199.36 |
| 1291.27 | 204.16 |
| 1291.52 | 149.71 |
| 1311.92 | 208.50 |
| 1312.54 | 151.44 |
| 1332.64 | 212.42 |
| 1333.53 | 153.48 |
| 1353.43 | 215.98 |
| 1354.50 | 155.73 |
| 1374.27 | 219.23 |
| 1375.45 | 158.20 |
| 1395.15 | 222.16 |
| 1396.38 | 160.85 |
| 1416.08 | 224.82 |
| 1417.29 | 163.56 |
| 1437.03 | 227.21 |
| 1438.21 | 166.27 |
| 1458.01 | 229.36 |
| 1459.13 | 168.92 |
| 1479.02 | 231.27 |
| 1480.07 | 171.50 |
| 1500.05 | 232.93 |
| 1501.01 | 174.01 |
| 1521.09 | 234.37 |
| 1521.96 | 176.42 |
| 1542.15 | 235.55 |
| 1542.93 | 178.73 |
| 1563.22 | 236.47 |
| 1563.90 | 180.95 |
| 1584.30 | 237.16 |
| 1584.88 | 183.08 |
| 1605.39 | 237.59 |
| 1605.88 | 185.10 |
| 1626.47 | 237.90 |
| 1626.88 | 187.04 |
| 1647.57 | 238.06 |
| 1647.89 | 188.89 |
| 1668.66 | 238.07 |
| 1668.91 | 190.66 |
| 1689.75 | 237.94 |
| 1689.93 | 192.34 |
| 1710.84 | 237.70 |
| 1710.96 | 193.94 |
| 1731.93 | 237.33 |
| 1732.00 | 195.46 |
| 1753.01 | 236.84 |
| 1753.04 | 196.88 |
| 1774.09 | 198.22 |
| 1774.10 | 236.24 |

| Y | Z |
|---|---|
| 1795.15 | 199.47 |
| 1795.18 | 235.55 |
| 1816.21 | 200.64 |
| 1816.25 | 234.75 |
| 1837.27 | 201.69 |
| 1837.33 | 233.86 |
| 1858.34 | 202.68 |
| 1858.40 | 232.96 |
| 1879.42 | 203.55 |
| 1879.46 | 231.89 |
| 1900.49 | 204.31 |
| 1900.52 | 230.75 |
| 1921.58 | 204.93 |
| 1921.58 | 229.56 |
| 1942.64 | 228.31 |
| 1942.66 | 205.40 |
| 1963.69 | 226.98 |
| 1963.75 | 205.74 |
| 1984.73 | 225.55 |
| 1984.84 | 205.93 |
| 2005.77 | 224.04 |
| 2005.93 | 206.00 |
| 2026.80 | 222.45 |
| 2027.02 | 205.96 |
| 2047.83 | 220.81 |
| 2048.12 | 205.78 |
| 2068.85 | 219.12 |
| 2069.20 | 205.47 |
| 2089.87 | 217.35 |
| 2090.29 | 205.06 |
| 2110.87 | 215.45 |
| 2111.38 | 204.54 |
| 2131.86 | 213.37 |
| 2132.46 | 203.93 |
| 2152.83 | 211.06 |
| 2153.54 | 203.31 |
| 2173.76 | 208.47 |
| 2174.62 | 202.61 |
| 2194.64 | 205.54 |
| 2195.70 | 201.79 |
| 2215.47 | 202.22. |

11. An aircraft, as set forth in claim 1, wherein the upper and lower surfaces are defined at an X position along the X axis corresponding substantially to 2280.00; and wherein the upper and lower surfaces are defined at Y and Z positions along the respective Y and Z axes, corresponding substantially to the following table:

| Y | Z |
|---|---|
| 1312.16 | 158.26 |
| 1322.08 | 147.42 |
| 1326.23 | 169.65 |
| 1340.37 | 146.64 |
| 1342.83 | 177.36 |
| 1358.69 | 146.95 |
| 1360.03 | 183.68 |
| 1376.99 | 147.74 |
| 1377.51 | 189.13 |
| 1395.16 | 194.03 |
| 1395.27 | 148.86 |
| 1412.94 | 198.44 |
| 1413.54 | 150.24 |
| 1430.81 | 202.45 |
| 1431.79 | 151.80 |
| 1448.76 | 206.11 |
| 1450.02 | 153.58 |
| 1466.77 | 209.45 |
| 1468.23 | 155.54 |
| 1484.83 | 212.52 |
| 1486.43 | 157.64 |
| 1502.94 | 215.32 |
| 1504.61 | 159.87 |
| 1521.07 | 217.88 |
| 1522.79 | 162.13 |
| 1539.24 | 220.21 |
| 1540.97 | 164.39 |
| 1557.44 | 222.32 |
| 1559.15 | 166.62 |
| 1575.66 | 224.23 |
| 1577.34 | 168.81 |
| 1593.90 | 225.93 |
| 1595.53 | 170.96 |
| 1612.15 | 227.43 |
| 1613.73 | 173.06 |
| 1630.43 | 228.71 |
| 1631.93 | 175.12 |
| 1648.71 | 229.76 |
| 1650.14 | 177.12 |
| 1667.01 | 230.62 |
| 1668.35 | 179.07 |
| 1685.32 | 231.24 |
| 1686.57 | 180.97 |
| 1703.63 | 231.76 |
| 1704.79 | 182.83 |
| 1721.94 | 232.15 |
| 1723.02 | 184.63 |
| 1740.26 | 232.42 |
| 1741.26 | 186.40 |
| 1758.58 | 232.57 |
| 1759.49 | 188.12 |
| 1776.89 | 232.60 |
| 1777.73 | 189.80 |
| 1795.21 | 232.54 |
| 1795.98 | 191.43 |
| 1813.53 | 232.37 |
| 1814.23 | 193.01 |
| 1831.85 | 232.10 |
| 1832.48 | 194.55 |
| 1850.16 | 231.75 |
| 1850.74 | 196.04 |
| 1868.47 | 231.32 |
| 1869.00 | 197.49 |
| 1886.78 | 230.80 |
| 1887.26 | 198.89 |
| 1905.09 | 230.27 |
| 1905.53 | 200.24 |
| 1923.40 | 229.59 |
| 1923.81 | 201.53 |
| 1941.70 | 228.86 |
| 1942.08 | 202.72 |
| 1960.01 | 228.08 |
| 1960.37 | 203.78 |
| 1978.30 | 227.25 |
| 1978.67 | 204.70 |
| 1996.60 | 226.34 |
| 1996.97 | 205.50 |
| 2014.89 | 225.36 |
| 2015.27 | 206.18 |
| 2033.18 | 224.30 |
| 2033.58 | 206.76 |
| 2051.46 | 223.17 |
| 2051.89 | 207.23 |
| 2069.74 | 222.00 |
| 2070.21 | 207.58 |
| 2088.02 | 220.78 |
| 2088.52 | 207.82 |
| 2106.29 | 219.50 |
| 2106.84 | 207.96 |
| 2124.56 | 218.11 |
| 2125.16 | 208.00 |
| 2142.81 | 216.56 |
| 2143.48 | 207.95 |
| 2161.05 | 214.81 |
| 2161.80 | 207.84 |
| 2179.25 | 212.80 |
| 2180.11 | 207.58 |
| 2197.43 | 210.51 |
| 2198.43 | 207.21 |
| 2215.56 | 207.88. |

12. An aircraft, as set forth in claim 1, wherein the upper and lower surfaces are defined at an X position along the X axis corresponding substantially to 3120.00; and
wherein the upper and lower surfaces are defined at Y and Z positions along the respective Y and Z axes, corresponding substantially to the following table:

| Y | Z |
|---|---|
| 2068.13 | 86.96 |
| 2068.78 | 85.27 |
| 2070.95 | 87.90 |
| 2071.70 | 84.73 |
| 2073.85 | 88.54 |
| 2074.67 | 84.58 |
| 2076.79 | 89.06 |
| 2077.64 | 84.55 |
| 2079.73 | 89.50 |
| 2080.62 | 84.57 |
| 2082.68 | 89.89 |
| 2083.59 | 84.61 |
| 2085.64 | 90.23 |
| 2086.57 | 84.67 |
| 2088.60 | 90.53 |
| 2089.54 | 84.74 |
| 2091.56 | 90.80 |
| 2092.52 | 84.82 |
| 2094.53 | 91.05 |
| 2095.49 | 84.91 |
| 2097.50 | 91.27 |
| 2098.47 | 85.00 |
| 2100.47 | 91.47 |
| 2101.44 | 85.09 |
| 2103.44 | 91.65 |
| 2104.42 | 85.18 |
| 2106.41 | 91.81 |
| 2107.39 | 85.28 |
| 2109.38 | 91.96 |
| 2110.37 | 85.37 |
| 2112.35 | 92.09 |
| 2113.34 | 85.47 |
| 2115.33 | 92.20 |
| 2116.31 | 85.56 |
| 2118.30 | 92.30 |
| 2119.29 | 85.66 |
| 2121.28 | 92.38 |
| 2122.26 | 85.75 |
| 2124.25 | 92.45 |
| 2125.24 | 85.84 |
| 2127.23 | 92.51 |
| 2128.21 | 85.94 |
| 2130.21 | 92.55 |
| 2131.19 | 86.02 |
| 2133.18 | 92.58 |
| 2134.16 | 86.11 |
| 2136.16 | 92.60 |
| 2137.13 | 86.20 |
| 2139.14 | 92.60 |
| 2140.11 | 86.28 |
| 2142.11 | 92.60 |
| 2143.08 | 86.36 |
| 2145.09 | 92.58 |
| 2146.06 | 86.43 |
| 2148.06 | 92.55 |
| 2149.03 | 86.51 |
| 2151.04 | 92.51 |
| 2152.01 | 86.57 |
| 2154.02 | 92.46 |
| 2154.98 | 86.64 |
| 2156.99 | 92.40 |
| 2157.96 | 86.70 |
| 2159.97 | 92.33 |
| 2160.93 | 86.76 |
| 2162.94 | 92.25 |
| 2163.91 | 86.81 |
| 2165.92 | 92.16 |
| 2166.88 | 86.86 |
| 2168.89 | 92.05 |
| 2169.86 | 86.90 |
| 2171.87 | 91.94 |
| 2172.83 | 86.95 |
| 2174.84 | 91.82 |
| 2175.81 | 86.99 |
| 2177.81 | 91.69 |
| 2178.79 | 87.04 |
| 2180.79 | 91.54 |
| 2181.76 | 87.10 |
| 2183.76 | 91.38 |
| 2184.74 | 87.16 |
| 2186.73 | 91.20 |
| 2187.71 | 87.22 |
| 2189.70 | 91.02 |
| 2190.69 | 87.29 |
| 2192.67 | 90.82 |
| 2193.66 | 87.36 |
| 2195.64 | 90.61 |
| 2196.64 | 87.44 |
| 2198.60 | 90.39 |
| 2199.61 | 87.53 |
| 2201.57 | 90.15 |
| 2202.59 | 87.62 |
| 2204.54 | 89.90 |
| 2205.56 | 87.72 |
| 2207.50 | 89.65 |
| 2208.54 | 87.82 |
| 2210.46 | 89.38 |
| 2211.51 | 87.93 |
| 2213.43 | 89.09 |
| 2214.48 | 88.04. |

13. An aircraft, as set forth in claim 1, wherein at least one stabilizer bar operatively interconnects the fuselage and the rear stabilizer at an angle substantially equal to 16.4 degrees, relative to a plane proximate a bottom of the fuselage.

14. An aircraft, as set forth in claim 13, wherein the at least one stabilizer bar includes a stabilizer hinge such that the rear stabilizer is foldable about the hinge, relative to the fuselage.

15. An aircraft, as set forth in claim 14, wherein each of the wings includes a wing hinge such that each of the wings are foldable about the respective wing hinge, relative to the fuselage.

16. An aircraft, as set forth in claim 15, wherein each of the wing hinges extends along a hinge axis substantially equal to 23.5 degrees, relative to a centerline of the fuselage.

17. An aircraft, as set forth in claim 1, wherein each of the wings and the rear stabilizer are foldable relative to the fuselage to a foldable position.

18. An aircraft configured for flight in an atmosphere having low density, the aircraft comprising:
a fuselage;
a pair of wings extending from the fuselage in opposition to one another;
a rear stabilizer extending from the fuselage in spaced relationship to the pair of wings;
a stabilizer bar operatively interconnecting the rear stabilizer and the fuselage;
wherein each of the fuselage, the pair of wings, and the rear stabilizer present an upper surface opposing a lower surface;
wherein the upper and lower surfaces are defined at an X position along an X axis, in a 3-dimensional X, Y, Z configuration; and wherein the upper and lower surfaces are defined at Y and Z positions along a respective Y and Z axis, corresponding substantially to the following table:

| Y | Z |
|---|---|
| 1005.68 | 117.26 |
| 1037.25 | 437.34 |
| 1049.79 | 117.67 |
| 1081.35 | 438.41 |
| 1093.90 | 118.26 |
| 1125.46 | 438.83 |
| 1138.00 | 119.03 |
| 1169.57 | 438.60 |
| 1182.11 | 119.96 |
| 1213.67 | 437.72 |
| 1226.20 | 121.01 |
| 1257.75 | 436.19 |
| 1270.30 | 122.11 |
| 1301.81 | 434.01 |
| 1314.40 | 123.20 |
| 1345.83 | 431.19 |
| 1358.50 | 124.30 |
| 1389.81 | 427.74 |
| 1402.59 | 125.48 |
| 1433.73 | 423.67 |
| 1446.68 | 126.77 |
| 1477.59 | 419.01 |
| 1490.77 | 128.22 |
| 1521.39 | 413.76 |
| 1534.85 | 129.87 |
| 1565.12 | 407.93 |
| 1578.92 | 131.74 |
| 1608.77 | 401.56 |
| 1622.98 | 133.88 |
| 1652.34 | 394.68 |
| 1667.02 | 136.33 |
| 1695.83 | 387.34 |
| 1711.05 | 139.13 |
| 1739.27 | 379.66 |
| 1755.04 | 142.31 |
| 1782.65 | 371.68 |
| 1799.01 | 145.91 |
| 1825.98 | 363.42 |
| 1842.93 | 149.98 |
| 1869.25 | 354.84 |
| 1886.80 | 154.56 |
| 1912.45 | 345.90 |
| 191.27 | 193.72 |
| 1930.61 | 159.67 |
| 1955.57 | 336.63 |
| 195.79 | 236.57 |
| 1974.36 | 165.31 |
| 1998.63 | 327.04 |
| 2018.04 | 171.45 |
| 2041.63 | 317.21 |
| 2061.66 | 178.05 |
| 2084.61 | 307.28 |
| 2105.22 | 185.01 |
| 2127.58 | 297.33 |
| 2148.72 | 192.28 |
| 2170.47 | 287.02 |
| 217.43 | 159.25 |
| 2192.19 | 199.79 |
| 2213.16 | 275.91 |
| 2235.63 | 207.48 |
| 223.69 | 270.30 |
| 2255.58 | 263.80 |
| 2279.04 | 215.29 |
| 2297.80 | 251.03 |
| 2321.20 | 224.19 |
| 257.36 | 140.96 |
| 260.67 | 294.21 |
| 300.44 | 131.64 |
| 300.83 | 312.40 |
| 342.35 | 327.29 |
| 344.24 | 126.54 |
| 3744.64 | 668.04 |
| 3758.76 | 679.04 |

-continued

| Y | Z |
|---|---|
| 3765.49 | 654.10 |
| 3778.09 | 682.59 |
| 3784.17 | 650.65 |
| 3797.57 | 685.21 |
| 3803.05 | 648.55 |
| 3817.10 | 687.46 |
| 3822.01 | 647.30 |
| 3836.67 | 689.38 |
| 3840.99 | 646.64 |
| 384.41 | 340.58 |
| 3856.25 | 691.10 |
| 3859.99 | 646.44 |
| 3875.86 | 692.61 |
| 3878.99 | 646.57 |
| 388.22 | 123.63 |
| 3895.47 | 694.00 |
| 3897.98 | 647.01 |
| 3915.08 | 695.32 |
| 3916.97 | 647.73 |
| 3934.71 | 696.47 |
| 3935.94 | 648.72 |
| 3954.35 | 697.51 |
| 3954.91 | 649.85 |
| 3973.87 | 651.12 |
| 3973.98 | 698.57 |
| 3992.81 | 652.63 |
| 3993.61 | 699.65 |
| 4011.73 | 654.36 |
| 4013.25 | 700.76 |
| 4030.63 | 656.29 |
| 4032.88 | 701.89 |
| 4049.51 | 658.39 |
| 4052.51 | 703.04 |
| 4068.38 | 660.63 |
| 4072.14 | 704.20 |
| 4087.23 | 662.99 |
| 4091.77 | 705.37 |
| 4106.07 | 665.47 |
| 4111.39 | 706.53 |
| 4124.89 | 668.04 |
| 4131.02 | 707.69 |
| 4143.70 | 670.71 |
| 4150.65 | 708.86 |
| 4162.50 | 673.48 |
| 4166.85 | 699.98 |
| 4181.28 | 676.32 |
| 4181.67 | 687.05 |
| 4198.83 | 681.03 |
| 4200.06 | 679.25 |
| 4218.82 | 682.24 |
| 426.85 | 352.58 |
| 432.29 | 121.80 |
| 469.58 | 363.51 |
| 476.39 | 120.56 |
| 512.54 | 373.55 |
| 520.48 | 119.50 |
| 555.68 | 382.76 |
| 564.59 | 118.60 |
| 598.98 | 391.18 |
| 608.69 | 117.90 |
| 642.42 | 398.84 |
| 652.80 | 117.40 |
| 685.98 | 405.76 |
| 696.91 | 117.05 |
| 729.65 | 411.98 |
| 741.02 | 116.83 |
| 773.41 | 417.53 |
| 785.13 | 116.70 |
| 817.25 | 422.43 |
| 829.24 | 116.66 |
| 861.15 | 426.68 |
| 873.35 | 116.71 |
| 905.12 | 430.30 |
| 917.46 | 116.82 |
| 949.13 | 433.28 |
| 961.57 | 117.00 |
| 993.17 | 435.63. |

19. An aircraft configured for moving from a folded position to an unfolded position for flight in an atmosphere having low density, the aircraft comprising:
 a fuselage;
 a pair of wings extending from the fuselage in opposition to one another;
 a rear stabilizer extending from the fuselage in spaced relationship to the pair of wings;
 wherein each of the pair of wings and the rear stabilizer is foldable relative to the fuselage along a respective fold line;
 wherein each of the fuselage, the pair of wings, and the rear stabilizer present an upper surface opposing a lower surface;
 wherein the upper and lower surfaces are defined at an X position along an X axis, in a 3-dimensional X, Y, Z configuration; and
 wherein the upper and lower surfaces are defined at Y and Z positions along a respective Y and Z axis, corresponding substantially to the following table:

| Y | Z |
|---|---|
| 1005.68 | 117.26 |
| 1037.25 | 437.34 |
| 1049.79 | 117.67 |
| 1081.35 | 438.41 |
| 1093.90 | 118.26 |
| 1125.46 | 438.83 |
| 1138.00 | 119.03 |
| 1169.57 | 438.60 |
| 1182.11 | 119.96 |
| 1213.67 | 437.72 |
| 1226.20 | 121.01 |
| 1257.75 | 436.19 |
| 1270.30 | 122.11 |
| 1301.81 | 434.01 |
| 1314.40 | 123.20 |
| 1345.83 | 431.19 |
| 1358.50 | 124.30 |
| 1389.81 | 427.74 |
| 1402.59 | 125.48 |
| 1433.73 | 423.67 |
| 1446.68 | 126.77 |
| 1477.59 | 419.01 |
| 1490.77 | 128.22 |
| 1521.39 | 413.76 |
| 1534.85 | 129.87 |
| 1565.12 | 407.93 |
| 1578.92 | 131.74 |
| 1608.77 | 401.56 |
| 1622.98 | 133.88 |
| 1652.34 | 394.68 |
| 1667.02 | 136.33 |
| 1695.83 | 387.34 |
| 1711.05 | 139.13 |
| 1739.27 | 379.66 |
| 1755.04 | 142.31 |
| 1782.65 | 371.68 |
| 1799.01 | 145.91 |
| 1825.98 | 363.42 |
| 1842.93 | 149.98 |
| 1869.25 | 354.84 |
| 1886.80 | 154.56 |
| 1912.45 | 345.90 |
| 191.27 | 193.72 |
| 1930.61 | 159.67 |
| 1955.57 | 336.63 |
| 195.79 | 236.57 |
| 1974.36 | 165.31 |
| 1998.63 | 327.04 |
| 2018.04 | 171.45 |
| 2041.63 | 317.21 |
| 2061.66 | 178.05 |
| 2084.61 | 307.28 |
| 2105.22 | 185.01 |
| 2127.58 | 297.33 |
| 2148.72 | 192.28 |
| 2170.47 | 287.02 |
| 217.43 | 159.25 |
| 2192.19 | 199.79 |
| 2213.16 | 275.91 |
| 2235.63 | 207.48 |
| 223.69 | 270.30 |
| 2255.58 | 263.80 |
| 2279.04 | 215.29 |
| 2297.80 | 251.03 |
| 2321.20 | 224.19 |
| 257.36 | 140.96 |
| 260.67 | 294.21 |
| 300.44 | 131.64 |
| 300.83 | 312.40 |
| 342.35 | 327.29 |
| 344.24 | 126.54 |
| 3744.64 | 668.04 |
| 3758.76 | 679.04 |
| 3765.49 | 654.10 |
| 3778.09 | 682.59 |
| 3784.17 | 650.65 |
| 3797.57 | 685.21 |
| 3803.05 | 648.55 |
| 3817.10 | 687.46 |
| 3822.01 | 647.30 |
| 3836.67 | 689.38 |
| 3840.99 | 646.64 |
| 384.41 | 340.58 |
| 3856.25 | 691.10 |
| 3859.99 | 646.44 |
| 3875.86 | 692.61 |
| 3878.99 | 646.57 |
| 388.22 | 123.63 |
| 3895.47 | 694.00 |
| 3897.98 | 647.01 |
| 3915.08 | 695.32 |
| 3916.97 | 647.73 |
| 3934.71 | 696.47 |
| 3935.94 | 648.72 |
| 3954.35 | 697.51 |
| 3954.91 | 649.85 |
| 3973.87 | 651.12 |
| 3973.98 | 698.57 |
| 3992.81 | 652.63 |
| 3993.61 | 699.65 |
| 4011.73 | 654.36 |
| 4013.25 | 700.76 |
| 4030.63 | 656.29 |
| 4032.88 | 701.89 |
| 4049.51 | 658.39 |
| 4052.51 | 703.04 |
| 4068.38 | 660.63 |
| 4072.14 | 704.20 |
| 4087.23 | 662.99 |
| 4091.77 | 705.37 |
| 4106.07 | 665.47 |
| 4111.39 | 706.53 |
| 4124.89 | 668.04 |
| 4131.02 | 707.69 |
| 4143.70 | 670.71 |
| 4150.65 | 708.86 |
| 4162.50 | 673.48 |
| 4166.85 | 699.98 |
| 4181.28 | 676.32 |
| 4181.67 | 687.05 |
| 4198.83 | 681.03 |
| 4200.06 | 679.25 |
| 4218.82 | 682.24 |
| 426.85 | 352.58 |
| 432.29 | 121.80 |
| 469.58 | 363.51 |
| 476.39 | 120.56 |
| 512.54 | 373.55 |
| 520.48 | 119.50 |
| 555.68 | 382.76 |

-continued

| Y | Z |
|---|---|
| 564.59 | 118.60 |
| 598.98 | 391.18 |
| 608.69 | 117.90 |
| 642.42 | 398.84 |
| 652.80 | 117.40 |
| 685.98 | 405.76 |
| 696.91 | 117.05 |
| 729.65 | 411.98 |
| 741.02 | 116.83 |
| 773.41 | 417.53 |
| 785.13 | 116.70 |

-continued

| Y | Z |
|---|---|
| 817.25 | 422.43 |
| 829.24 | 116.66 |
| 861.15 | 426.68 |
| 873.35 | 116.71 |
| 905.12 | 430.30 |
| 917.46 | 116.82 |
| 949.13 | 433.28 |
| 961.57 | 117.00 |
| 993.17 | 435.63. |

* * * * *